(12) United States Patent
Rezaei et al.

(10) Patent No.: US 12,553,829 B2
(45) Date of Patent: Feb. 17, 2026

(54) SENSOR WITH MULTIPLE REACTION SITES PER PIXEL

(71) Applicant: Illumina, Inc., San Diego, CA (US)

(72) Inventors: Mohsen Rezaei, San Diego, CA (US); Michael Burek, San Diego, CA (US); Arvin Emadi, San Jose, CA (US); Ludovic Vincent, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 360 days.

(21) Appl. No.: 17/653,281

(22) Filed: Mar. 2, 2022

(65) Prior Publication Data

US 2022/0283087 A1    Sep. 8, 2022

Related U.S. Application Data

(60) Provisional application No. 63/200,383, filed on Mar. 3, 2021.

(51) Int. Cl.
*G01N 21/64* (2006.01)
*G01N 33/543* (2006.01)

(52) U.S. Cl.
CPC ... *G01N 21/6428* (2013.01); *G01N 33/54366* (2013.01); *G01N 2021/6439* (2013.01)

(58) Field of Classification Search
CPC ........... G01N 2021/752; G01N 21/6428; B01J 2219/00315; G09G 3/2983; C21Q 1/6869
See application file for complete search history.

(56) References Cited

U.S. PATENT DOCUMENTS

| | | |
|---|---|---|
| 2003/0219754 A1 | 11/2003 | Oleksy et al. |
| 2005/0287040 A1* | 12/2005 | Giebeler ............ G01N 21/278 422/400 |
| 2007/0046946 A1 | 3/2007 | Namiki |
| 2007/0087382 A1 | 4/2007 | Howorka et al. |
| 2010/0247382 A1 | 9/2010 | Lee |
| 2012/0223214 A1 | 9/2012 | Lee et al. |
| 2014/0171331 A1 | 6/2014 | McCaffrey et al. |
| 2014/0274746 A1 | 9/2014 | Khurana et al. |
| 2014/0274747 A1 | 9/2014 | Kain et al. |
| 2015/0184237 A1 | 7/2015 | Su et al. |
| 2016/0033413 A1 | 2/2016 | Chodavarapu |

(Continued)

FOREIGN PATENT DOCUMENTS

| | | |
|---|---|---|
| CA | 3065780 A1 | 7/2019 |
| JP | 6807071 B2 | 1/2021 |

(Continued)

*Primary Examiner* — Uzma Alam
*Assistant Examiner* — Adrian Ignacio Silva
(74) *Attorney, Agent, or Firm* — Heslin Rothenberg Farley & Mesiti P.C.

(57) ABSTRACT

There is set forth herein, in one example, an apparatus. The apparatus can comprise, for example: a first reaction site and a second reaction site over a single pixel. There is set forth herein, in one example, a method. The method can include, for example: detecting a signal emitted from a first reaction site and a second reaction site; determining the identity of a first analyte of interest in a first reaction site using an amplitude of the detected signal; and determining the identity of a second analyte of interest in a second reaction site using the amplitude of the detected signal.

20 Claims, 31 Drawing Sheets

(56) References Cited

U.S. PATENT DOCUMENTS

| | | |
|---|---|---|
| 2016/0041095 A1 | 2/2016 | Rothberg et al. |
| 2016/0334334 A1* | 11/2016 | Saxena .................. G02B 6/124 |
| 2017/0191125 A1 | 7/2017 | Vijayan et al. |
| 2017/0275690 A1 | 9/2017 | Dehlinger et al. |
| 2019/0170904 A1 | 6/2019 | Topolancik et al. |
| 2019/0212266 A1 | 7/2019 | Baker |
| 2019/0383741 A1* | 12/2019 | Yuan ................ G02F 1/133614 |
| 2020/0364496 A1 | 11/2020 | Kostem |
| 2020/0384470 A1 | 12/2020 | Huff et al. |
| 2022/0050048 A1 | 2/2022 | Morita et al. |
| 2022/0134334 A1* | 5/2022 | Evans .................... G01N 21/76 |
| | | 422/502 |
| 2022/0186307 A1 | 6/2022 | Kraft et al. |

FOREIGN PATENT DOCUMENTS

| | | |
|---|---|---|
| WO | WO2014144569 | 9/2014 |
| WO | WO2017184997 A1 | 10/2017 |

* cited by examiner

TOP VIEW PIXEL SCHEMATICS

TOP VIEW

CROSS SECTION

| # OF CLUSTERS ON A PIXEL | # OF CLOUDS | SIGNAL STRENGTH |
|---|---|---|
| 1 | 4 | 1X |
| 2 | 16 | 1X, 2X |
| 3 | 64 | 1X, 2X, 4X |
| 4 | 256 | 1X, 2X, 4X, 8X |

FIG. 12

SENSOR WITH MULTIPLE REACTION SITES PER PIXEL

CROSS-REFERENCE TO RELATED APPLICATIONS

This application claims priority to U.S. Patent Application No. 63/200,383, filed Mar. 3, 2021, entitled, "Sensor with Multiple Reaction Sites Per Pixel," which is incorporated herein by reference in its entirety.

BACKGROUND

The present application relates generally to sensing and specifically to light sensing.

Various protocols in biological or chemical research involve performing controlled reactions. The designated reactions can then be observed or detected and subsequent analysis can help identify or reveal properties of chemicals involved in the reaction. In some multiplex assays, an unknown analyte having an identifiable label (e.g., fluorescent label) can be exposed to thousands of known probes under controlled conditions. Each known probe can be deposited into a corresponding well of a microplate. Observing any chemical reactions that occur between the known probes and the unknown analyte within the wells can help identify or reveal properties of the analyte. Other examples of such protocols include known deoxyribonucleic acid (DNA) sequencing processes, such as sequencing-by-synthesis (SBS) or cyclic-array sequencing.

SUMMARY

There is set forth herein, in one example, an apparatus. The apparatus can comprise, for example: a first reaction site and a second reaction site over a single pixel.

There is set forth herein, in one example, a method. The method can include, for example: detecting a signal emitted from a first reaction site and a second reaction site; determining the identity of a first analyte of interest in a first reaction site using an amplitude of the detected signal; and determining the identity of a second analyte of interest in a second reaction site using the amplitude of the detected signal.

There is set forth herein, in one example, an apparatus. The apparatus can comprise, for example a plurality of pixels, wherein respective ones of the plurality of pixels include respective pixel sensors; a first reaction site associated to a pixel of the plurality of pixels; a second reaction site associated to the pixel; wherein a pixel sensor of the pixel detects a read signal, the read signal being dependent on a first cluster signal emitted from the first reaction site and on a second cluster signal emitted from the second cluster site; and wherein the first reaction site and the second reaction site are configured so that the second cluster signal in an "on" state has a greater amplitude than the first cluster signal in an "on" state.

There is set forth herein, in one example, a method. The method can include for example, detecting, using a pixel sensor of a plurality of pixels sensors, a read signal, the read signal being dependent on a first cluster signal emitted from a first reaction site associated to the pixel sensor and on a second cluster signal emitted from a second reaction site associated to the pixel sensor; determining an identity of a first analyte of interest in the first reaction site using an amplitude of the read signal detected using the pixel sensor; and determining an identity of a second analyte of interest in the second reaction site using the amplitude of the read signal detected using the pixel sensor.

By modulating the signal of two different adjacent clusters in two separate nanowells, either through geometric constraints or signal modulation, it may be possible to distinguish the signals from adjacent clusters using a single pixel. In other words, benefits and advantages of the methods and structures disclosed herein include resolving distinct signal levels from each unique cluster by a single image pixel. The methods and structures disclosed herein enable using multi-cluster per pixel (for example, on a CMOS sensor) and distinguish the on/off signal that is generated from each pixel.

While various examples herein may discuss certain methods and structures with respect to a CMOS sensor, other sensor types may be utilized as well, including charge coupled device (CCD) sensors. Likewise, methods and structures disclosed herein may also be applicable detection of analytes on flow cells where emissive light is detected via external optics and image sensor(s).

Increasing the information density on a fixed CMOS-based flow cell has a beneficial aspect of reducing the cost per gigabyte of sequencing information by the factor proportional to the increase in density.

A first reaction site and a second reaction site reside over a single pixel. The first reaction site is a first nanowell, and the second reaction site is a second nanowell. The first nanowell may be half the size of the second nanowell. A filter may reside between the first reaction site and the single pixel, and not between the second reaction site and the single pixel. The filter attenuates a cluster signal emitted from the first reaction site. The filter may be a thin metallic layer. The filter may include Tantalum. A method includes detecting a signal emitted from a first reaction site and a second reaction site; determining the identity of a first analyte of interest in a first reaction site using an amplitude of the detected signal; and determining the identity of a second analyte of interest in a second reaction site using the amplitude of the detected signal.

Additional features are realized through the techniques described herein. Other examples and aspects are described in detail herein and are considered a part of the claimed aspects. These and other objects, features and advantages of this disclosure will become apparent from the following detailed description of the various aspects of the disclosure taken in conjunction with the accompanying drawings.

It should be appreciated that all combinations of the foregoing aspects and additional concepts discussed in greater detail below (provided such concepts are not mutually inconsistent) are contemplated as being part of the inventive subject matter and to achieve the benefits advantages disclosed herein.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 12 is a chart showing the number of clusters (or nanowells) over a single pixel with a corresponding number of scatter plot clouds and signal strength;

DETAILED DESCRIPTION

Figure 1:
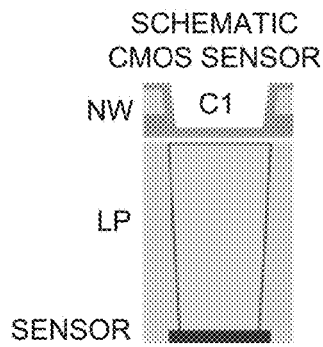
FIG. 1 depicts a portion of a CMOS sensor with a single nanowell over a single pixel.

The accompanying figures, in which like reference numerals refer to identical or functionally similar elements throughout the separate views and which are incorporated in and form a part of the specification, further illustrate the present implementation(s) and, together with the detailed description of the implementation(s), serve to explain the principles of the present implementation(s). As understood by one of skill in the art, the accompanying figures are provided for ease of understanding and illustrate aspects of certain examples of the present implementation(s). The implementation(s) is/are not limited to the examples depicted in the figures.

The terms "connect," "connected," "contact" "coupled" and/or the like are broadly defined herein to encompass a variety of divergent arrangements and assembly techniques. These arrangements and techniques include, but are not limited to (1) the direct joining of one component and another component with no intervening components therebetween (i.e., the components are in direct physical contact); and (2) the joining of one component and another component with one or more components therebetween, provided that the one component being "connected to" or "contacting" or "coupled to" the other component is somehow in operative communication (e.g., electrically, fluidly, physically, optically, etc.) with the other component (notwithstanding the presence of one or more additional components therebetween). It is to be understood that some components that are in direct physical contact with one another may or may not be in electrical contact and/or fluid contact with one another. Moreover, two components that are electrically connected, electrically coupled, optically connected, optically coupled, fluidly connected or fluidly coupled may or may not be in direct physical contact, and one or more other components may be positioned therebetween.

The terms "including" and "comprising", as used herein, mean the same thing.

The terms "substantially", "approximately", "about", "relatively", or other such similar terms that may be used throughout this disclosure, including the claims, are used to describe and account for small fluctuations, such as due to variations in processing, from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. If used herein, the terms "substantially", "approximately", "about", "relatively," or other such similar terms may also refer to no fluctuations, that is, ±0%.

As used herein, a "flow cell" can include a device having a lid extending over a reaction structure to form a flow channel therebetween that is in communication with a plurality of reaction sites of the reaction structure. In some examples, a detection device, such as an imaging device and/or optics, are separate from the flow cell. In other examples, a flow cell can include a detection device that detects designated reactions that occur at or proximate to the reaction sites. A flow cell may include a solid-state light detection or "imaging" device, such as a Charge-Coupled Device (CCD) or Complementary Metal-Oxide Semiconductor (CMOS) (light) detection device. The CMOS detection device or sensor, for example, may include a plurality of detection pixels that detects incident emission signals. In some examples, each detection pixel corresponds to a reaction site. In other examples, there may be more or fewer pixels than the number of reaction sites. Likewise, a detection pixel in some examples corresponds to a single sensing element to create an output signal. In other examples, a detection pixel corresponds to multiple sensing elements to create an output signal. A flow cell can also or alternatively include two (or more) opposing sensors, without a lid. As one specific example, a flow cell can fluidically, electrically, or both fluidically and electrically couple to a cartridge, which can fluidically, electrically, or both fluidically and electrically couple to a bioassay system. A cartridge and/or bioassay system may deliver a reaction solution to reaction sites of a flow cell according to a predetermined protocol (e.g., sequencing-by-synthesis), and perform a plurality of imaging events. For example, a cartridge and/or bioassay system may direct one or more reaction solutions through the flow channel of the flow cell, and thereby along the reaction sites. At least one of the reaction solutions may include four types of nucleotides having the same or different fluorescent labels. In some examples, the nucleotides bind to the reaction sites of the flow cell, such as to corresponding oligonucleotides at the reaction sites. The cartridge, bioassay system, or the flow cell itself in some examples then illuminates the reaction sites using an excitation light source (e.g., solid-state light sources, such as light-emitting diodes (LEDs)). In some examples, the excitation light has a predetermined wavelength or wavelengths, including a range of wavelengths. The fluorescent labels excited by the incident excitation light may provide emission signals (e.g., light of a wavelength or wavelengths that differ from the excitation light and, potentially, each other) that may be detected by the light sensors of the flow cell.

Flow cells described herein perform various biological or chemical processes and/or analysis. More specifically, the flow cells described herein may be used in various processes and systems where it is desired to detect an event, property, quality, or characteristic that is indicative of a designated reaction. For example, flow cells described herein may include or be integrated with light detection devices, sensors, including but not limited to, biosensors, and their components, as well as bioassay systems that operate with sensors, including biosensors.

The flow cells facilitate a plurality of designated reactions that may be detected individually or collectively. The flow cells perform numerous cycles in which the plurality of designated reactions occurs in parallel. For example, the flow cells may be used to sequence a dense array of DNA features through iterative cycles of enzymatic manipulation and light or image detection/acquisition. As such, the flow cells may be in fluidic communication with one or more microfluidic channels that deliver reagents or other reaction components in a reaction solution to a reaction site of the flow cells. The reaction sites may be provided or spaced apart in a predetermined manner, such as in a uniform or repeating pattern. Alternatively, the reaction sites may be randomly distributed. Each of the reaction sites may be associated with one or more light guides and one or more light sensors that detect light from the associated reaction site. In one example, light guides include one or more filters for filtering certain wavelengths of light. The light guides may be, for example, an absorption filter (e.g., an organic absorption filter) such that the filter material absorbs a certain wavelength (or range of wavelengths) and allows at least one predetermined wavelength (or range of wavelengths) to pass therethrough. In some flow cells, the reaction sites may be located in reaction recesses or chambers, which may at least partially compartmentalize the designated reactions therein. Furthermore, the designation reactions may involve or be more easily detected at temperatures other than at ambient temperatures, for example, at elevated temperatures.

As used herein, a "designated reaction" includes a change in at least one of a chemical, electrical, physical, or optical property (or quality) of a chemical or biological substance of interest, such as an analyte-of-interest. In particular flow cells, a designated reaction is a positive binding event, such as incorporation of a fluorescently labeled biomolecule with an analyte-of-interest, for example. More generally, a designated reaction may be a chemical transformation, chemical change, or chemical interaction. A designated reaction may also be a change in electrical properties. In particular flow cells, a designated reaction includes the incorporation of a fluorescently-labeled molecule with an analyte. The analyte may be an oligonucleotide and the fluorescently-labeled molecule may be a nucleotide. A designated reaction may be detected when an excitation light is directed toward the oligonucleotide having the labeled nucleotide, and the fluorophore emits a detectable fluorescent signal. In another example of flow cells, the detected fluorescence is a result of chemiluminescence or bioluminescence. A designated reaction may also increase fluorescence (or Förster) resonance energy transfer (FRET), for example, by bringing a donor fluorophore in proximity to an acceptor fluorophore, decrease FRET by separating donor and acceptor fluorophores, increase fluorescence by separating a quencher from a fluorophore, or decrease fluorescence by co-locating a quencher and fluorophore. A biological or chemical analysis may include detecting a designated reaction.

As used herein, "electrically coupled" and "optically coupled" refers to a transfer of electrical energy and light waves, respectively, between any combination of a power source, an electrode, a conductive portion of a substrate, a droplet, a conductive trace, wire, waveguide, nanostructures, other circuit segment and the like. The terms electrically coupled and optically coupled may be utilized in connection with direct or indirect connections and may pass through various intermediaries, such as a fluid intermediary, an air gap and the like. Likewise, "fluidically coupled" refers to a transfer of fluid between any combination of sources. The term fluidically coupled may be utilized in connection with direct or indirect connections, and may pass through various intermediaries, such as channels, wells, pools, pumps, and the like.

As used herein, a "reaction solution," "reaction component" or "reactant" includes any substance that may be used to obtain at least one designated reaction. For example, potential reaction components include reagents, enzymes, samples, other biomolecules, and buffer solutions, for example. The reaction components may be delivered to a reaction site in the flow cells disclosed herein in a solution and/or immobilized at a reaction site. The reaction components may interact directly or indirectly with another substance, such as an analyte-of-interest immobilized at a reaction site of the flow cell.

As used herein, the term "reaction site" is a localized region where at least one designated reaction may occur. A reaction site may include support surfaces of a reaction structure or substrate where a substance may be immobilized thereon. For example, a reaction site may include a surface of a reaction structure (which may be positioned in a channel of a flow cell) that has a reaction component thereon, such as a colony of nucleic acids thereon. In some flow cells, the nucleic acids in the colony have the same sequence, being for example, clonal copies of a single stranded or double stranded template. However, in some flow cells a reaction site may contain only a single nucleic acid molecule, for example, in a single stranded or double stranded form.

As used herein, the term "transparent" refers to allowing all or substantially all visible and non-visible electromagnetic radiation or light of interest to pass through unobstructed; the term "opaque" refers to reflecting, deflecting, absorbing, or otherwise obstructing all or substantially all visible and non-visible electromagnetic radiation or light of interest from passing through; and the term "non-transparent" refers to allowing some, but not all, visible and non-visible electromagnetic radiation or light of interest to pass through unobstructed.

As used herein, the term "waveguide" refers to a structure that guides waves, such as electromagnetic waves, with minimal loss of energy by restricting the transmission of energy to a particular direction or range of directions.

The proposed methods and structures provide many benefits including higher throughput and lower cost of sequencing data.

In certain examples, modulating the signal of two different adjacent clusters in two separate nanowells either through geometric constraints or signal modulation may add up to a two times or more increase in information density for a CMOS sensor, providing a benefit over CMOS-based detection devices with one cluster/well per pixel. In addition, increasing the information density on a CMOS-based flow cell may have the benefit of reducing the cost per gigabyte of sequencing information by the factor proportional to the increase in density. The practical impact of such innovation enables CMOS based sequencing to compete with larger platforms in terms of information density. Further, implementing the methods and structures disclosed herein may only require software changes coupled with CMOS fabrication modifications, leaving the instrument, and reagent consumables substantially if not fully untouched.

By placing two or more nanowells on top of a pixel, the sensor accepts a minimum 50% intensity hit for the "bright" cluster and a greater than 50% intensity hit compared to nominal for the "attenuated" cluster in the transmission modulation option. The different sized nanowell implementation (for example, a larger "dominant" sized well and a smaller "minor" sized well) accepts a sharing of the signal disproportionately between two (assumed) monoclonal clusters such that the total signal remains about the same. Nonetheless, the signal ratio between the dominant and minor nanowell is sufficiently large for accurate distinction of signals between the two clusters.

Reference is made below to the drawings, which are not drawn to scale for ease of understanding, wherein the same reference numbers are used throughout different figures to designate the same or similar components.

FIG. 1 depicts a portion of a CMOS sensor with a single nanowell over a single pixel. One cluster on a pixel will result in two possible different reads on the sensor. For example, the sensor can determine that the cluster is either on or off. The cluster C1 is located in the nanowell NW, residing over a light pipe LP that directs an emissive signal (for example, light) from the cluster C1 to the sensor below. When the cluster signal is "on," for example, a particular analyte of interest may be present and there is fluorescence or an emission of light. Likewise, when a cluster signal is "off," this indicates that a particular analyte of interest may not be present. The table to the right of the portion of the CMOS sensor shows an example cluster signal strength and corresponding sensor read signal strength that, for example, may assume that there is no signal loss between the cluster signal and sensor.

A nanowell may be a bounding structure to a reaction site that houses a DNA cluster. While the CMOS sensor is shown with nanowells, alternative structures for reaction sites may be used as well.

Figure 2:
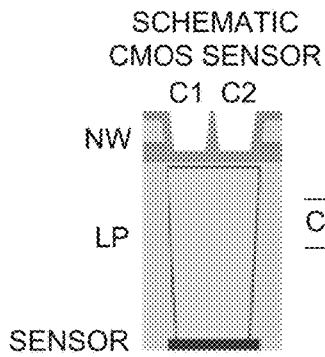
FIG. 2 depicts a portion of a CMOS sensor with two nanowells that provide substantially similar "on" cluster signal strengths over a single pixel.

FIG. 2 depicts a portion of a CMOS sensor with two nanowells that provide substantially similar "on" cluster signal strengths over a single pixel. Two clusters with same "on" signal level (strength) will result in only three possible different reads on the sensor. In other words, the sensor may not be able to determine which cluster is "on." The clusters C1 and C2 are located in their own respective nanowells NW, residing over a light pipe LP that directs emissive signals (for example, light) from the clusters C1 and C2 to the sensor below. When the cluster signal is "on," for example, a particular analyte of interest may be present and there is fluorescence or an emission of light. Likewise, when a cluster signal is "off," this indicates that a particular analyte of interest may not be present. The table to the right of the portion of the CMOS sensor shows an example cluster signal strength and corresponding sensor read signal strength that, for example, may assume that there is no signal loss between the cluster signal and sensor.

Figure 3:
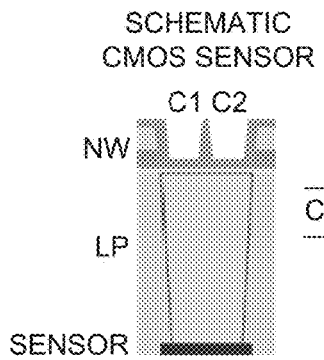
FIG. 3 depicts a portion of a CMOS sensor with two nanowells that provide substantially different "on" cluster signal strengths over a single pixel.

FIG. 3 depicts a portion of a CMOS sensor with two nanowells that provide substantially different "on" cluster signal strengths over a single pixel. Sensor reads from two clusters with 1× (one times) and 2× (two times) signal strength may be able to determine cluster state, that is on or off. The clusters C1 and C2 are located in their own respective nanowells NW, residing over a light pipe LP that directs emissive signals (for example, light) from the clusters C1 and C2 to the sensor below. When the cluster signal is "on," for example, a particular analyte of interest may be present and there is fluorescence or an emission of light. Likewise, when a cluster signal is "off," this indicates that a particular analyte of interest may not be present. The table to the right of the portion of the CMOS sensor shows an example cluster signal strength and corresponding sensor read signal strength that, for example, may assume that there is no signal loss between the cluster signal and sensor. By modulating the cluster signal strength between each cluster over a pixel sensor, that is, causing the signal strength detected by the pixel sensor from each cluster to be different, it may be possible to determine the state (on or off) of each cluster (in this example, each in its own nanowell) using a single pixel of the CMOS sensor.

Figure 4:
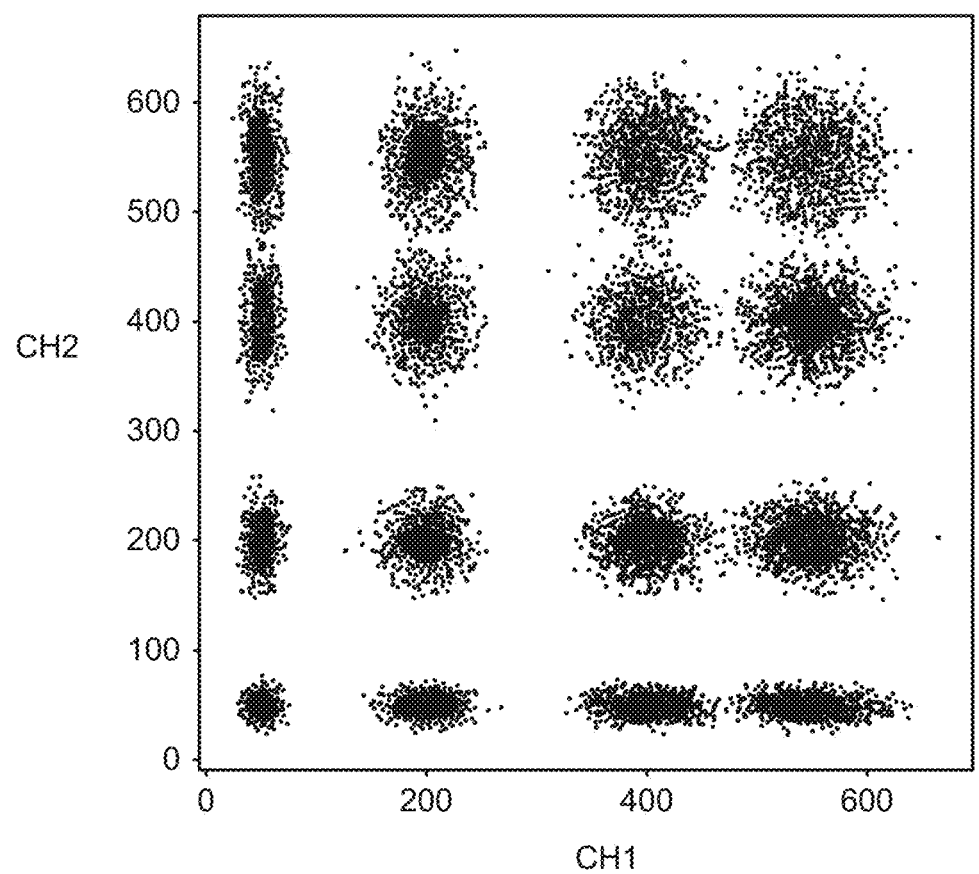
FIG. 4 depicts an example scatter chart of two channel signal strengths detected by a single pixel from two nanowells that provide substantially different "on" cluster signal strengths.
Figure 5:
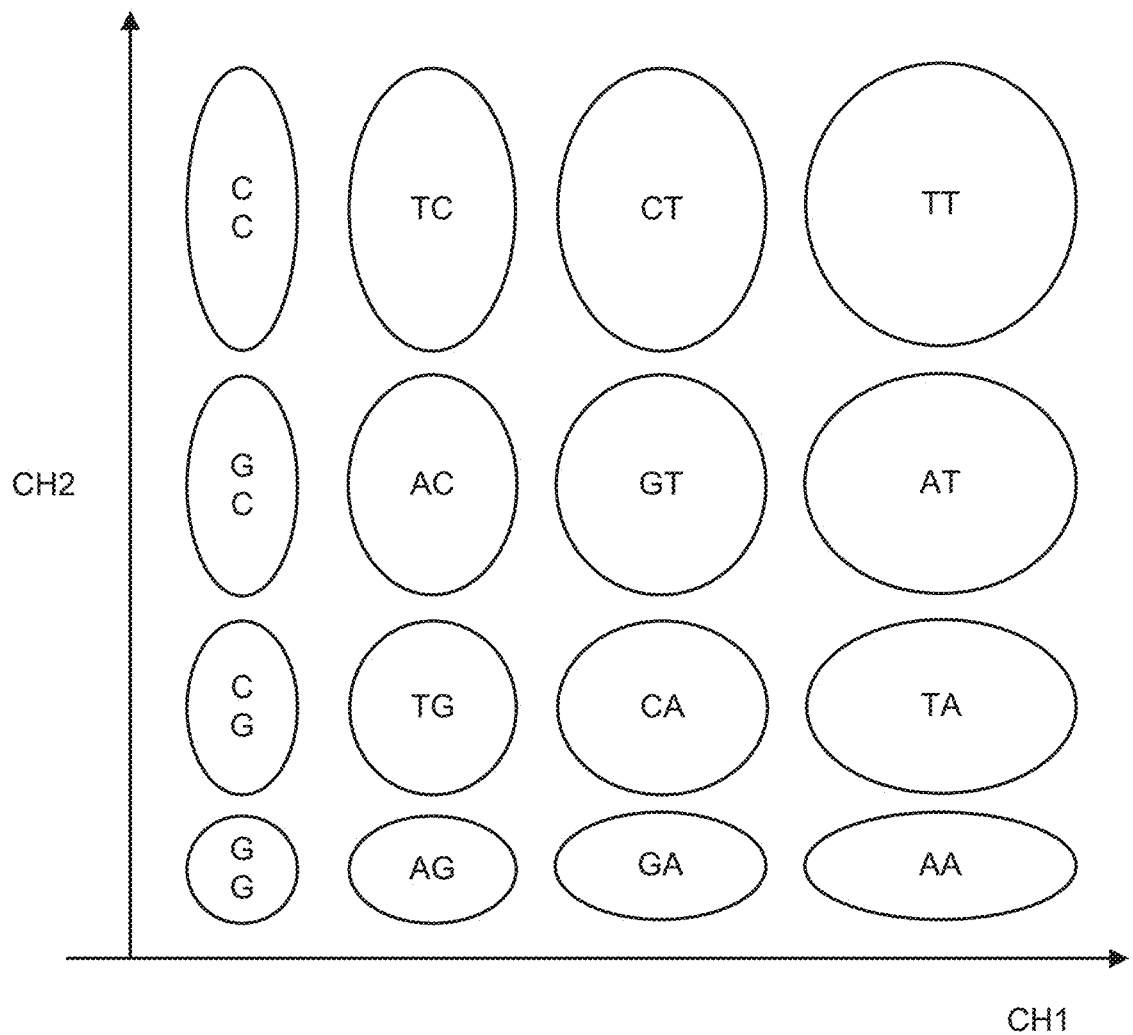
FIG. 5 depicts an example base calling chart based on two channel signal strengths detected by a single pixel from two nanowells that provide substantially different "on" cluster signal strengths.

FIG. 4 depicts an example scatter chart of two channel signal strengths detected by a single pixel from two nanowells that provide substantially different "on" cluster signal strengths. The scatter chart in FIG. 4 shows sixteen (16) distinct clouds of cluster signals at example intensities. FIG. 5 depicts an example base calling chart based on two channel signal strengths detected by a single pixel from two nanowells that provide substantially different "on" cluster signal strengths. By using two channels (such as, for example, detecting two different wavelengths of emissive light), a particular base in a DNA sequence (for example, adenine (A), guanine (G), cytosine (C), and thymine (T)) may be determined for each cluster/well. For example, detecting a first wavelength of light, but not a second wavelength of light may indicate that the base of interest is cytosine (C); detecting a second wavelength of light, but not a first wavelength of light may indicate that the base of interest is adenine (A); detecting both a first and a second wavelength of light may indicate that the base of interest is thymine (T); and detecting neither a first nor a second wavelength of light may indicate that the base of interest is guanine (G).

Figure 6:
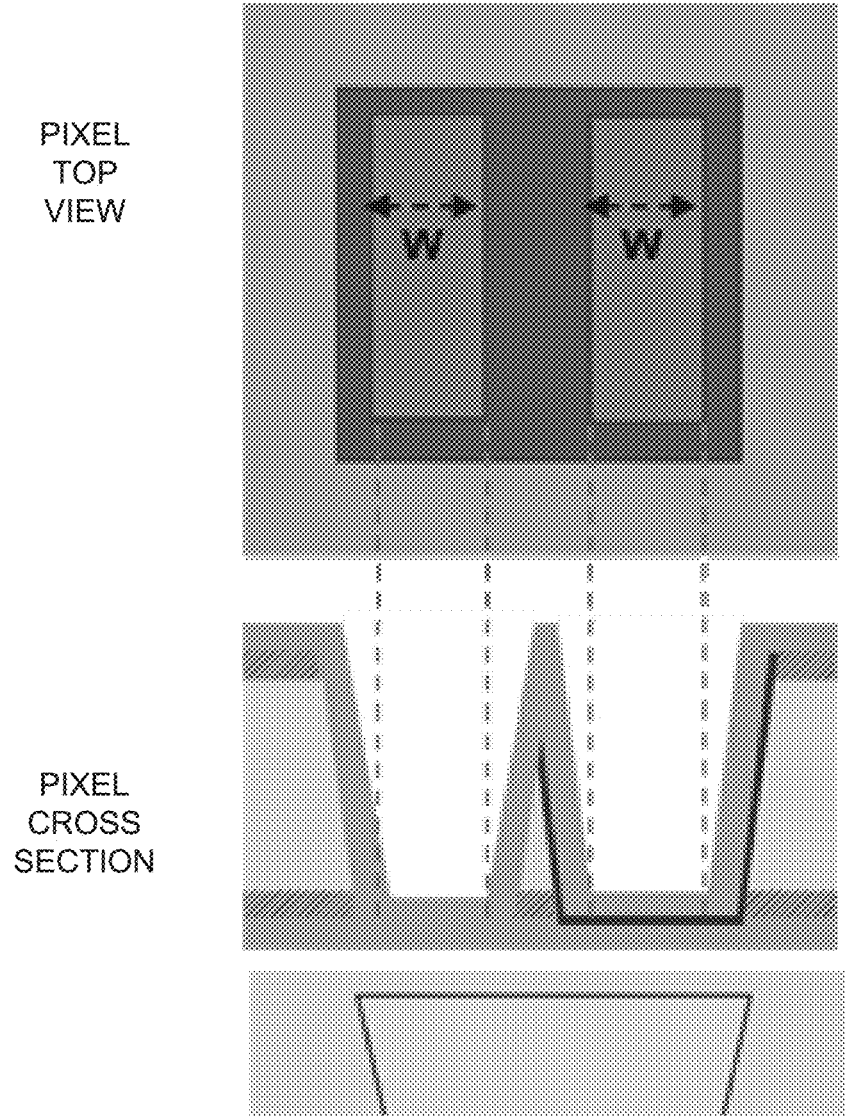
FIG. 6 depicts a top and cross-section view of a portion of a CMOS sensor with nanowells of substantially similar size.

FIG. 6 depicts a top and cross-section view of a portion of a CMOS sensor with nanowells of substantially similar size. As shown in this figure, each of the two nanowells (which may support a cluster of interest, for example, a monoclonal cluster of DNA strands), have the same length and width. However, one of the nanowells, but not the other nanowell, has a filter that attenuates the signal by about 50%. The filter is shown as a black layer (depicted in darker uniform shading in monochrome) below the top surface of the nanowell. While the nanowells in the figures may be shown as rectangular, other shaped nanowells are possible, for example, circular, oval, hexagonal, octagonal, etc. The blue material (depicted in the lighter uniform shading in monochrome) may also be a metal material that attenuates signals. The yellow and gray materials (depicted in the hatching pattern) may be dielectric materials.

Figure 7:
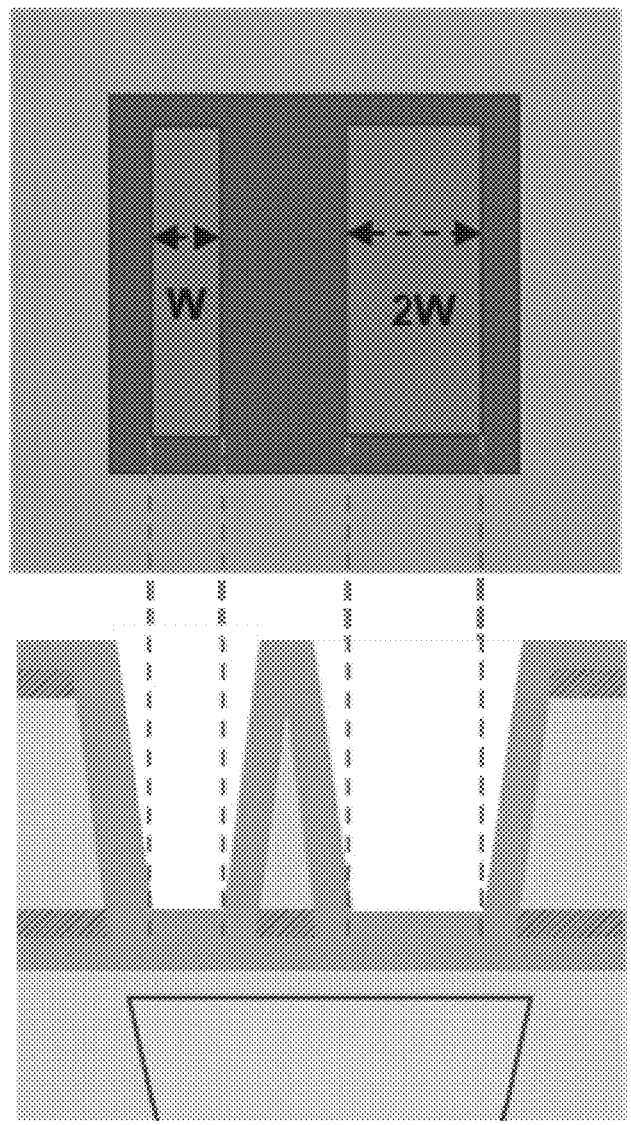
FIG. 7 depicts a top and cross-section view of a portion of a CMOS sensor with nanowells of substantially different size.

FIG. 7 depicts a top and cross-section view of a portion of a CMOS sensor with nanowells of substantially different size. As shown in this figure, each of the two nanowells (which may support a cluster of interest, for example, a monoclonal cluster of DNA strands), have a different width; the left nanowell having half the width of the right nanowell. This may limit the size of the cluster of interest, which may in turn limit the cluster signal emitted by the cluster when an analyte of interest is present. For example, if a first nanowell is twice the size of a second nanowell, the first nanowell may produce twice the cluster signal strength compared to the second nanowell.

Figure 8:
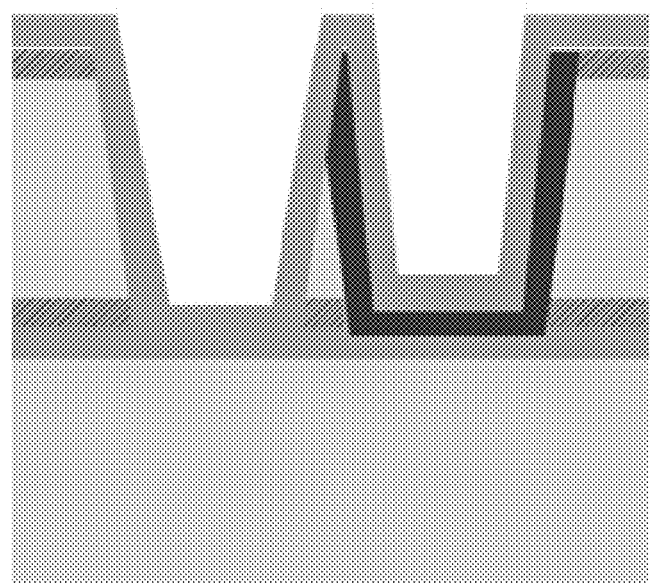
FIG. 8 depicts a cross-section view of a portion of a CMOS sensor with one of two nanowells having a filter to attenuate a cluster signal.

FIG. 8 depicts a cross-section view of a portion of a CMOS sensor with one of two nanowells having a filter to attenuate a cluster signal. A second nanowell may have a filter layer disposed below, and in some examples, immediately below, the surface of the second nanowell, where this layer is not present in the first nanowell. Other examples may have additional layers or materials that reside between the surface of the nanowell and the filter layer. The nanowell on the right of this FIG. 8 is shown with the additional layer. This filter layer may be a thin metallic layer. The filter layer should be compatible with the fabrication process of the CMOS sensor. In some examples, the filter layer attenuates about 50% (half) of the cluster signal emitted from the cluster when an analyte of interest is present. The filter layer may comprise or be composed of tantalum.

Figure 9:
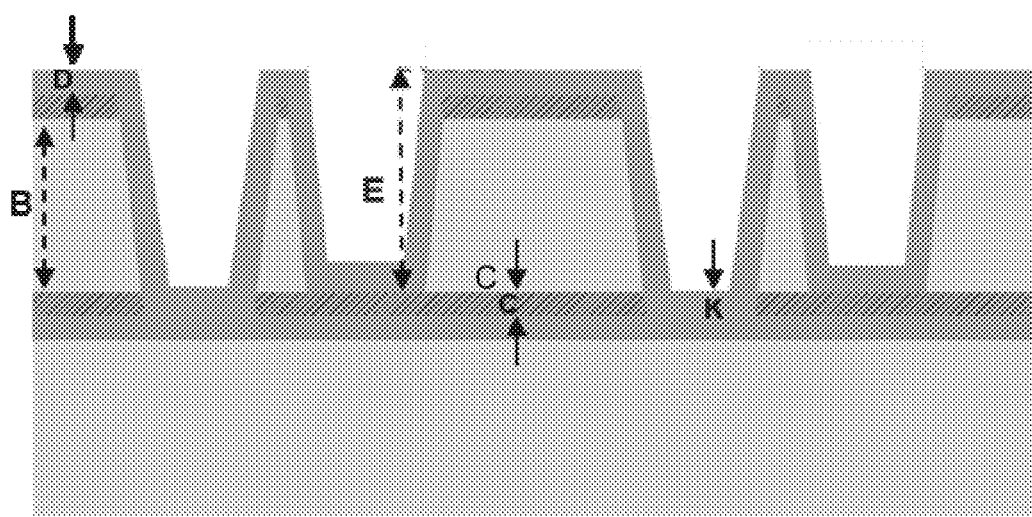
FIG. 9 depicts a cross-section view of a portion of another CMOS sensor with one of two nanowells having a filter to attenuate a cluster signal.

FIG. 9 depicts a cross-section view of a portion of another CMOS sensor with one of two nanowells having a filter to attenuate a cluster signal. One of the layers of the CMOS Sensor may a filter layer. However, this filter layer may be removed beneath a first, but not a second, of the two nanowells over a single pixel. This configuration may therefore not attenuate the cluster signal emitted from the first nanowell. In this figure, the blue layer identified by the letter C is the filter layer.

Figure 10:
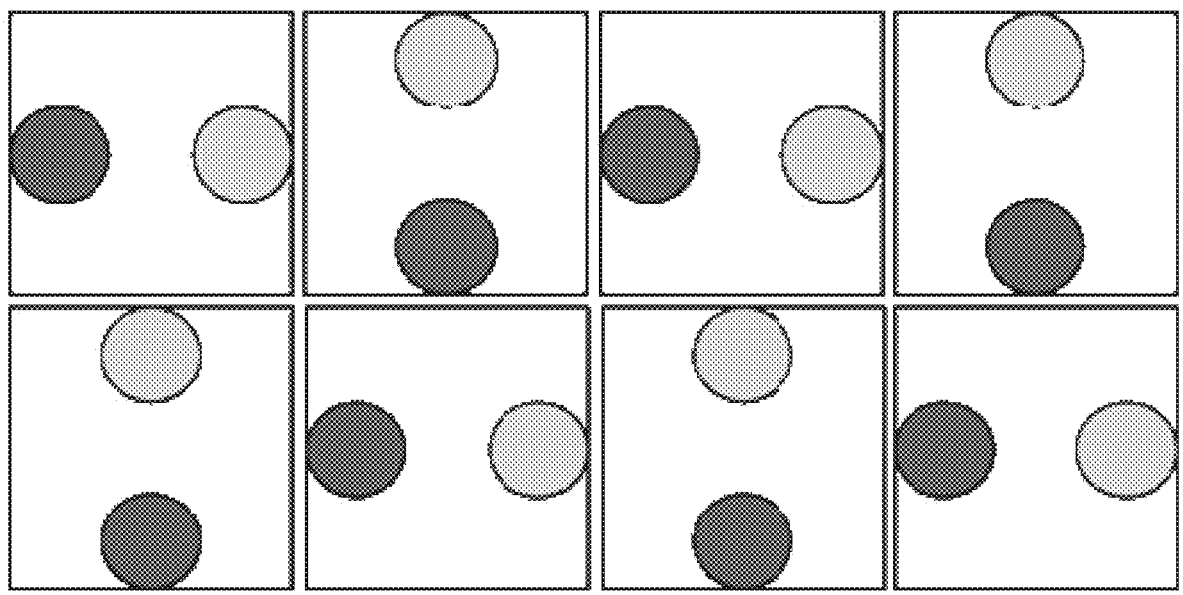
FIG. 10 depicts a top view of a portion of a CMOS sensor showing the arrangement of nanowells over adjacent pixels.
Figure 11:
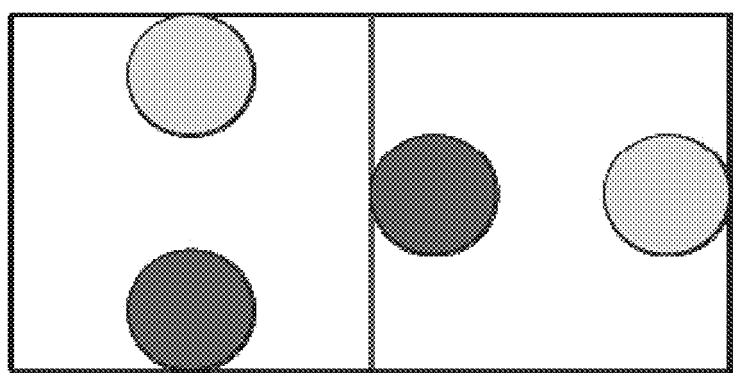
FIG. 11 depicts a top view and corresponding cross-section view of a portion of a CMOS sensor showing the arrangement of nanowells over adjacent pixels.
Figure 11:
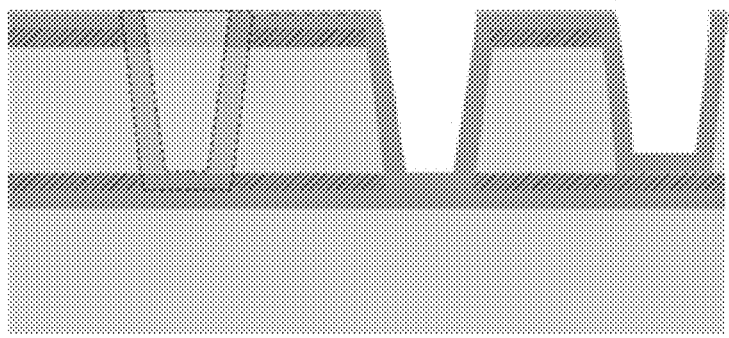

FIG. 10 depicts a top view of a portion of a CMOS sensor showing the arrangement of nanowells over adjacent pixels. FIG. 11 depicts a top view and corresponding cross-section view of a portion of a CMOS sensor showing the arrangement of nanowells over adjacent pixels. The green circles represent the attenuated wells (that is, the nanowells in which the cluster signal is attenuated), while the blue circles represent the unattenuated wells (that is, the nanowells in which the cluster signal is not attenuated). In some examples, it may be preferable to maximize the distance between the nanowells, for example, in an effort to reduce crosstalk detected by the pixel sensor from adjacent wells. FIGS. 10 and 11 depict perpendicular nanowell orientations between adjacent pixels. For example, if a first pixel has a nanowell orientation from left to right, the second pixel adjacent to the first pixel may have a nanowell orientation from top to bottom.

FIG. 12 is a chart showing the number of clusters (or nanowells or reaction sites) over a single pixel with a corresponding number of scatter plot clouds and signal strength. As the number of clusters over a single pixel increases, the number of different signal strengths as well as amplitude of signal strengths required to determine an on or off condition for each cluster may increase.

Referring to the description accompanying FIG. 1-12, a pixel sensor of a pixel herein can alternatively be termed a light sensor or a light detector, and a light sensor of a pixel can alternatively be termed a pixel sensor or a light detector and a light detector of a pixel herein can alternatively be termed a sensor or a light detector. Referring to the description accompanying FIGS. 1-12, a filter for attenuating light can alternatively be termed an attenuator and a filter layer for attenuating light can alternatively be referred to as an attenuating layer or attenuating material layer.

Examples herein recognize that image sensor structures, such as complementary metal-oxide-semiconductor (CMOS) sensors, may be coupled with microfluidic devices to form a sensor system. The sensor system may be, for example, a biosensor system. Such sensor systems often utilize high density arrays of nanowells disposed in a top layer of a passivation stack of one or more layers (herein the "passivation stack") of the image sensor structure to perform controlled reaction protocols on polynucleotide strands disposed within the nanowells. The reaction protocols may, for example, determine the order of nucleotides within the strands.

Examples herein recognize that in an example of such a reaction protocol, polynucleotide strands (such as clusters of DNA fragments, nucleic-acid molecular chains, or the like) that are disposed in a nanowell array of an image sensor structure may be tagged with an identifiable label (such as a fluorescently labeled nucleotide base) that is delivered to the strands via fluid flow through a flow cell. One or more excitation lights may then be directed onto the cluster(s) of labeled strands within the nanowells. The labeled strands may then emit photons of an emissive light, indicative of the order of nucleotide bases in the strand, which may be transmitted through the passivation stack and into light guides of the image sensor structure that are associated with (e.g., located below) each nanowell.

Examples herein recognize with reference to the described example that the light guides direct the emissive light photons to light detectors (each light guide and associated light detector sometimes referred to as a pixel) disposed within the image sensor structure and associated with the light guides. The light detectors detect the emissive light photons. Device circuitry within the image sensor structure then processes and transmits data signals using those detected photons. The data signals may then be analyzed to reveal the sequence of nucleotide bases within the strands. An example of such a sequencing process is sequencing-by-synthesis (SBS) or cyclic-array sequencing.

Examples herein recognize that achieving higher cluster density (and therefore, higher detection throughput) on CMOS sensors is a difficult task. Examples herein recognize that decreasing pixel pitch (that is, the spacing or periodic distance of each pixel) below 0.7 µm is becoming more difficult. Examples herein recognize that an option to increase cluster density without reducing the pixel size is by configuring the CMOS sensor in such a way that multiple clusters can be detected per pixel, that is, by a single light detector of the CMOS sensor.

Examples herein recognize that since each pixel has only one light detector which measures the number of photons incident on the light detector, distinguishing the signal coming from multiple clusters is not possible by simply adding more than one cluster to a pixel. Examples herein recognize that methods and/or structures to distinguish the signal generated from different clusters on a single pixel is required.

There is set forth herein with reference to the examples of FIGS. 1-12 an apparatus, wherein respective pixels and pixels sensors of the apparatus have associated thereto first and second nanowells. The first and second nanowells associated to the respective pixels and pixel sensors can be configured so that a cluster signal "on" state signal emitted from the second nanowell is greater than a cluster signal "on" state signal emitted from the first nanowell. For configuring the apparatus so that cluster signal "on" state signal of the second nanowell is differentiated from a cluster signal "on" state signal of the first nanowell, the second nanowell can be configured differently from the first nanowell. In the examples of FIGS. 6, 8-11, the first and second nanowells can be configured so that attenuation of emission light from the first nanowell is increased relative to an attenuation of emission light from the second nanowell. In the examples of FIGS. 6, 8-11, the apparatus can be configured with use of attenuating material so that attenuation of emission light from the first nanowell is increased relative to an attenuation of emission light from the second nanowell. In the example of FIGS. 6, 8-11, the apparatus can be configured so that the first nanowell includes an attenuator and the second nanowell is absent of an attenuator. In the examples of FIGS. 6, 8-11, the apparatus can be configured so that the first nanowell includes an attenuator for attenuating emission light radiating vertically downward from a bottom surface of the first nanowell and wherein the second nanowell is absent of an attenuator for attenuating emission light radiating vertically downward from a bottom surface of the second nanowell. In the examples of FIGS. 6, 8-11, the apparatus can be configured so that the first nanowell includes in an area below a bottom surface of the first nanowell an attenuator, and wherein the second nanowell in an area below a bottom surface of the second nanowell is absent of an attenuator. In the examples of FIGS. 7 and 11, the apparatus can be configured so that an attenuating material layer extends in an area defining the first nanowell below a bottom surface of the first nanowell but is absent from an area defining the second nanowell below a bottom surface of the second nanowell. In the examples of FIGS. 6, 8-11, the apparatus can be configured so the first nanowell includes in an area directly below a bottom surface of the first nanowell an attenuator, and wherein the second nanowell in an area directly below a bottom surface is absent of an attenuator. In the examples of FIGS. 6, 8-11, the apparatus can be configured so that the first nanowell includes in an area aligned with and below a bottom surface of the first nanowell an attenuator, and wherein the second nanowell is absent of an attenuator in an area aligned with and below a bottom surface of the second nanowell. In the example of FIG. 7, for configuring the second nanowell so that a cluster signal "on" state signal emitted from the second nanowell is greater than an "on" state signal emitted from the second nanowell, the second nanowell can include a larger size that the first nanowell. In one example, the second nanowell having the larger size than the first nanowell can have a larger width than the first nanowell. In one example, the second nanowell having the larger size than the first nanowell can have a larger bottom surface width than the first nanowell. In one example, the second nanowell having the larger size than the first nanowell can have a larger bottom surface area than the first nanowell. As set forth in reference to FIGS. 1-12, for configuring the apparatus so that cluster signal "on" state signals emitted from first and second nanowells are differentiated, the first nanowell can include an attenuator and the second nanowell can be absent of an attenuator, and additionally or alternatively, the first attenuator and the second attenuator have different sizes. As described in reference to FIGS. 10 and 11, adjacent pixels and pixel sensors of an apparatus can have associated thereto respective first and second nanowells, and the orientation of the first and second nanowells can be differentiated between the adjacent pixels and pixel sensors. The first and second nanowell associated to a first pixel and pixel sensor can have a first orientation, and the first and second nanowell associated to a second pixel and pixel sensor adjacent to the first pixel and pixel sensor can have a second orientation. In FIGS. 10 and 11, the first orientation can be defined by the first and second nanowells having a back to front spacing from a top view, and the second orientation can be defined by the first and second nanowells having a side to side spacing from a top view. The varying orientations between adjacent pixels and pixel sensors of the apparatus can increase a spacing distance between nanowells associated to adjacent pixels relative to a spacing distance between nanowells associated to adjacent pixels in the absence of the varying orientations. With reference to FIGS. 10-12, it is seen that second to Nth pixels of the plurality of pixels can have associated first and second reaction sites that are respectively configured according to the first reaction site and the second reaction site associated to a first pixel, wherein the first and second reaction sites associated to adjacent pixels of the plurality of pixels have first and second different respective orientations relative to their respective pixels, the first and second different respective orientations increasing a spacing distance between reaction sites from adjacent pixel locations relative to a spacing distance between reaction sites from adjacent pixel locations in the absence of the respective orientations.

A small sample of combinations set forth hereinabove in the Detailed Description with reference to FIGS. 1-12 include the following: (A1) An apparatus comprising: a first reaction site and a second reaction site over a single pixel, where the pixel comprises a light detector; (A2) The apparatus of A1, wherein the first reaction site is a first nanowell, and the second reaction site is a second nanowell; (A3) The apparatus of A2, wherein the first nanowell is half the size of the second nanowell; (A4) The apparatus of any of A1 or A2, wherein a filter resides between the first reaction site and the single pixel; (A5) The apparatus of A4, wherein the filter does not reside between the second reaction site and the single pixel; (A6) The apparatus of any of A4 or A5, wherein the filter attenuates a cluster signal emitted from the first reaction site by about 50%; (A7) The apparatus of any of A4 through A6, wherein the filter is a thin metallic layer; (A8) The apparatus of any of A4 through A7, wherein the filter comprises tantalum. A small sample of combinations set forth hereinabove in the Detailed Description with reference to FIGS. 1-12 include the following: A method comprising:

detecting a signal emitted from a first reaction site and a second reaction site; determining the identity of a first analyte of interest in a first reaction site using an amplitude of the detected signal; and determining the identity of a second analyte of interest in a second reaction site using the amplitude of the detected signal. A small sample of combinations set forth hereinabove in the Detailed Description with reference to FIGS. 1-12 include the following: (C1) An apparatus comprising: a plurality of pixels; a first reaction site associated to a pixel of the plurality of pixels; second reaction site associated to the pixel; wherein a pixel sensor of the pixel detects a read signal, the read signal being dependent on a first cluster signal emitted from the first reaction site and on a second cluster signal emitted from the second cluster site; and wherein the first reaction site and the second reaction site are configured so that the second cluster signal in an "on" state has a greater amplitude than the first cluster signal in an "on" state; (C2) The apparatus of C1, wherein the apparatus determines identities of respective analytes in the first reaction site and the second reaction site using a calling chart that maps signal amplitudes of the read signal under different illumination conditions to identities of respective analytes in the first reaction site and the second reaction site; (C3) The apparatus of C1, wherein the apparatus determines identities of respective analytes in the first reaction site and the second reaction site using a sixteen (16) cloud calling chart that maps signal amplitudes of the read signal under different illumination conditions to identities of respective analytes in the first reaction site and the second reaction site; (C4) The apparatus of any of C1 through C3, wherein a ratio of the second cluster signal in an "on" state to the first cluster signal in an "on" state is at least about 1.4; (C5) The apparatus of any of C1 though C3, wherein a ratio of the second cluster signal in an "on" state to the first cluster signal in an "on" state is between about 1.9 to about 2.0; (C6) The apparatus of any of C1 through C5, wherein the second reaction site has a larger size than the first reaction site so that the second cluster signal in the "on" state has a greater amplitude than the first cluster signal in the "on" state; (C7) The apparatus of any of C1 through C6, wherein the second reaction site has a larger width than the first reaction site so that the second cluster in the "on" state has a greater amplitude than the first cluster signal in the "on" state; (C8) The apparatus of any of C1 through C7, wherein the second reaction site is absent an attenuator, and wherein the first reaction site includes an attenuator so that the second cluster signal in the "on" state has a greater amplitude than the first cluster signal in the "on" state; (C9) The apparatus of any of C1 through C8, wherein, by an arrangement of attenuating material, attenuation of emission light rays radiating from the first reaction site is greater than attenuation of emission light rays radiating from the second reaction site so that the second cluster signal in the "on" state has a greater amplitude than the first cluster signal in the "on" state; (C10) The apparatus of C9, wherein the attenuating material comprises metal; (C11) The apparatus of C9, wherein the attenuating material comprises tantalum; (C12) The apparatus of any of C1 through C11, wherein the second reaction site is absent an attenuator aligned with and below a bottom surface of the second reaction site, and wherein the first reaction site includes an attenuator aligned with and below a bottom surface of the first reaction site so that the second cluster signal in the "on" state has a greater amplitude than the first cluster signal in the "on" state; (C13) The apparatus of any of C1 through C12, wherein the second reaction site is absent an attenuator intersected by a vertically extending center axis of the first reaction site, and wherein the first reaction site includes an attenuator intersected by a vertically extending center axis of the first reaction site so that the second cluster signal in the "on" state has a greater amplitude than the first cluster signal in the "on" state; (C14) The apparatus of any of C1 through C14, wherein the second reaction site is absent an attenuator for attenuating emission light rays radiating vertically downward from a bottom surface of the second reaction site, and wherein the first reaction site includes attenuator for attenuating emission light rays radiating vertically downward from a bottom surface of the first reaction site so that the second cluster signal in the "on" state has a greater amplitude than the first cluster signal in the "on" state; (C15) The apparatus of any of C1 through C14, wherein the apparatus includes an attenuating material layer that extends through an area aligned with and below a bottom surface of the first reaction site to define an attenuator of the first reaction site, the attenuating material layer being absent of a section that extends through an area aligned with and below the second reaction site; (C16) The apparatus of any of C1 through C15, wherein the first reaction site is defined by a first nanowell, and wherein the second reaction site is defined by a second nanowell; (C17) The apparatus of C16, wherein the second nanowell has a larger size than the first nanowell so that the second cluster signal in the "on" state has a greater amplitude than the first cluster signal in the "on" state; (C18) The apparatus of any of C16 through C17, wherein the second nanowell has a larger width than the first nanowell so that the second cluster in the "on" state has a greater amplitude than the first cluster signal in the "on" state; (C19) The apparatus of any of C16 through C18, wherein the second nanowell is absent an attenuator, and wherein the first nanowell includes an attenuator so that the second cluster signal in the "on" state has a greater amplitude than the first cluster signal in the "on" state; (C20) The apparatus of any of C16 through C19, wherein the attenuator of the first nanowell has an upwardly extending section; (C21) The apparatus of any of C16 through C20, wherein the attenuator of the first nanowell has an upwardly extending section running in parallel with a circumferential sidewall of the first nanowell; (C22) The apparatus of any of C16 through C21, wherein, by an arrangement of attenuating material, attenuation of emission light rays radiating from the first nanowell is greater than attenuation of emission light rays radiating from the second nanowell so that the second cluster signal in the "on" state has a greater amplitude than the first cluster signal in the "on" state; (C23) The apparatus of C22, wherein the attenuating material comprises metal; (C24) The apparatus of C22, wherein the attenuating material comprises tantalum; (C25) The apparatus any of C16 through C24, wherein the second nanowell is absent an attenuator aligned with and below a bottom surface of the second nanowell, and wherein the first nanowell includes an attenuator aligned with and below a bottom surface of the first nanowell so that the second cluster signal in the "on" state has a greater amplitude than the first cluster signal in the "on" state; (C26) The apparatus any of C16 through C25, wherein the second nanowell is absent an attenuator intersected by a vertically extending center axis of the first nanowell, and wherein the first nanowell includes an attenuator intersected by a vertically extending center axis of the first nanowell so that the second cluster signal in the "on" state has a greater amplitude than the first cluster signal in the "on" state; (C27) The apparatus of any of C16 through C16, wherein the second nanowell is absent an attenuator for attenuating emission light rays radiating vertically downward from a bottom surface of the second nanowell, and wherein the first nanowell includes an attenuator for attenuating emission light rays radiating vertically downward from a bottom surface of the first nanowell so that the second cluster signal in the "on" state has a greater amplitude than the first cluster signal in the "on" state; (C28) The apparatus of any of C16 through C27, wherein the apparatus includes an attenuating material layer that extends through an area aligned with and below a bottom surface of the first nanowell to define an attenuator of the first reaction site, the attenuating material layer being absent of a section that extends through an area aligned with and below the second nanowell; (C29) The apparatus any of C16 through C28, wherein second to Nth pixels of the plurality of pixels have associated first and second reaction sites that are respectively configured according to the first reaction site and the second reaction site associated to the pixel, wherein the first and second reaction sites associated to adjacent pixels of the plurality of pixels have first and second different respective orientations relative to their respective pixels, the first and second different respective orientations increasing a spacing distance between reaction sites from adjacent pixel locations relative to a spacing distance between reaction sites from adjacent pixel locations in the absence of the different respective orientations; (C30) The apparatus any of C16 through C29, wherein second to Nth pixels of the plurality of pixels have associated first and second reaction sites that are respectively configured according to the first reaction site and the second reaction site associated to the pixel, wherein the first and second reaction sites associated to adjacent pixels of the plurality of pixels have first and second different respective orientations relative to their respective pixels, the first respective different orientation characterized by back to front spacing between reaction sites, the second respective different orientation characterized by side to side spacing between reaction sites; (C31) The apparatus of C29 or C30, wherein the second to Nth pixels is second to one millionth pixels. A small sample of combinations set forth hereinabove in the Detailed Description with reference to FIGS. 1-12 include the following: (D1) A method comprising: detecting, using a pixel sensor of a plurality of pixels sensors, a read signal, the read signal being dependent on a first cluster signal emitted from a first reaction site associated to the pixel sensor and on a second cluster signal emitted from a second reaction site associated to the pixel sensor; determining an identity of a first analyte of interest in the first reaction site using an amplitude of the read signal detected using the pixel sensor; and determining an identity of a second analyte of interest in the second reaction site using the amplitude of the read signal detected using the pixel sensor; (D2) The method of D1, wherein the determining the identity of a first analyte of interest in the first reaction site using an amplitude of the read signal detected using the pixel sensor and the determining the identity of a second analyte of interest in the second reaction site using the amplitude of the detected read signal includes using a calling chart that maps signal amplitudes of the read signal under different illumination conditions to identities of respective analytes in the first reaction site and the second reaction site; (D3) The method of D1, wherein the determining the identity of a first analyte of interest in the first reaction site using an amplitude of the read signal detected using the pixel sensor and the determining the identity of a second analyte of interest in the second reaction site using the amplitude of the detected read signal includes using a calling chart having sixteen (16) signal clouds that map signal amplitudes of the read signal under different illumination conditions to identities of respective analytes in the first reaction site and the second reaction site; (D4) The method of any of D1 through D3, wherein the first reaction site and the second reaction site are configured so that the second cluster signal in an "on" state has a greater amplitude than the first cluster signal in an "on" state; (D5) The method of any of D1 through D4, wherein the second reaction site has a larger size than the first reaction site so that the second cluster signal in the "on" state has a greater amplitude than the first cluster signal in the "on" state; (D6) The method of any of D1 through D5, wherein a ratio of the second cluster signal in an "on" state to the first cluster signal in an "on" state is at least about 1.4; (D7) The method of any of D1 through D6, wherein a ratio of the second cluster signal in an "on" state to the first cluster signal in an "on" state is between about 1.9 to about 2.0; (D8) The method of any of D1 through D7, wherein the second reaction site has a larger width than the first reaction site so that the second cluster in the "on" state has a greater amplitude than the first cluster signal in the "on" state; (D9) The method of any of D1 through D8, wherein the second reaction site is absent an attenuator, and wherein the first reaction site includes an attenuator so that the second cluster signal in the "on" state has a greater amplitude than the first cluster signal in the "on" state; (D10 The method of any of D1 through D9, wherein, by an arrangement of attenuating material, attenuation of emission light rays radiating from the first reaction site is greater than attenuation of emission light rays radiating from the second reaction site so that the second cluster signal in the "on" state has a greater amplitude than the first cluster signal in the "on" state; (D11) The method of D10, wherein the attenuating material comprises metal; (D12) The method of D10, wherein the attenuating material comprises tantalum; (D13) The method of any of D1 through D12, wherein the second reaction site is absent an attenuator aligned with and below a bottom surface of the second reaction site, and wherein the first reaction site includes an attenuator aligned with and below a bottom surface of the first reaction site so that the second cluster signal in the "on" state has a greater amplitude than the first cluster signal in the "on" state; (D14) The method of any of D1 through D13, wherein the second reaction site is absent an attenuator intersected by a vertically extending center axis of the first reaction site, and wherein the first reaction site includes an attenuator intersected by a vertically extending center axis of the first reaction site so that the second cluster signal in the "on" state has a greater amplitude than the first cluster signal in the "on" state; (D15) The method of any of D1 though D14, wherein the second reaction site is absent an attenuator for attenuating emission light rays radiating vertically downward from a bottom surface of the second reaction site, and wherein the first reaction site includes attenuator for attenuating emission light rays radiating vertically downward from a bottom surface of the first reaction site so that the second cluster signal in the "on" state has a greater amplitude than the first cluster signal in the "on" state; (D16) The method of any of D1 through D15, wherein an attenuating material layer that extends through an area aligned with and below a bottom surface of the first reaction site defines an attenuator of the first reaction site, the attenuating material layer being absent of a section that extends through an area aligned with and below the second reaction site; (D17) The method of any of D1 through D16, wherein the first reaction site is defined by a nanowell, and wherein the second reaction site is defined by a nanowell; (D18) The method of D17, wherein the second nanowell has a larger size than the first nanowell so that the second cluster signal in the "on" state has a greater amplitude than the first cluster signal in the "on" state; (D19) The method of any of D17 through D18, wherein the second nanowell has a larger width than the first nanowell so that the second cluster in the "on" state has a greater amplitude than the first cluster signal in the "on" state; (D20) The method of any of D17 through D19, wherein the second nanowell is absent an attenuator, and wherein the first nanowell includes an attenuator so that the second cluster signal in the "on" state has a greater amplitude than the first cluster signal in the "on" state; (D22) The method of any of D17 through D20, wherein the attenuator of the first nanowell has an upwardly extending section; (D23) The method of any of D17 through D21, wherein the attenuator of the first nanowell has an upwardly extending section running in parallel with a circumferential sidewall of the first nanowell; (D24) The method of any of D17 through D22, wherein, by an arrangement of attenuating material, attenuation of emission light rays radiating from the first nanowell is greater than attenuation of emission light rays radiating from the second nanowell so that the second cluster signal in the "on" state has a greater amplitude than the first cluster signal in the "on" state; (D25) The method of D24, wherein the attenuating material comprises metal; (D26) The method of D24, wherein the attenuating material comprises tantalum; (D27) The method of any of D17 through D26, wherein the second nanowell is absent an attenuator aligned with and below a bottom surface of the second nanowell, and wherein the first nanowell includes an attenuator aligned with and below a bottom surface of the first nanowell so that the second cluster signal in the "on" state has a greater amplitude than the first cluster signal in the "on" state; (D28) The method of any of D17 through D27, wherein the second nanowell is absent an attenuator intersected by a vertically extending center axis of the first nanowell, and wherein the first nanowell includes an attenuator intersected by a vertically extending center axis of the first nanowell so that the second cluster signal in the "on" state has a greater amplitude than the first cluster signal in the "on" state; (D29) The method of any of D17 through D28, wherein the second nanowell is absent an attenuator for attenuating emission light rays radiating vertically downward from a bottom surface of the second nanowell, and wherein the first nanowell includes attenuator for attenuating emission light rays radiating vertically downward from a bottom surface of the first nanowell so that the second cluster signal in the "on" state has a greater amplitude than the first cluster signal in the "on" state; (D30) The method of any of D17 through D29, wherein the apparatus includes an attenuating material layer that extends through an area aligned with and below a bottom surface of the first nanowell to define an attenuator of the first reaction site, the attenuating material layer being absent of a section that extends through an area aligned with and below the second nanowell; (D31) The method of any of D1 through D30, wherein the plurality of pixel sensors are associated, respectively, to a plurality of pixels, and wherein the pixel sensor defines a pixel of the plurality of pixels, and wherein the first reaction site and the second reaction site are associated to the pixel, wherein second to Nth pixels of the plurality of pixels have associated first and second reaction sites that are respectively configured according to the first reaction site and the second reaction site associated to the pixel, wherein the first and second reaction sites associated to adjacent pixels of the plurality of pixels have first and second different respective orientations relative to their respective pixels, the first and second different respective orientations increasing a spacing distance between reaction sites from adjacent pixel locations relative to a spacing distance between reaction sites from adjacent pixel locations in the absence of the different respective orientations; (D32) The method of any of D1 through D31, wherein the plurality of pixel sensors are associated, respectively, to a plurality of pixels, and wherein the pixel sensor defines a pixel of the plurality of pixels, and wherein the first reaction site and the second reaction site are associated to the pixel, wherein second to Nth pixels of the plurality of pixels have associated first and second reaction sites that are respectively configured according to the first reaction site and the second reaction site associated to the pixel, wherein the first and second reaction sites associated to adjacent pixels of the plurality of pixels have first and second different respective orientations relative to their respective pixels, the first respective different orientation characterized by back to front spacing between reaction sites, the second respective different orientation characterized by side to side spacing between reaction sites. (D33) The method any of D1 through D32, wherein the apparatus includes an attenuating material layer that includes a first section that extends through an area aligned with and below a bottom surface of the first nanowell to define an attenuator of the nanowell, and second sections extending adjacently laterally from the first section, the first section having first thickness, the second sections having a second thickness, the first thickness less than the second thickness. A small sample of combinations set forth hereinabove in the Detailed Description with reference to FIGS. 1-12 include the following: (E1) An apparatus comprising: a plurality of pixels; a first reaction site associated to a pixel of the plurality of pixels; second reaction site associated to the pixel; wherein a pixel sensor of the pixel detects a read signal, the read signal being dependent on a first cluster signal emitted from the first reaction site and on a second cluster signal emitted from the second cluster site; and wherein the second reaction site has a larger size than the first reaction site so that the second cluster signal in the "on" state has a greater amplitude than the first cluster signal in the "on" state. A small sample of combinations set forth hereinabove in the Detailed Description with reference to FIGS. 1-12 include the following: (F1) An apparatus comprising: a plurality of pixels; a first reaction site associated to a pixel of the plurality of pixels; second reaction site associated to the pixel; wherein a pixel sensor of the pixel detects a read signal, the read signal being dependent on a first cluster signal emitted from the first reaction site and on a second cluster signal emitted from the second cluster site; and wherein the second reaction site has a larger width than the first reaction site so that the second cluster in the "on" state has a greater amplitude than the first cluster signal in the "on" state. A small sample of combinations set forth hereinabove in the Detailed Description with reference to FIGS. 1-12 include the following: (G1) An apparatus comprising: a plurality of pixels; a first reaction site associated to a pixel of the plurality of pixels; second reaction site associated to the pixel; wherein a pixel sensor of the pixel detects a read signal, the read signal being dependent on a first cluster signal emitted from the first reaction site and on a second cluster signal emitted from the second cluster site; and wherein the second reaction site is absent an attenuator, and wherein the first reaction site includes an attenuator so that the second cluster signal in the "on" state has a greater amplitude than the first cluster signal in the "on" state. A small sample of combinations set forth hereinabove in the Detailed Description with reference to FIGS. 1-12 include the following: (H1) An apparatus comprising: a plurality of pixels; a first reaction site associated to a pixel of the plurality of pixels; second reaction site associated to the pixel; wherein a pixel sensor of the pixel detects a read signal, the read signal being dependent on a first cluster signal emitted from the first reaction site and on a second cluster signal emitted from the second cluster site; and wherein, by an arrangement of attenuating material, attenuation of emission light rays radiating from the first reaction site is greater than attenuation of emission light rays radiating from the second reaction site so that the second cluster signal in the "on" state has a greater amplitude than the first cluster signal in the "on" state.

Figure 13:
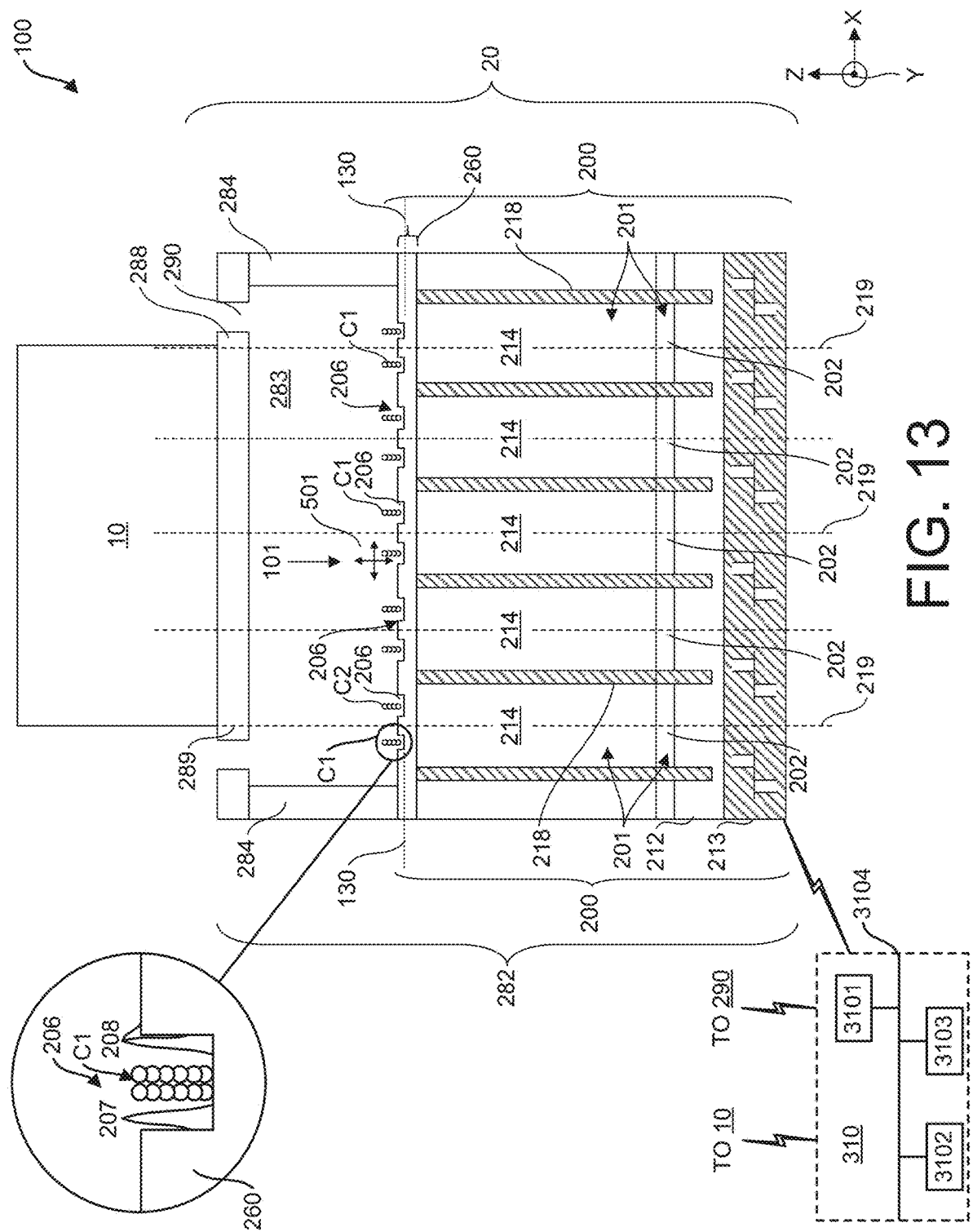
FIG. 13 is a front cross sectional schematic view of an apparatus for use in analysis.

In FIG. 13 there is shown an apparatus 100 for use in analysis, such as biological or chemical analysis. Apparatus 100 can include light energy exciter 10 and flow cell 282. Flow cell 282 can include detector 200 and an area above detector 200. Detector 200 can include a plurality of pixels 201 and detector surface 208 for supporting clusters C1, C2 such as biological or chemical samples subject to test. Sidewalls 284 and flow cover 288, as well as detector 200 having detector surface 208, can define and delimit flow channel 283. Detector surface 208 can have an associated detector surface plane 130. Respective pixels 201 can include a light guide 214 and a pixel sensor 202.

In a further aspect, detector surface 208 can be configured to define reaction sites 206 which, in one example, can be provided by nanowells 207. According to one example, each reaction site 206 can be associated to a certain pixel 201 and certain pixel sensor 202 of the certain pixel 201. Each of cluster C1 and cluster C2 can be supported on a respective reaction site 206 provided by a nanowell 207, according to one example. Detector surface 208 can be defined by surfaces defining nanowells, as well as surfaces intermediate of nanowells as is indicated by FIG. 13.

Detector 200 can include, according to one example, dielectric stack 213, semiconductor layer 212, light guides 214 disposed in a light path between detector surface 208 and pixel sensors 202, and isolation structures 218 defining and delimiting pixel areas above respective ones of pixel sensors 202. Dielectric stack 213 can, in one example, include metallization layers defining various circuitry, e.g., circuitry, e.g., circuitry for readout of signals from sensing pixels, digitization, storage, and signal processing. Metallization layers defining such circuitry can additionally or alternatively be incorporated into isolation structures 218.

Pixel sensors 202, in one example, can be provided by sensing photodiodes. Sensing photodiodes, in one example, can be defined by doped areas of semiconductor layer 212. Examples herein recognize that "area" as referred to herein can refer to a volumetric space (in other words, not limited to a 2-dimensional space).

Figure 14:
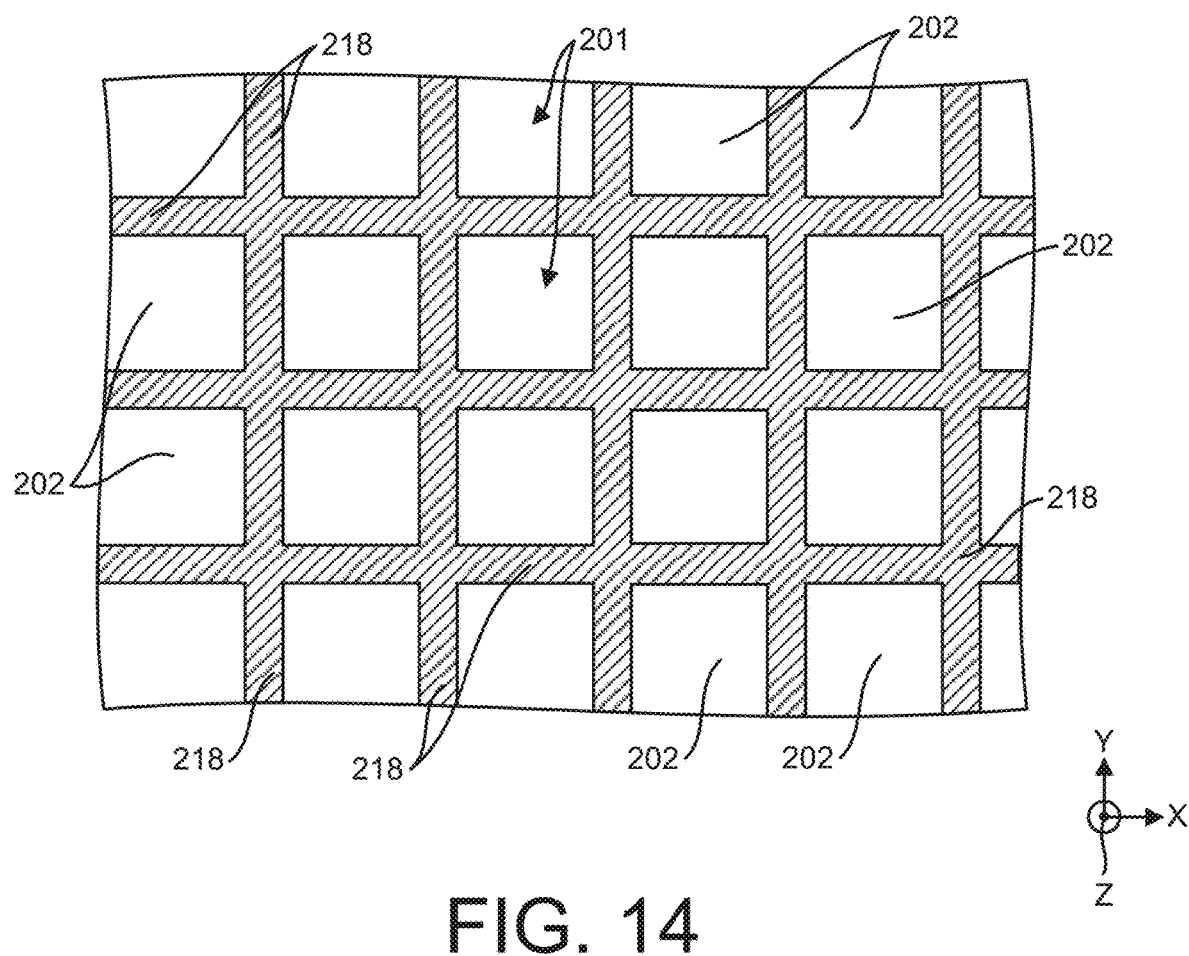
FIG. 14 is a top cross sectional view of the apparatus shown in FIG. 13.

According to one example, detector 200 can be provided by a solid-state integrated circuit detector, such as complementary metal oxide semiconductor (CMOS) integrated circuit detector or a charge coupled device (CCD) integrated circuit detector. Pixel sensors 202, in one example, can be provided in a two-dimensional pixel array having rows and columns of pixels arranged in a grid pattern that is shown in the cross-sectional top view of FIG. 14 taken along the elevation of pixel sensors 202. In one example, such pixel array can include at least 1M pixels, or can include fewer pixels.

In one aspect, pixels 201 herein can include respective pixel sensors 202 and light guides 214. Light guides 214 can be disposed in an area above respective pixel sensors 202 and can be bounded by isolation structures 218 and reaction structure 260.

According to one example, apparatus 100 can be used for performance of biological or chemical testing with use of analytes provided by fluorophores. For example, a fluid having one or more fluorophores can be caused to flow into and out of flow cell 282 through an inlet port using inlet port 289 and outlet port 290. Analytes provided by fluorophores can attract to various clusters C1, C2 and thus, by their detection, analytes provided by fluorophores can act as markers for the clusters C1, C2, e.g., biological or chemical analytes to which they attract.

To detect the presence of an analyte provided by a fluorophore within flow cell 282, light energy exciter 10 can be energized so that excitation light 101 in an excitation wavelength range is emitted by light energy exciter 10. On receipt of excitation light 101, fluorophores attached to samples C1, C2 can radiate emission light 501, which is the signal of interest for detection by pixel sensors 202. Emission light 501 owing to fluorescence of a fluorophore attached to a cluster C1, C2 can have a wavelength range red shifted relative to a wavelength range of excitation light 101.

Light energy exciter 10 can include at least one light source and at least one optical component to illuminate samples C1, C2. Examples of light sources can include, e.g., lasers, arc lamps, LEDs, or laser diodes. The optical components can include, for example, reflectors, dichroics, beam splitters, collimators, lenses, filters, wedges, prisms, mirrors, detectors, and the like. In examples that use an illumination system, the light energy exciter 10 can be configured to direct excitation light 101 to reaction sites 206. As one example, fluorophores can be excited by light in the green wavelength range, e.g., can be excited using excitation light 101 having a center (peak) wavelength of about 523 nm.

Examples herein recognize that a signal to noise ratio of apparatus 100 can be expressed as setforth in the equation of (1) hereinbelow.

Examples herein recognize that a signal to noise ratio of apparatus 100 can be expressed as set forth in the equation of (1) hereinbelow.

$$SNR = \frac{\text{Signal}}{\sqrt{\text{Signal} + \text{Excitation} + AF + \text{Background} + \text{Dark Current} + \text{Read\_Noise}^{\wedge}2}} \quad \text{(Eq. 1)}$$

where "Signal" is the emission light 501, i.e. the signal of interest light attributable to the fluorescence of a fluorophore attached to a cluster, "Excitation" is unwanted excitation light reaching the pixel sensors 202, "AF" is the autofluorescence noise radiation of one or more autofluorescence sources within detector 200, "Background" is unwanted light energy transmitted into detector 200 from a source external to detector 200, "Dark Current" is current flow noise associated to random electron-hole pair generation in the absence of light, and "Read Noise" is noise associated to analog-to-digital electronics.

Figure 15:
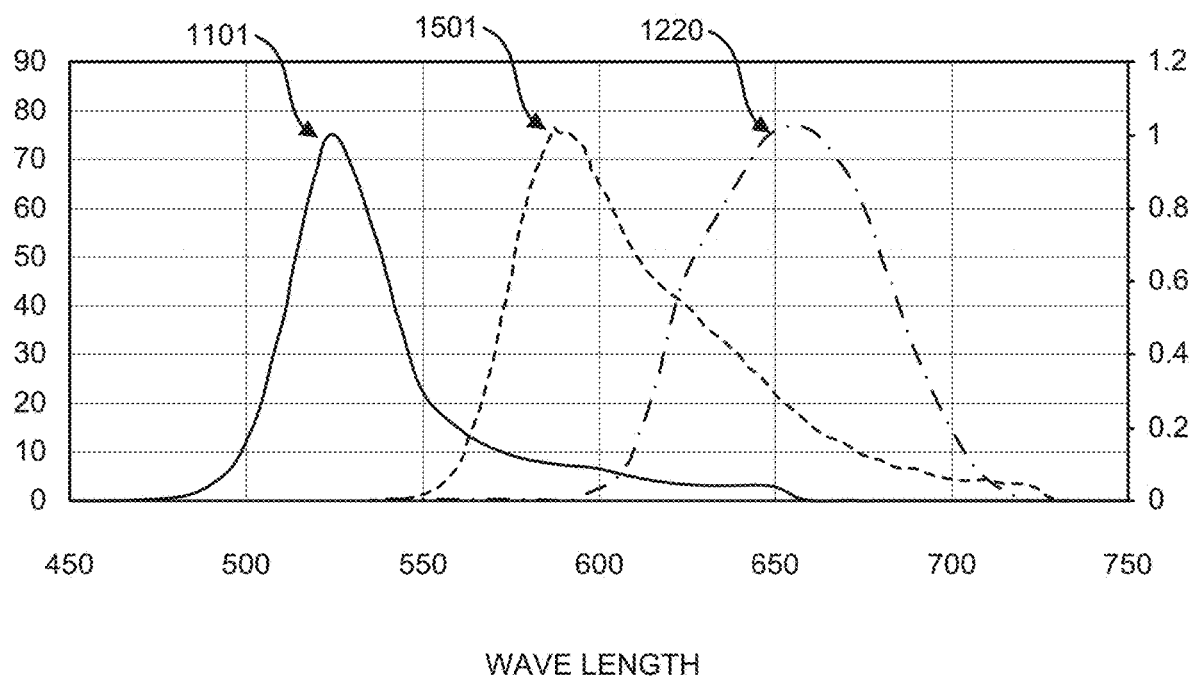
FIG. 15 is a spectral profile diagram illustrating coordination between excitation light, emission light, and a detector detection band.

FIG. 15 is an example of a spectral profile coordination diagram illustrating targeted coordination between a wavelength range of excitation light, a wavelength range of signal light, and a detection wavelength range. In the spectral profile coordination diagram of FIG. 15, spectral profile 1101 shown as a green light spectral profile is the spectral profile of excitation light 101 as emitted by light energy exciter 10. Spectral profile 1501 is the spectral profile of the emission light 501 caused by the fluorescence of a fluorophore on being excited by excitation light 101. Spectral profile 1220 is the transmission profile (detection band) of pixel sensors 202, according to one example. It will be understood that the spectral profile coordination diagram of FIG. 15 is intended to represent general features common to some examples, but that variations of the indicated spectral profiles are common. In one aspect, excitation light 101 can commonly include, in addition to a green light spectral profile, a blue light spectral profile (not shown) wherein apparatus 100 is switchable between modes in which (a) the green light spectral profile is active with the blue light spectral profile being inactive, and (b) the blue light spectral profile is active with the green light spectral profile being inactive. In other examples, there can be different combinations of excitation light 101 and emission light 501. In one example, the spectral profile 1101 of excitation light 101 can feature a center wavelength in the blue light wavelength range and the spectral profile of emission light 501 can feature a center wavelength in the green wavelength range.

Detector 200 can be configured to detect light in the wavelength range indicated by spectral profile 1220. Spectral profile 1220 specifies the detection wavelength range with amplitude of spectral profile 1220 indicating a level of sensitivity. Thus, referring to the spectral profile coordination diagram of FIG. 15, detector 200 is able to detect emission light 501 in the range of wavelengths wherein the spectral profile 1501 of the emission light 501 and the detection band spectral profile 1220 of pixel sensors 202 intersect.

As used herein and further referring to the exemplary view of FIG. 13, a "flow cell" 282 can include a device having a lid 288 extending over a reaction structure 260 to form a flow channel 283 therebetween that is in communication with a plurality of reaction sites 206 of the reaction structure. In some examples, a detection device, such as an imaging device and/or optics, are separate from the flow cell 282. In other examples, as shown in FIG. 13, a flow cell 282 can include a detection device, e.g., detector 200 that detects designated reactions that occur at or proximate to the reaction sites. A flow cell 282 may include a solid-state light detection or "imaging" device, such as a Charge-Coupled Device (CCD) or Complementary Metal-Oxide Semiconductor (CMOS) (light) detection device. The CMOS detection device or sensor, for example, may include a plurality of detection pixels 201 (pixels) that detect incident emission signals. In some examples, each pixel 201 corresponds to a reaction site. In other examples, there may be more or fewer pixels 201 than the number of reaction sites. Likewise, a pixel 201, in some examples, corresponds to a single sensing element to create an output signal. In other examples, a pixel 201 corresponds to multiple sensing elements to create an output signal. A flow cell 282 can also or alternatively include two (or more) opposing sensors, without a lid. As one specific example, a flow cell 282 can fluidically, electrically, or both fluidically and electrically couple to a cartridge, which can fluidically, electrically, or both fluidically and electrically couple to a bioassay system. A cartridge and/or bioassay system may deliver a reaction solution to reaction sites 206 of a flow cell 282, according to a predetermined protocol (e.g., sequencing-by-synthesis), and perform a plurality of imaging events. For example, a cartridge and/or bioassay system may direct one or more reaction solutions through the flow channel of the flow cell, and thereby along the reaction sites. At least one of the reaction solutions may include four types of nucleotides having the same or different fluorescent labels. In some examples, the nucleotides bind to the reaction sites 206 of the flow cell 282, such as to corresponding oligonucleotides at the reaction sites. The cartridge, bioassay system, or the flow cell 282 itself, in some examples, then illuminates the reaction sites 206 using an excitation light source (e.g., solid-state light sources, such as light-emitting diodes (LEDs)). In some examples, the excitation light has a predetermined wavelength or wavelengths, including a range of wavelengths. The fluorescent labels excited by the incident excitation light may provide emission signals (e.g., light of a wavelength or wavelengths that differ from the excitation light and, potentially, each other) that may be detected by the light sensors of the flow cell 282.

Flow cells 282 described herein can perform various biological or chemical processes and/or analysis. More specifically, the flow cells 282 described herein may be used in various processes and systems where it is desired to detect an event, property, quality, or characteristic that is indicative of a designated reaction. For example, flow cells 282 described herein may include or be integrated with light detection devices, sensors, including but not limited to, biosensors, and their components, as well as bioassay systems that operate with sensors, including biosensors.

The flow cells 282 facilitate a plurality of designated reactions that may be detected individually or collectively. The flow cells 282 perform numerous cycles in which the plurality of designated reactions occurs in parallel. For example, the flow cells 282 may be used to sequence a dense array of DNA features through iterative cycles of enzymatic manipulation and light or image detection/acquisition. As such, the flow cells 282 may be in fluidic communication with one or more microfluidic channels that deliver reagents or other reaction components in a reaction solution to a reaction site 206 of the flow cells. The reaction sites 206 may be provided or spaced apart in a predetermined manner, such as in a uniform or repeating pattern. Alternatively, the reaction sites 206 may be randomly distributed. Each of the reaction sites 206 may be associated with one or more light guides 214 and one or more light sensors that detect light from the associated reaction site 206. In one example, light guides 214 include one or more filters for filtering certain wavelengths of light. The light guides 214 may be, for example, an absorption filter (e.g., an organic absorption filter) such that the filter material absorbs a certain wavelength (or range of wavelengths) and allows at least one predetermined wavelength (or range of wavelengths) to pass therethrough. In some flow cells, the reaction sites 206 may be located in reaction recesses or chambers, which may at least partially compartmentalize the designated reactions therein. Furthermore, the designation reactions may involve or be more easily detected at temperatures other than at ambient temperatures, for example, at elevated temperatures.

As used herein, a "designated reaction" includes a change in at least one of a chemical, electrical, physical, or optical property (or quality) of a chemical or biological substance of interest, such as an analyte-of-interest. In particular flow cells, a designated reaction is a positive binding event, such as incorporation of a fluorescently labeled biomolecule with an analyte-of-interest, for example. More generally, a designated reaction may be a chemical transformation, chemical change, or chemical interaction. A designated reaction may also be a change in electrical properties. In particular flow cells such as flow cell 282, a designated reaction includes the incorporation of a fluorescently-labeled molecule with an analyte. The analyte may be an oligonucleotide and the fluorescently-labeled molecule may be a nucleotide. A designated reaction may be detected when an excitation light is directed toward the oligonucleotide having the labeled nucleotide, and the fluorophore emits a detectable fluorescent signal. In another example of flow cells, the detected fluorescence is a result of chemiluminescence or bioluminescence. A designated reaction may also increase fluorescence (or Förster) resonance energy transfer (FRET), for example, by bringing a donor fluorophore in proximity to an acceptor fluorophore, decrease FRET by separating donor and acceptor fluorophores, increase fluorescence by separating a quencher from a fluorophore, or decrease fluorescence by co-locating a quencher and fluorophore. A biological or chemical analysis may include detecting a designated reaction.

As used herein, "electrically coupled" and "optically coupled" refers to a transfer of electrical energy and light waves, respectively, between any combination of a power source, an electrode, a conductive portion of a substrate, a droplet, a conductive trace, wire, waveguide, nanostructures, other circuit segment and the like. The terms electrically coupled and optically coupled may be utilized in connection with direct or indirect connections, and may pass through various intermediaries, such as a fluid intermediary, an air gap, and the like. Likewise, "fluidically coupled" refers to a transfer of fluid between any combination of sources. The term fluidically coupled may be utilized in connection with direct or indirect connections, and may pass through various intermediaries, such as channels, wells, pools, pumps, and the like.

As used herein, a "reaction solution," "reaction component," or "reactant" includes any substance that may be used to obtain at least one designated reaction. Potential reaction components include reagents, enzymes, samples, other biomolecules, and buffer solutions, for example. The reaction components may be delivered to a reaction site 206 in the flow cells 282 disclosed herein in a solution and/or immobilized at a reaction site. The reaction components may interact directly or indirectly with another substance, such as an analyte-of-interest immobilized at a reaction site 206 of the flow cell 282.

As used herein, the term "reaction site" is a localized region where at least one designated reaction may occur. A reaction site 206 may include support surfaces of a reaction structure provided by reaction structure 260 or substrate where a substance may be immobilized thereon. For example, a reaction site 206 may include a surface of a reaction structure (which may be positioned in a channel of a flow cell) that has a reaction component thereon, such as a colony of nucleic acids thereon. In some flow cells such as flow cell 282, the nucleic acids in the colony have the same sequence, being for example, clonal copies of a single-stranded or double-stranded template. However, in some flow cells 282, a reaction site 206 may contain only a single nucleic acid molecule, for example, in a single-stranded or double-stranded form.

As used herein, the term "transparent" refers to allowing all or substantially all visible and non-visible electromagnetic radiation or light of interest to pass through unobstructed; the term "opaque" refers to reflecting, deflecting, absorbing, or otherwise obstructing all or substantially all visible and non-visible electromagnetic radiation or light of interest from passing through; and the term "non-transparent" refers to allowing some, but not all, visible and non-visible electromagnetic radiation or light of interest to pass through unobstructed.

As used herein, the term "waveguide" refers to a structure that guides waves, such as electromagnetic waves, with minimal loss of energy by restricting the transmission of energy to a particular direction or range of directions.

As used herein, the term "associated" refers to something being directly or indirectly connected to something else; for example, a first element associated with a second element may refer to a first element being located over or on a second element.

The proposed methods and structures provide many benefits including higher throughput and lower cost of sequencing data.

In certain examples, modulating the signal of two different adjacent clusters C1, C2 in two separate nanowells 207 either through geometric constraints and/or signal modulation may add up to a two times or more increase in information density for a CMOS sensor, providing a benefit over CMOS-based detection devices with one cluster/well per pixel. In addition, increasing the information density on a CMOS-based flow cell may have the benefit of reducing the cost per gigabyte of sequencing information by the factor proportional to the increase in density. The practical impact of such innovation enables CMOS-based sequencing to compete with larger platforms in terms of information density. Further, implementing the methods and structures disclosed herein may only require software changes coupled with CMOS fabrication modifications, leaving the instrument and reagent consumables substantially if not fully untouched.

By placing two or more nanowells 207 on top of a pixel, the sensor accepts a minimum 50% intensity hit for the "bright" cluster C1, C2 and a greater than 50% intensity hit compared to nominal for the "attenuated" cluster C1, C2 in the transmission modulation option. The different sized nanowell 207 implementation (for example, a larger "dominant" sized well and a smaller "minor" sized well) accepts a sharing of the signal disproportionally between two (assumed) monoclonal clusters C1, C2 such that the total signal remains about the same. Nonetheless, the signal ratio between the dominant and minor nanowell 207 is sufficiently large for accurate distinction of signals between the two clusters.

Reference is made below to the drawings, which are not drawn to scale for ease of understanding, wherein the same reference numbers are used throughout different figures to designate the same or similar components.

Figure 16:
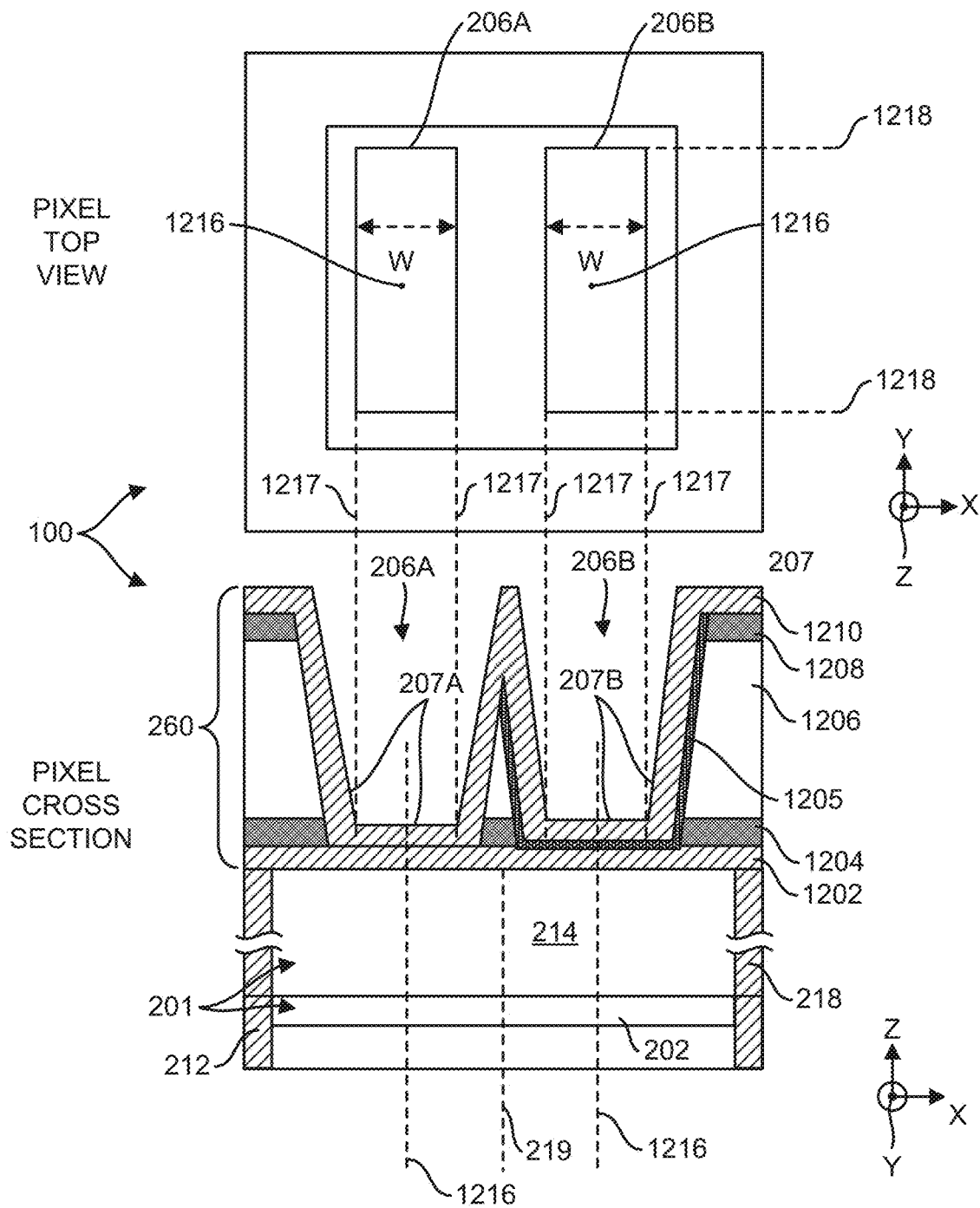
FIG. 16 depicts a top and cross-section view of a portion of a CMOS sensor with nanowells of substantially similar size.

FIG. 16 depicts a top and cross-section view of a portion of a CMOS sensor with reaction sites 206 defined by nanowells 207A and 207B of substantially similar size. As shown in this figure, each of the two nanowells 207 (which may support a cluster C1, C2 of interest, for example, a monoclonal cluster C1, C2 of DNA strands), have the same length and width. However, one of the nanowells 207B, but not the other nanowell 207A, has an attenuating filter (attenuator) that attenuates the signal by about 50%. The attenuator of nanowell 207B is shown as being defined by attenuating material layer 1204 below a surface defining a bottom of the nanowell 207B. While the nanowells 207, 207A-207D in the figures may be shown as rectangular, other shaped nanowells 207, 207A-207D are possible, for example, circular, oval, hexagonal, octagonal, etc.

In the example of FIG. 16, reaction structure 260 can include a dielectric stack featuring a plurality of dielectric layers including dielectric layer 1202, dielectric layer 1206, and dielectric layer 1210. The dielectric stack defined by reaction structure 260 can further include integrally formed therein first and second attenuating material layers, including attenuating material layer 1204, attenuating material layer 1205, and attenuating material layer 1208. Attenuating material layers 1204, 1205, and 1208 can be provided, in one example, by metals. Attenuating material layer 1204, attenuating material layer 1205, and attenuating material 1208 can include, e.g., tantalum, aluminum, gold, or copper, and the like.

Referring to FIG. 16, it can be seen that reaction site 206B defined by nanowell 207B can include an attenuator, and nanowell 207A can be absent of an attenuator. In the example of FIG. 16, reaction site 206B defined by nanowell 207B can include an attenuator defined by attenuating material layer 1205 and nanowell 207A can be absent of attenuating material layer 1205 defining an attenuator. As shown in FIG. 16, attenuating material layer 1205 can include a first upwardly extending section extending in parallel to a sidewall of nanowell 207B about a circumference of nanowell 207B and a second horizontally extending section extending in parallel with a bottom surface of nanowell 207B.

In one aspect, reaction site 206B defined by nanowell 207B and reaction site 206A defined by nanowell 207A can include associated vertically extending center axes 1216. Referring to the example of FIG. 16, apparatus 100 can be configured so that vertically extending center axis 1216 of nanowell 207B extends through an attenuator and further so that vertically extending center axis 1216 of nanowell 207A does not extend through an attenuator. Referring to the example of FIG. 16, apparatus 100 can be configured so that vertically extending center axis 1216 of nanowell 207B extends through an attenuator defined by attenuating material layer 1205 and further so that vertically extending center axis 1216 of nanowell 207A does not extend through an attenuator defined by attenuating material layer 1205. In another aspect, the vertically extending center axis 1216 of reaction site 206B defined by nanowell 207B extends through attenuating material layer 1205, and the vertically extending center axis 1216 of reaction site 206A defined by nanowell 207A does not extend through attenuating material layer 1205. In another aspect, the vertically extending center axis 1216 of reaction site 206B defined by nanowell 207B extends through an attenuator that is absent from reaction site 206A defined by nanowell 207A.

Referring further to FIG. 16, nanowell 207B in an area aligned to and below a bottom surface of nanowell 207B can include an attenuator defined by attenuating material layer 1205, and nanowell 207A in an area below and aligned to a bottom surface of nanowell 207A can be absent of an attenuator. An area of nanowell 207B below and aligned to a bottom surface of nanowell 207B can include an area below a bottom surface of nanowell 207B that is bounded by depth dimension extending vertically extending planes 1217 intersecting bottom corners of nanowell 207B and bounded by width dimension vertically extending planes 1218 intersecting bottom corners of nanowell 207B as shown in FIG. 16, which can conclude a rectangular bottom surface. The attenuator defined by attenuating material layer 1205 in FIG. 16 of nanowell 207B can be configured to include a section vertically below a bottom surface of nanowell 207B and can be configured to attenuate emission light rays of emission light 501 radiating vertically downwardly from a bottom of nanowell 207B. In another aspect, nanowell 207A can be absent of an attenuator that attenuates emission light rays of emission light radiating vertically downward from a bottom of nanowell 207A.

Figure 17:
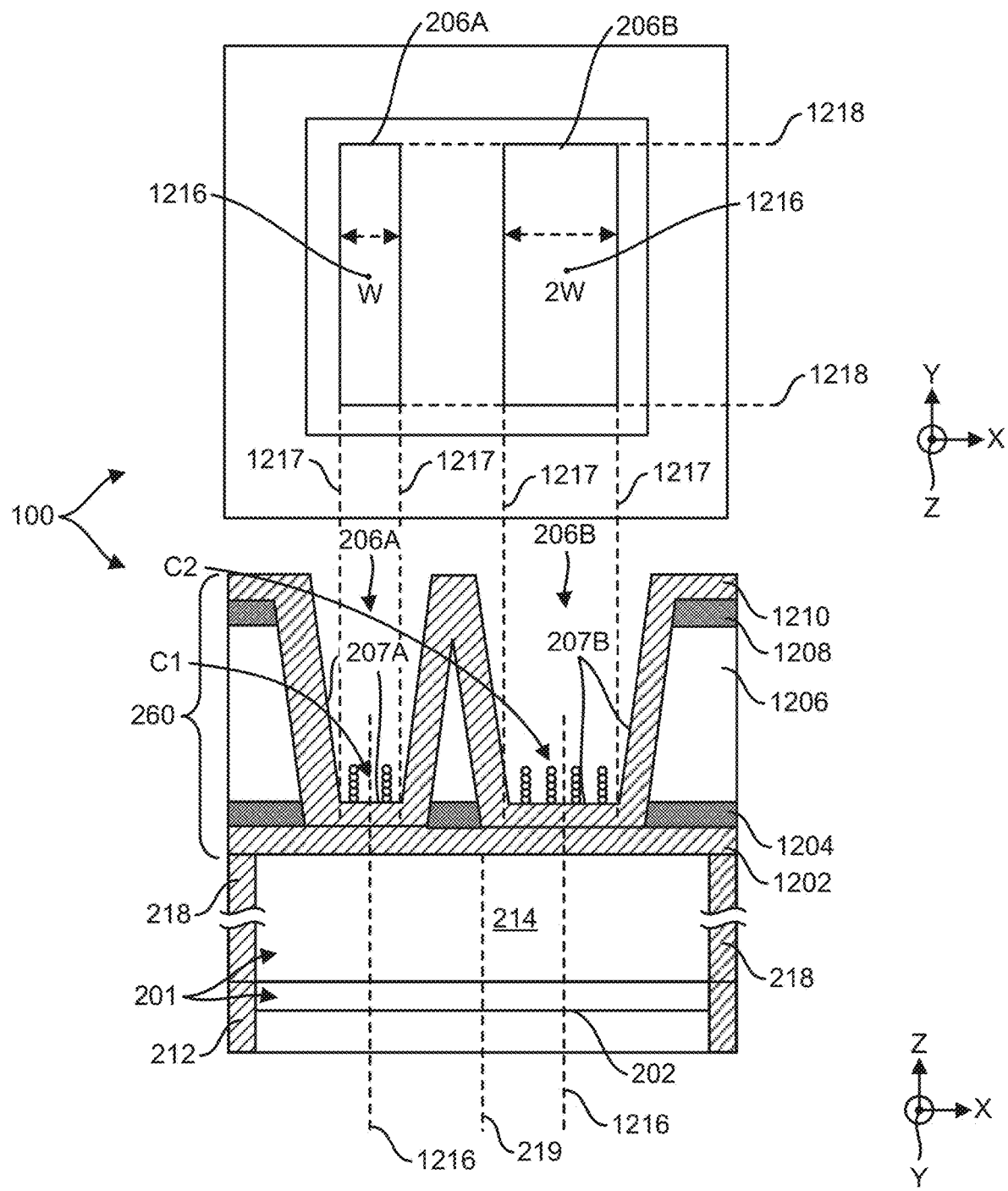
FIG. 17 depicts a top and cross-section view of a portion of a CMOS sensor with nanowells of substantially different size.

FIG. 17 depicts a top and cross-section view of a portion of a CMOS sensor with nanowells 207A and 207B of substantially different size. As shown in this figure, each of the two nanowells 207A and 207B (which may support a cluster C1, C2 of interest, for example, a monoclonal cluster C1, C2 of DNA strands), have a different width; the left nanowell 207A having half the width of the right nanowell. This may limit the size of the cluster C1, C2 of interest, which may in turn limit the cluster signal emitted by the cluster C1, C2 when an analyte of interest is present. For example, if nanowell 207B is twice the size of a second nanowell 207A, the nanowell 207B may produce twice the cluster signal strength compared to the nanowell 207A.

In the example of FIG. 17, reaction site 206B defined by nanowell 207B can include a larger width and nanowell bottom surface area than reaction site 206A defined by nanowell 207A. As indicated in the example of FIG. 17, increased surface area of a nanowell bottom can increase a strand count defining a cluster. Accordingly, as a result of nanowell 207B having an increased surface area relative to nanowell 207A, cluster C2 can have a larger strand count than cluster C1. In one example, a width of nanowell 207B relative to nanowell 207A can be selected so that a strand count of cluster C2 is about 2.0× the strand count of cluster C1. In one example, a width of nanowell 207B can be configured so that a strand count of cluster C2 is about 1.9× the strand count of cluster C1.

Examples herein recognize that an overall volume of a nanowell 207A and 207B can control the strand count. Examples herein recognize that a relationship between volume and strand count may not be linear but can be determined experimentally. In one example, a bottom surface area of respective nanowells 207A and 207B can be configured so that nanowell 207B has twice a bottom surface area of nanowell 207A in order to produce a strand count difference and corresponding "on" state signal amplitude difference between the nanowells of about 2.0, or about 1.9. In another example, experiments can be performed to derive a relationship between nanowell bottom surface area and strand count for particular conditions to be used, and surface area differences between the nanowells can be designed accordingly.

Figure 18A:
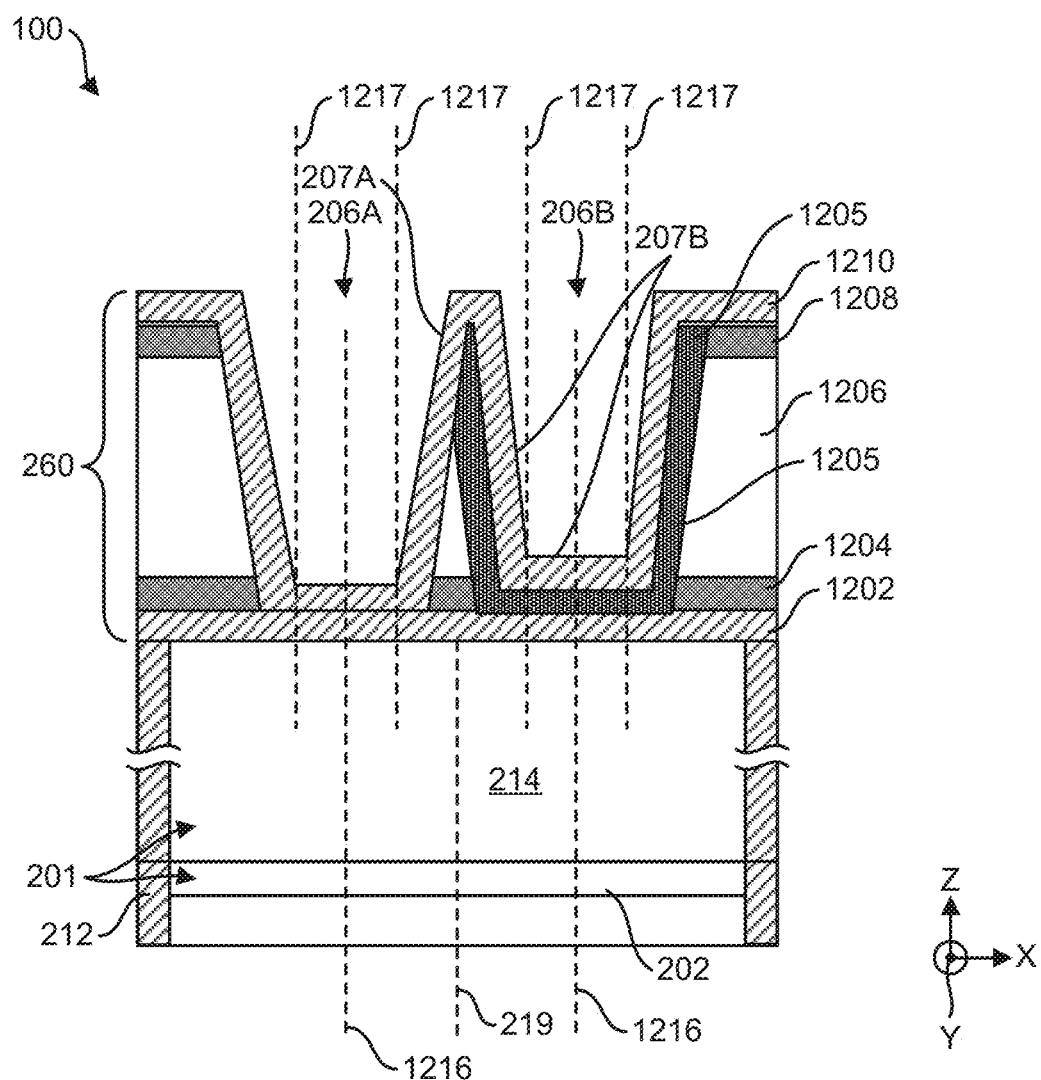
FIG. 18A depicts a cross-section view of a portion of a CMOS sensor with one of two nanowells having a filter to attenuate a cluster signal.

FIG. 18A depicts a cross-section view of a portion of a CMOS sensor with one of two nanowells 207A and 207B having an attenuating filter to attenuate a cluster signal. A second nanowell 207B may have an attenuating filter layer disposed below, and in some examples, immediately below, the depicted bottom surface of the second nanowell 207B, where this layer is not present in the first nanowell 207A. Other examples may have additional layers or materials that reside between the surface of the nanowell 207 and the attenuating filter layer. In the example of FIG. 18A, the attenuating filter layer can be provided by attenuating material layer 1205. The nanowell 207 on the right of this FIG. 18A is shown with the additional layer. This filter layer may be a thin metallic layer. The filter layer should be compatible with the fabrication process of the CMOS sensor. In some examples, the filter layer attenuates about 50% (half) of the cluster signal emitted from the cluster C2 when an analyte of interest is present. The attenuating filter layer may comprise or be composed of tantalum.

In the example of FIG. 18A, reaction structure 260 can include a dielectric stack featuring a plurality of dielectric layers including dielectric layer 1202, dielectric layer 1206, and dielectric layer 1210. The dielectric stack defined by reaction structure 260 can further include integrally formed therein first and second attenuating material layers, including attenuating material layer 1204, attenuating material 1205, and attenuating material layer 1208. Attenuating material layers 1204, 1205, and 1208 can be provided, in one example, by metals. Attenuating material layer 1204, attenuating material layer 1205, and attenuating material 1208 can include, e.g., tantalum, aluminum, gold, or copper, and the like.

Referring to FIG. 18A, it can be seen that reaction site 206B defined by nanowell 207B can include an attenuator and nanowell 207A can be absent of an attenuator. In the example of FIG. 18A, reaction site 206B defined by nanowell 207B can include an attenuator defined by attenuating material layer 1205, and nanowell 207A can be absent of attenuating material layer 1205 defining an attenuator. As shown in FIG. 18A, attenuating material layer 1205 can include a first upwardly extending section extending in parallel to a sidewall of nanowell 207B about a circumference of nanowell 207B, and a second horizontally extending section extending in parallel with a bottom surface of nanowell 207B.

In one aspect, reaction site 206B defined by nanowell 207B and reaction site 206A defined by nanowell 207A can include associated vertically extending center axis 1216. Referring to the example of FIG. 18A, apparatus 100 can be configured so that vertically extending center axis 1216 of nanowell 207B extends through an attenuator and further so that vertically extending center axis 1216 of nanowell 207A does not extend through an attenuator. Referring to the example of FIG. 18A, apparatus 100 can be configured so that vertically extending center axis 1216 of nanowell 207B extends through an attenuator defined by attenuating material layer 1205 and further so that vertically extending center axis 1216 of nanowell 207A does not extend through an attenuator defined by attenuating material layer 1205. In another aspect, the vertically extending center axis 1216 of reaction site 206B defined by nanowell 207B extends through attenuating material layer 1205, and the vertically extending center axis of 1216 of reaction site 206A defined by nanowell 207A does not extend through attenuating material layer 1205. In another aspect, the vertically extending center axis 1216 of reaction site 206B defined by nanowell 207B extends through an attenuator that is absent from reaction site 206A defined by nanowell 207A.

Referring further to FIG. 18A, nanowell 207B in an area aligned to and below a bottom surface of nanowell 207B can include an attenuator defined by attenuating material layer 1205, and nanowell 207A in an area below and aligned to a bottom surface of nanowell 207A can be absent of an attenuator. An area of nanowell 207B below and aligned to a bottom surface of nanowell 207B can include an area below a bottom surface of nanowell 207B that is bounded by depth dimension extending vertically extending planes 1217 intersecting bottom corners of nanowell 207B and bounded by width dimension vertically extending planes 1218 intersecting bottom corners of nanowell 207B as shown in FIG. 18A, which can include a rectangular bottom surface. The attenuator defined by attenuating material layer 1205 in FIG. 18A of nanowell 207B can be configured to include a section vertically below a bottom surface of nanowell 207B and can be configured to attenuate emission light rays of emission light 501 radiating vertically downwardly from a bottom of nanowell 207B. In another aspect, nanowell 207A can be absent of an attenuator that attenuates emission light rays of emission light radiating vertically downward from a bottom of nanowell 207A.

Figure 18B:
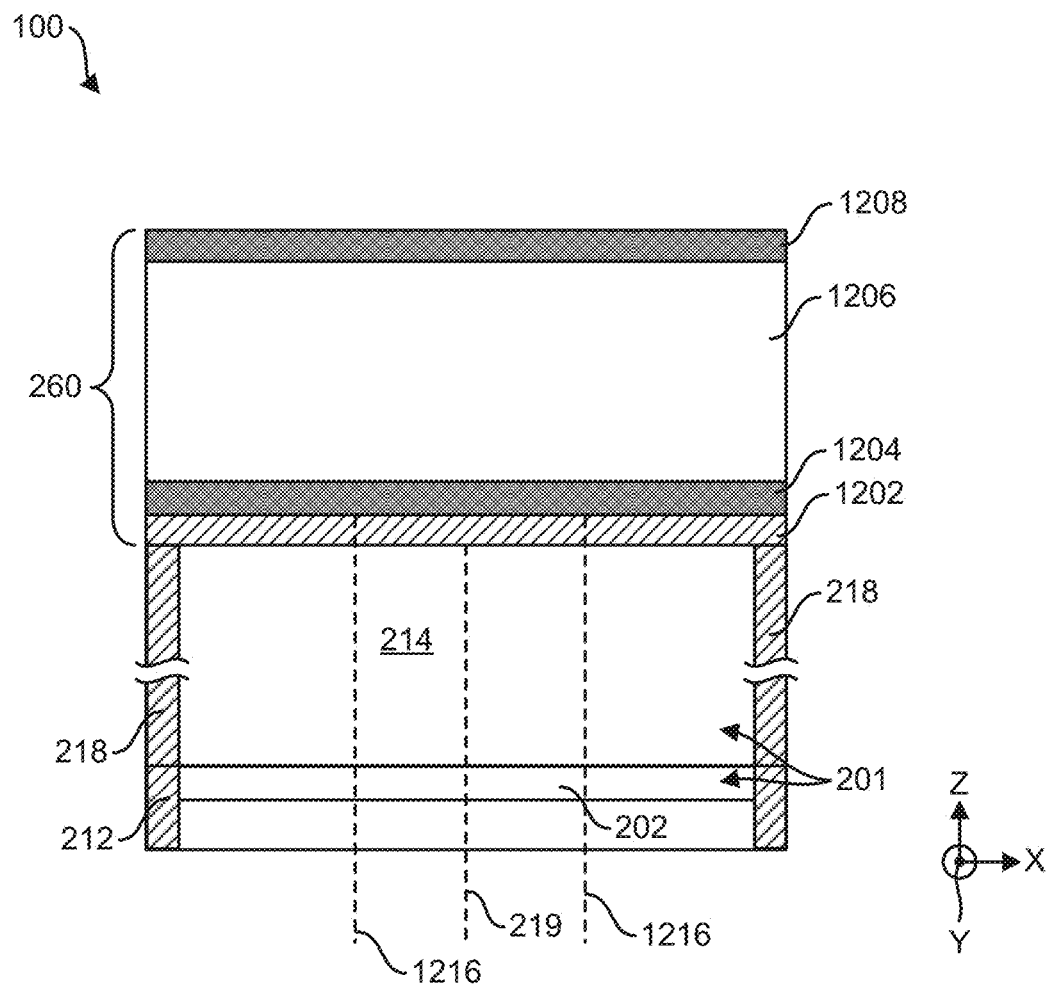
FIG. 18B-18D depict fabrication stage views for fabrication of the structure of FIG. 18A.
Figure 18C:
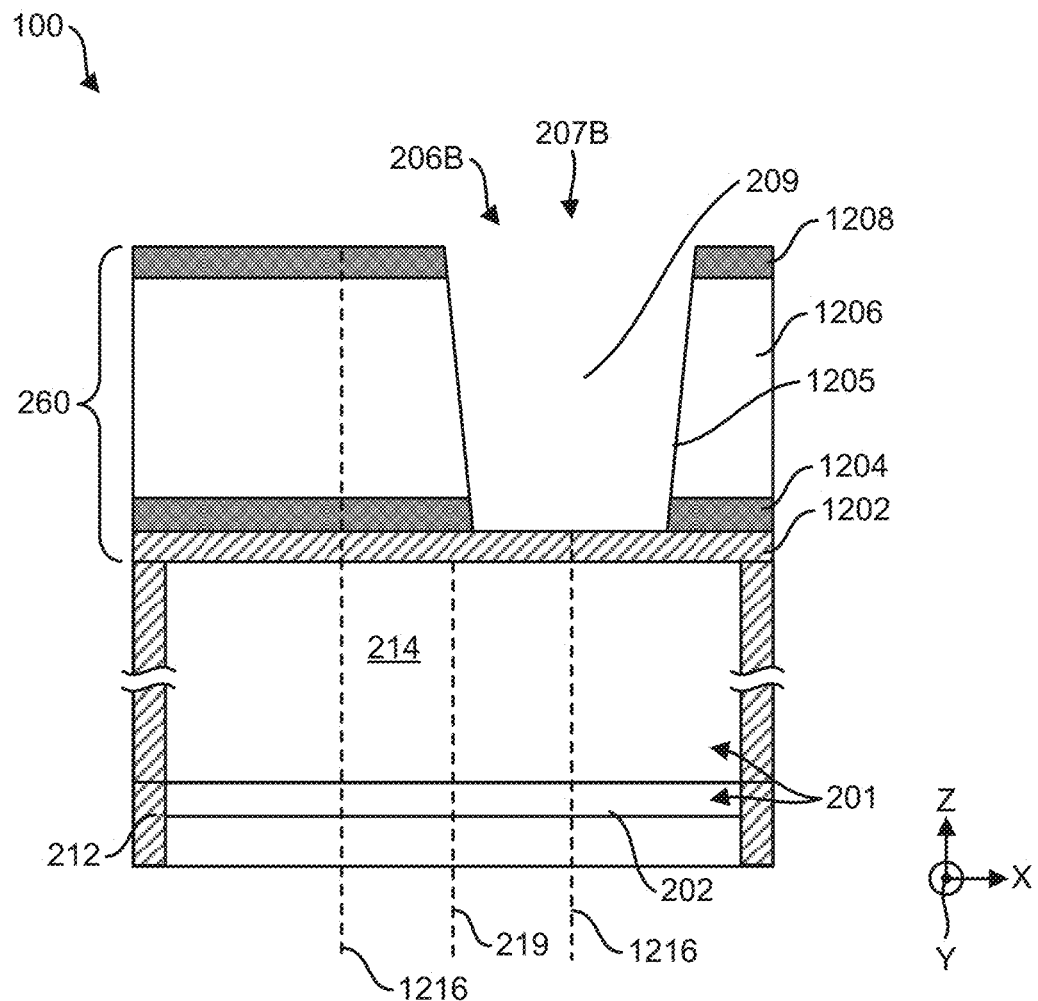
Figure 18D:
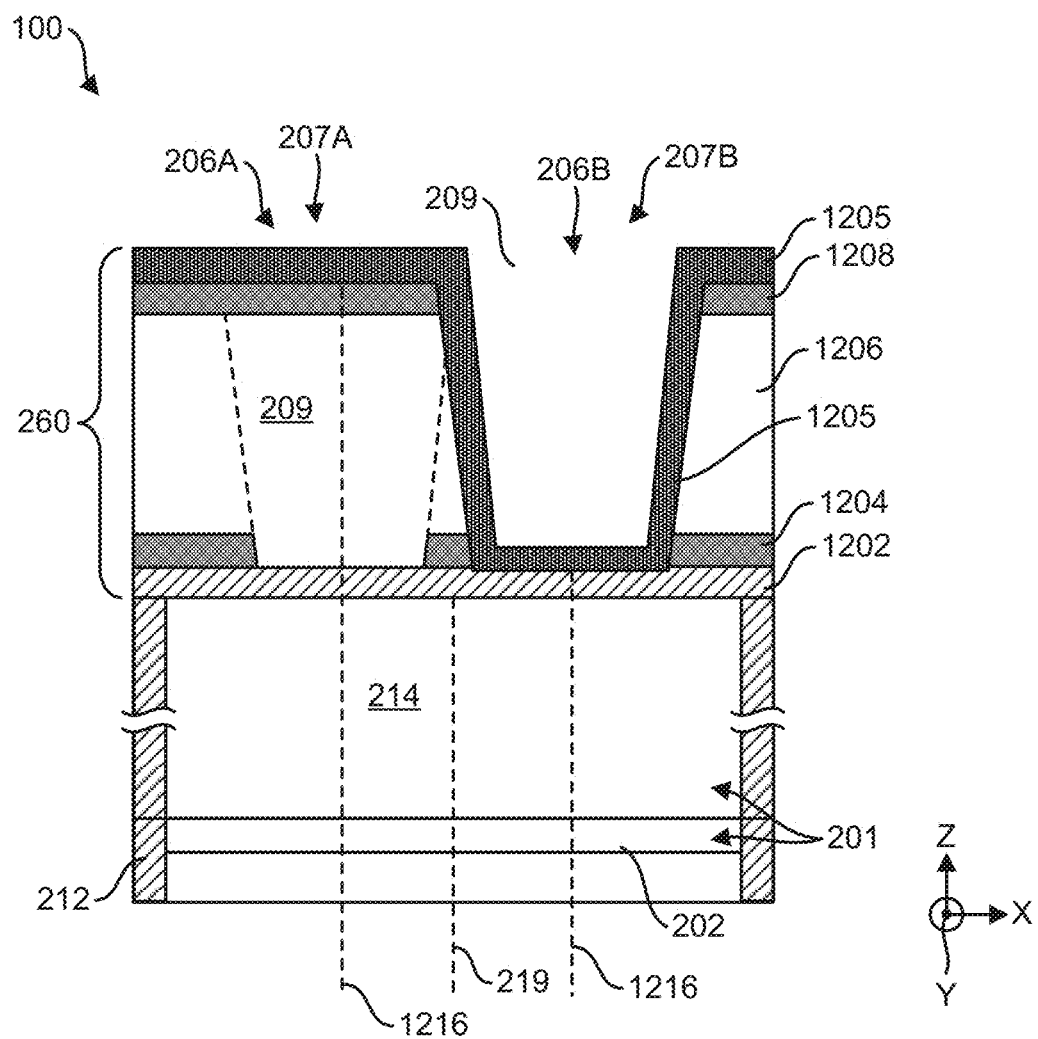

A method for fabricating the apparatus 100 as shown in FIG. 18A is set forth in reference to fabrication stage views of FIG. 18B to FIG. 18D. Referring to FIG. 18B, layer 1202, layer 1204, layer 1206, and layer 1208 can be deposited above and aligned with a pixel 201 which, in one example, can be defined by a pixel sensor 202 and a light guide 214. Referring to FIG. 18C, trench 209 can be etched to define a reaction site 206B defined by nanowell 207B that is depicted in an intermediary stage of fabrication in FIG. 18C. As seen from FIG. 18C, the trench 209 can be fabricated prior to and independent of a trench for fabrication of reaction site 206A defined by nanowell 207A. As shown in FIG. 18D, prior to fabrication of a trench 219 for providing nanowell 207A, attenuating material layer 1205 can be deposited in trench 209 defining reaction site 206B provided by nanowell 207B illustrated in FIG. 18D in an intermediary stage of fabrication. In the intermediary stage of fabrication depicted in FIG. 18D, attenuating material layer 1205 can overfill trench 209 for reaction site 206B provided by nanowell 207B.

For completion of fabrication of the structure shown in FIG. 18A, additional fabrication stages can be performed. These additional fabrication stages can include, e.g., planarizing layer 1205 to an elevation of the top elevation of layer 1208, depositing a sacrificial layer of dielectric material to overfill trench 209 associated to reaction site 206B provided by nanowell 207B, planarizing the overfilled layer, forming a second trench 209 in the dashed-in area as indicated in the dashed-in area of FIG. 18D for reaction site 206A defined by nanowell 207A, etching away the described sacrificial layer, and then depositing dielectric layer 1210 as shown in FIG. 18A to define a top layer of both trench 209 associated to reaction site 206B provided by nanowell 207B and trench 209 associated to reaction site 206A provided by nanowell 207A. There is set forth herein, according to one example, a method for fabricating an apparatus, wherein the method includes depositing in an area aligned with and over a pixel a dielectric stack; etching in the dielectric stack a first trench for defining a first nanowell; etching in the dielectric stack a second trench for defining a second nanowell, and depositing in the first trench an attenuating material layer that is not deposited in the second trench.

Figure 19A:
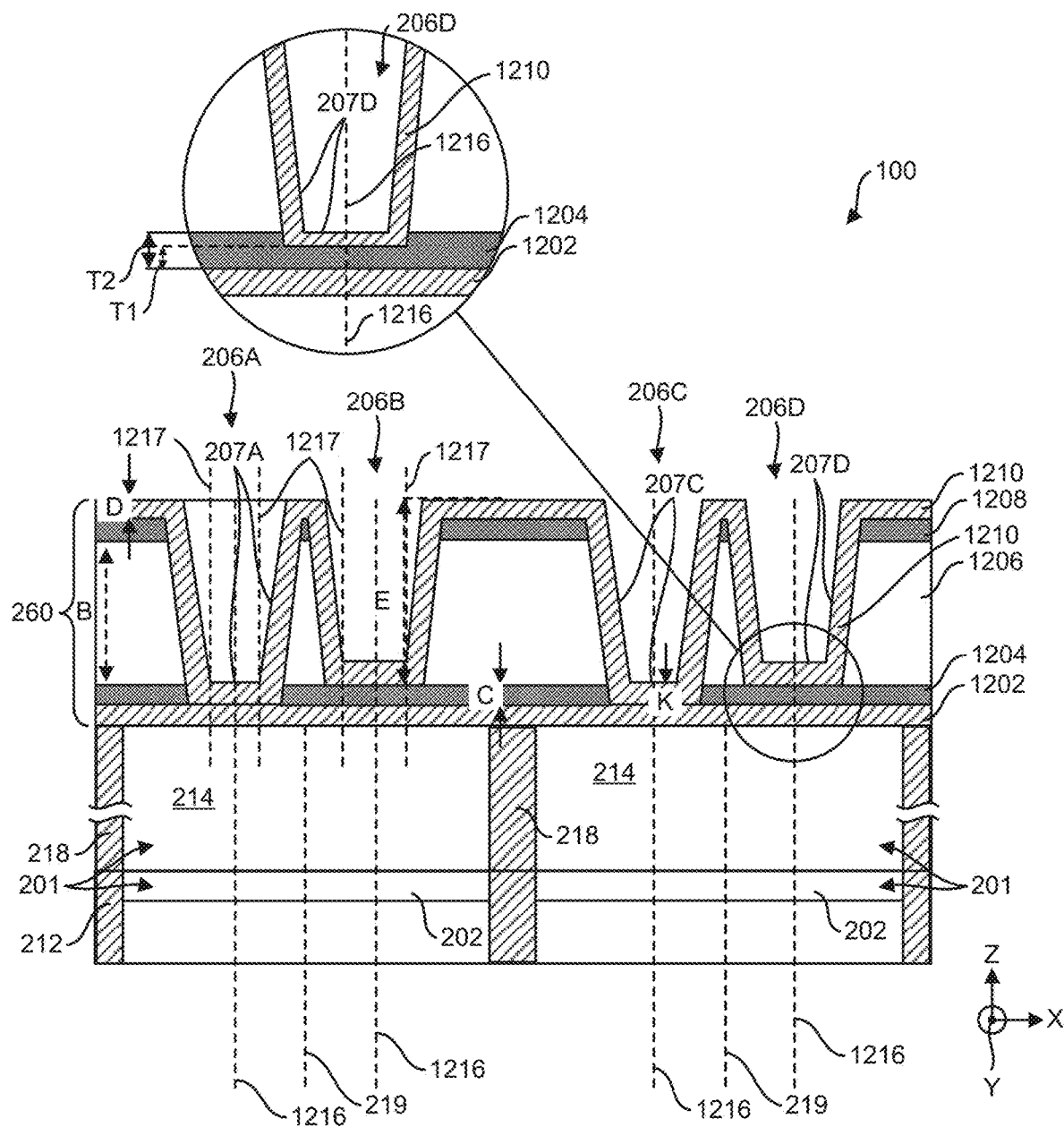
FIG. 19A depicts a cross-section view of a portion of another CMOS sensor with one of two nanowells having a filter to attenuate a cluster signal.

FIG. 19A depicts a top and cross-sectional view of a portion of another CMOS sensor with one of two nanowells 207 having an attenuating filter (attenuator) to attenuate a cluster signal. One of the layers of the CMOS sensor may have an attenuating filter layer. However, this attenuating filter layer may be removed beneath a bottom surface of first nanowell 207A, but not a second nanowell 207B, of the two nanowells 207A and 207B over a pixel 201, which can be defined by light guide 214 in combination with pixel sensor 202. This configuration may therefore not attenuate the cluster signal emitted from the first nanowell 207A. In FIG. 19A, the attenuating filter layer can be provided by attenuating material layer 1204.

In the example of FIG. 19A, apparatus 100 can include attenuating material layer 1204 arranged so that a section of attenuating material layer 1204 defining nanowell 207B is aligned with and below a bottom surface of nanowell 207B but is absent of a section that is aligned with and below a bottom surface of nanowell 207A. The described section of attenuating material layer 1204 aligned with and below a bottom surface of nanowell 207B can be disposed in an emission light path between a bottom surface of nanowell 207B and pixel sensor 202 associated to nanowell 207B but is absent of and aligned to and below the bottom surface of nanowell 207A in a light path between a bottom surface of nanowell 207A and pixel sensor 202 associated to nanowell 207B and nanowell 207A.

Referring to FIG. 19A, light attenuating material layer 1204 can be configured to provide multiple functions. In a first aspect, light attenuating material layer 1204 can inhibit and reduce crosstalk between reaction sites associated to a first pixel 201 (reaction sites 206A and 206B) and a second pixel area 201 (reaction sites 206B and 206C). In another aspect, light attenuating material layer 1204 can purposefully attenuate light emissions from a cluster supported within a reaction site provided by nanowell 207A so as to achieve sequencing with use of a calling chart as set forth in reference to FIGS. 4 and 5.

Figure 19B:
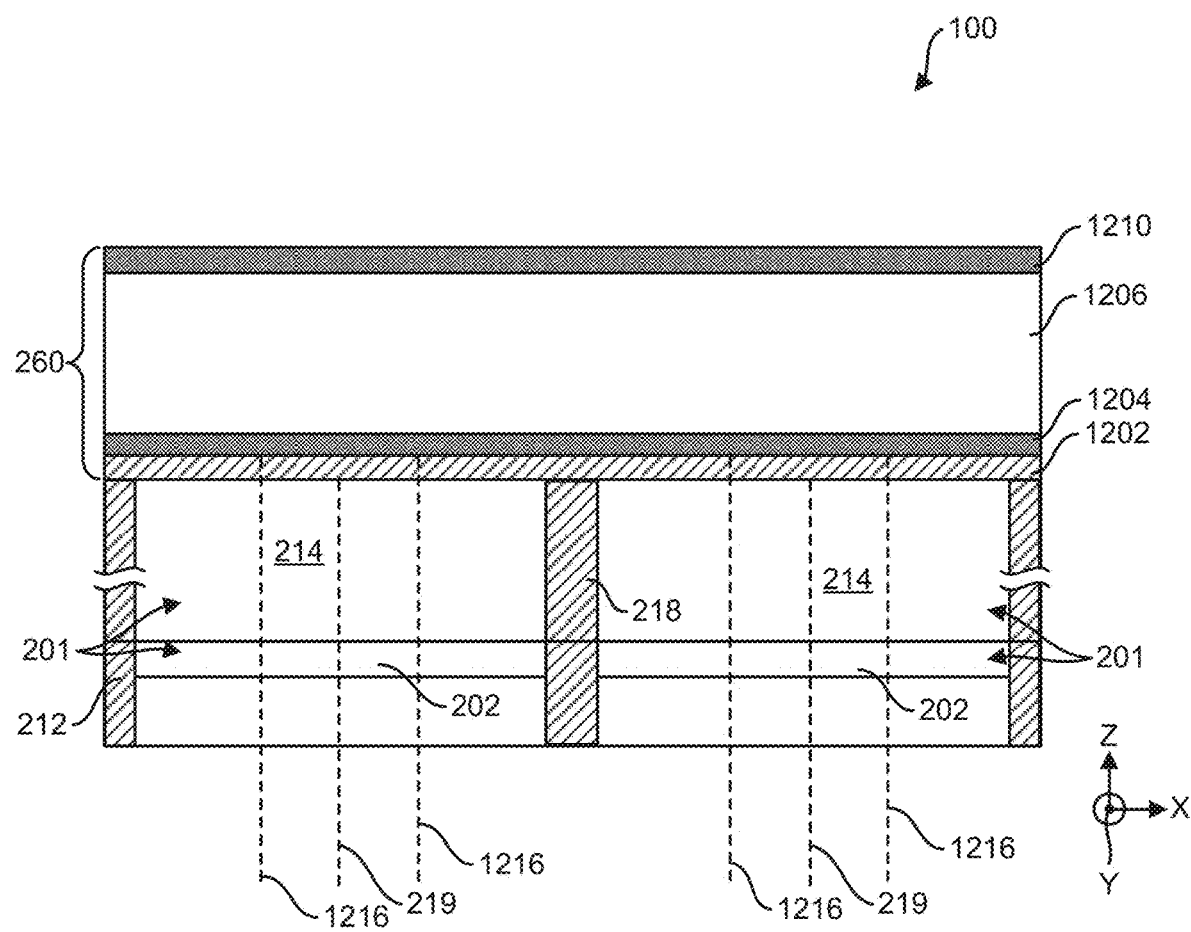
FIG. 19B-19C depict fabrication stage views for fabrication of the structure of FIG. 19A.
Figure 19C:
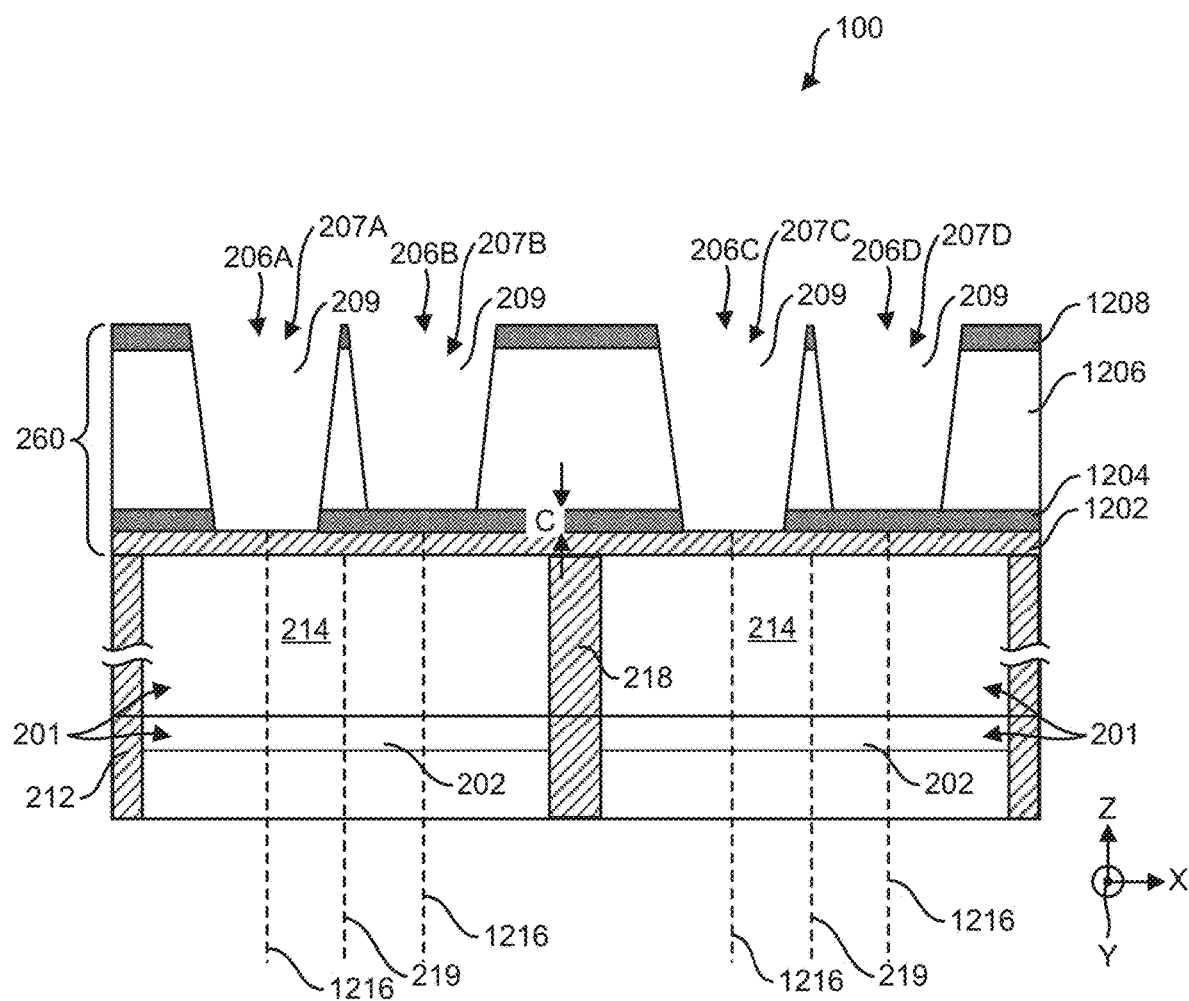

Fabrication stage views for fabricating the apparatus shown in FIG. 19A are set forth in reference to FIGS. 19B and 19C. Referring to the intermediary fabrication stage of FIG. 19B, reaction structure 260 shown in an intermediary stage of fabrication can be deposited on the depicted structure defined by isolation structures 218 and light guides 214. In the intermediary stage of fabrication of FIG. 19B, there can be deposited dielectric layer 1202, light attenuating material layer 1204, dielectric layer 1206, and light attenuating material layer 1210. Referring to the intermediary stage of fabrication of FIG. 19C, trenches 209 for defining reaction sites 206A to 206D provided by nanowells 207A to 207D depicted in an intermediary stage of fabrication in FIG. 19C can be etched. Referring to the intermediary stage of fabrication view of FIG. 19C, the different trenches 209 can be etched to different elevations in different etching stages. In a first etching stage, trenches 209 for reaction site 206A and 206C provided by nanowells 207A and 207C can be etched to an elevation defined by a top elevation of dielectric layer 1202. Then, after filling the described trenches for reaction sites 206A and 206C with a sacrificial material layer, trenches 209 for reaction sites 206B and 206D provided by nanowells 207B and 207D can be etched. The etching for defining nanowells 207B and 207D can include etching down to an elevation defined by a top elevation of attenuating material layer 1204 so that nanowells 207B and 207D have bottom surfaces at a higher elevation than the bottom surfaces for nanowells 207A and 207C, and further so that nanowell 207B and nanowell 207D include an attenuator defined by attenuating material layer 1204 that is not associated to nanowell 207A or nanowell 207C. For final fabrication to achieve the structure of FIG. 19A, dielectric layer 1210 defining a top surface of nanowells 207A to 207D can be deposited within the depicted trenches 209 depicted in FIG. 19C. There is set forth herein, in one example, a method for fabricating an apparatus, wherein the method includes depositing in an area aligned with and over a pixel a dielectric stack having integrally formed therein an attenuating material layer; etching in the dielectric stack a first trench for defining a first nanowell, wherein the first trench is etched to an elevation terminating at or above a top elevation of the attenuating material layer so that the attenuating material layer defines an attenuator for the first nanowell; and etching in the dielectric stack a second trench for defining a second nanowell, wherein the second trench is etched to an elevation terminating at or below a bottom elevation of the attenuating material layer.

Referring to the exploded view portion of FIG. 19A, apparatus 100, according to one example, can be configured in an alternative example so that attenuating material layer 1204 includes first and second thicknesses T1 and T2. Attenuating material layer 1204 can include a first thickness T1 at a section of attenuating material layer 1204 defining nanowell 207D that is aligned and under the bottom surface of nanowell 207D in a light path between a bottom surface of nanowell 207D and pixel sensor 202. Thickness T1 can be less than thickness T2. The providing of the configuration as shown in the alternative example shown in FIG. 19A can facilitate different levels of attenuation in the area below and aligned to a bottom surface of nanowell 207 and areas external to and below and aligned to a bottom surface of nanowell 207. In one example, attenuating material layer 1204 can provide a first smaller level of attenuation, e.g., attenuation at about 50% in a section of attenuating material layer 1204 aligned with and below a bottom surface of nanowell 207D, whereas in the area shown external to sections of attenuating material layer 1204 aligned with and below a bottom surface of nanowell 207D, attenuating material layer 1204 can provide a second level of attenuation, e.g., attenuation at about 90% of incoming light. The arrangement shown in the exploded view of FIG. 19A can be useful, e.g., in the case that a larger level of attenuation is targeted for inhibiting crosstalk than a level of attenuation that is targeted for providing differentiated cluster on signals as set forth herein.

In one example, attenuating material layer 1204 can be fabricated to have multiple elevations by initially depositing light attenuating material layer 1204 to thickness T2 and then etching away a section of attenuating material layer 1204 to defined thickness T1 in the described area aligned to and under a described nanowell bottom surface. In another example, attenuating material layer 1204 can be fabricated with use of first and second depositing stages in which having a first stage in which a sublayer is deposited to thickness T1 and then a second sublayer selectively deposited to define thickness T2. There is set forth herein, according to one example, an apparatus, wherein the apparatus includes an attenuating material layer that includes a first section that extends through an area aligned with and below a bottom surface of the first nanowell to define an attenuator of the nanowell, and second sections extending adjacently laterally from the first section, the first section having first thickness, the second sections having a second thickness, the first thickness less than the second thickness.

Figure 20:
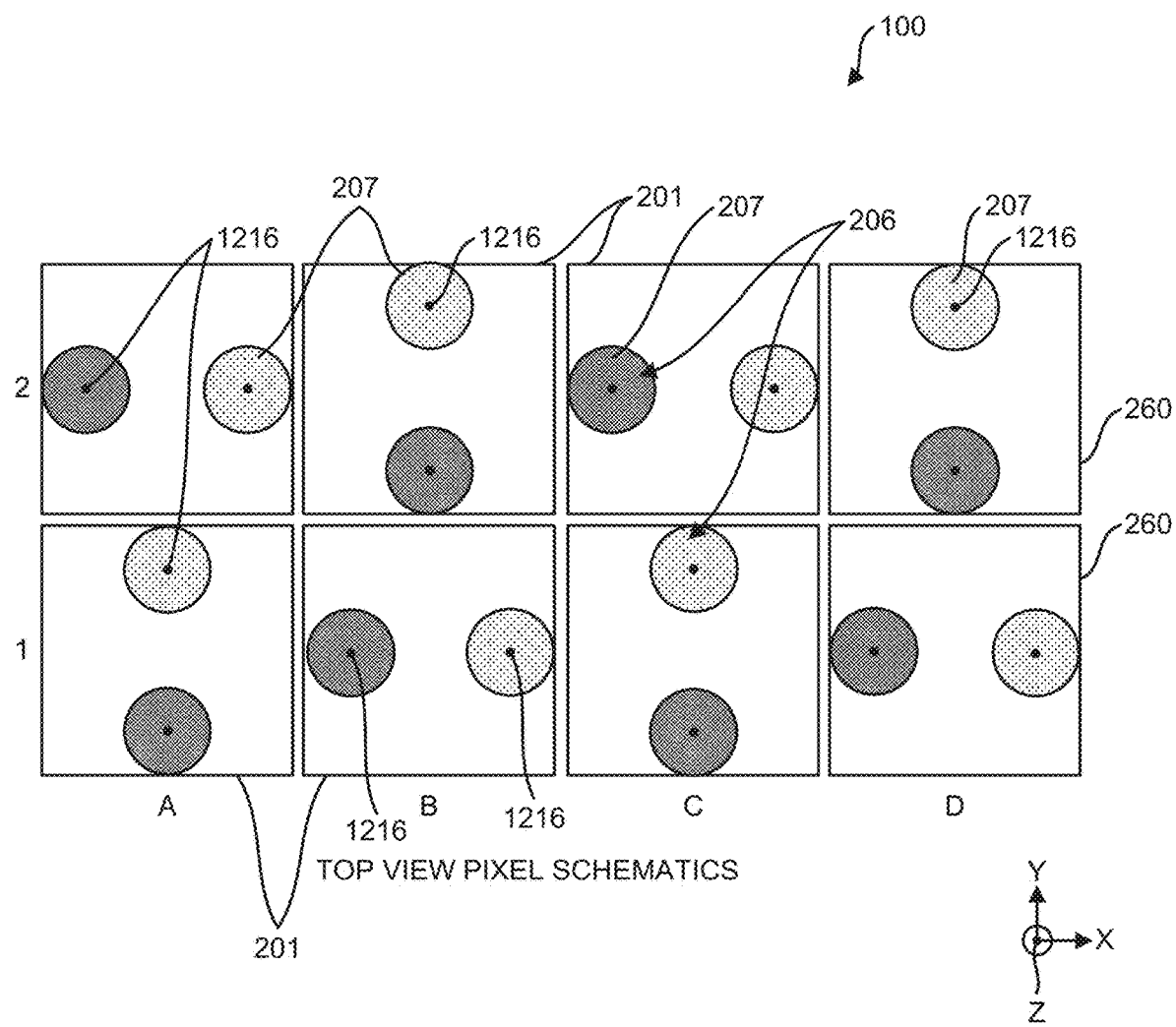
FIG. 20 depicts a top view of a portion of a CMOS sensor showing the arrangement of nanowells over adjacent pixels.

FIG. 20 depicts a top view of a portion of a CMOS sensor showing the arrangement of nanowells 207 over adjacent pixels 201. Referring to FIG. 20, there are shown different sets of reaction sites 206 provided by nanowells 207 associated to different pixels 201. In FIG. 20, it is seen that a set of reaction sites 206 provided by nanowells 207 associated within a particular rectangle is associated to a particular one pixel of pixels 201. The different pixels 201 depicted in FIG. 20 can have different pixel positions A1-D2.

Referring to FIG. 20, it is seen that sets of reaction sites 206 provided by nanowells 207 associated to adjacent pixels 201 defining a pixel array can have different orientations. Referring to FIG. 20, the nanowells 207 associated to a first pixel having the pixel location A1 can have a first orientation and the nanowells 207 associated to a second pixel having the pixel location B1 can have a second orientation different from the first orientation. The same pattern between adjacent pixels 201 can be repeated throughout the depicted pixel array. The described first orientation can be characterized by first and second reaction sites provided by nanowells that are spaced apart from a top view in a depth dimension direction, i.e., back to front direction, and the second set of pixels can have an orientation characterized by the first and second reaction sites 206 provided by nanowells 207 being spaced apart in a width dimension direction, which can otherwise be termed as a lateral direction or side-to-side direction. The described first direction can also be referred to as a direction parallel to the Y axis, and the described second direction can be referred to as a direction parallel to the X axis of the indicated reference coordinate system. In another aspect, the set of reaction sites provided by nanowells associated to pixels 201 at pixel locations A1, C1, B2, D2 can have the first orientation, and the pixel in the set of reaction sites 206 provided by nanowells 207 associated to pixels 201 at the depicted pixel location B1, D1, A2, C2 can have a second orientation different from the first orientation.

Figure 21:
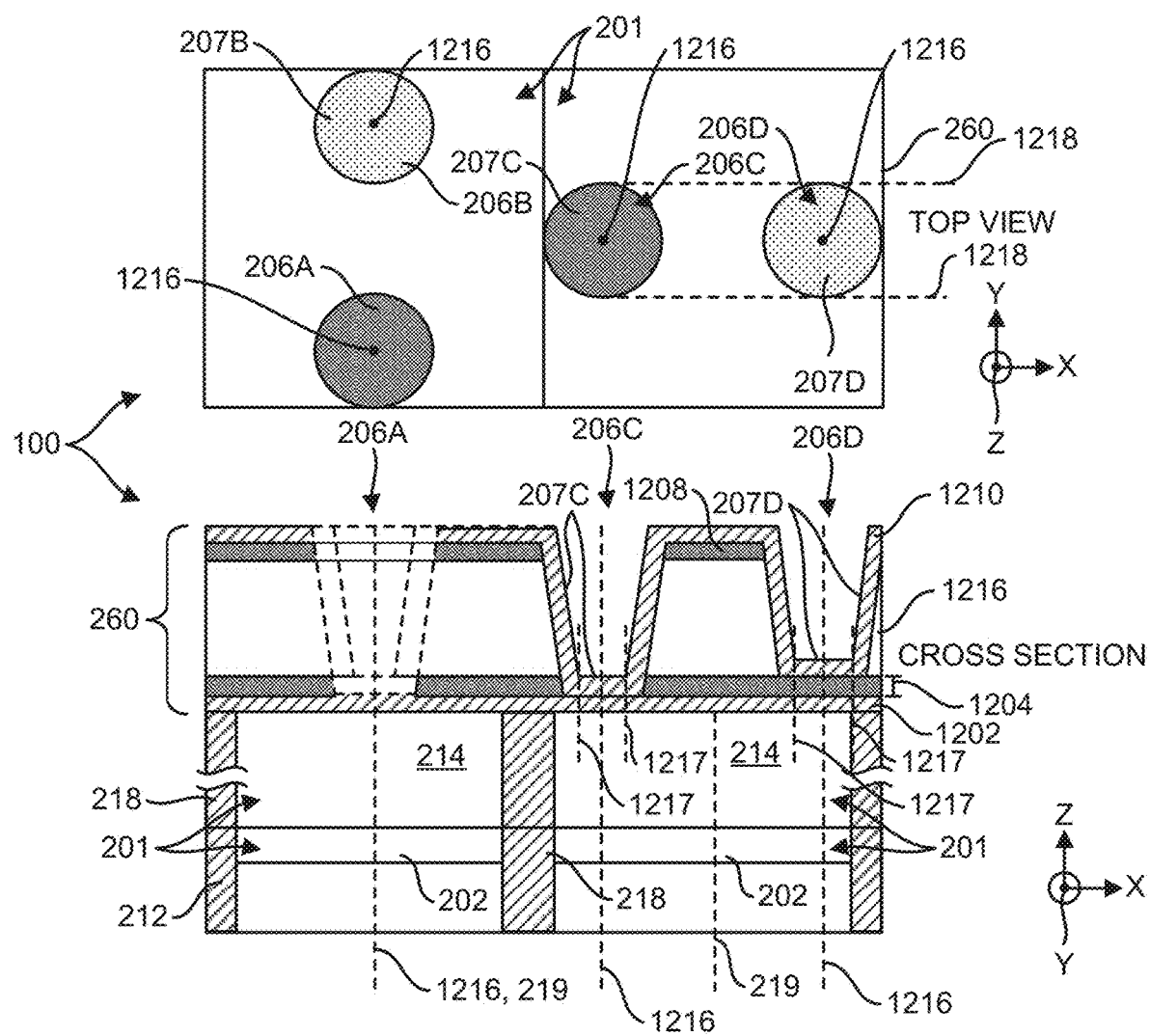
FIG. 21 depicts a top view and corresponding cross-section view of a portion of a CMOS sensor showing the arrangement of nanowells over adjacent pixels.

FIG. 21 depicts a top and cross-section view of a portion of a CMOS sensor showing the arrangement of sets of nanowells 207 over adjacent pixels 201 according to the example of FIG. 20. The lighter circles represent attenuated wells (that is, the nanowells 207 in which the cluster signal is attenuated), while the darker circles represent the unattenuated wells (that is, the nanowells 207 in which the cluster signal is not attenuated). In some examples, it may be preferable to maximize the distance between the nanowells, for example, in an effort to reduce crosstalk detected by the pixel sensor 202 from adjacent wells. FIGS. 20 and 21 depict perpendicular nanowell orientations between adjacent pixels. For example, if a first pixel 201, e.g., at location A1 has a nanowell orientation from left to right, the second pixel 201 at location B1 adjacent to the first pixel 201 may have a nanowell orientation from top to bottom (back to front).

FIG. 21 depicts a top and cross-sectional view of an example, according to the example shown in FIG. 20. In FIG. 21, darker shaded reaction sites 206A and 206C depict reaction sites defined by nanowell 207A and nanowell 207C, respectively, that are without an attenuator for attenuating emission light rays radiating vertically downward from the bottom surface of a respective nanowell 207A and 207C in a direction parallel to the depicted Z axis of the reference coordinate system, and the lighter shaded reaction sites 206B and 206D are reaction sites having an attenuator for attenuating emission light rays of emission light 501 radiating vertically downward from a bottom surface of nanowell 207D in a direction parallel to the depicted Z axis of the reference coordinate system. In the example of FIG. 21, reaction site 206D provided by nanowell 207D can be characterized by having an attenuator defined by a section of attenuating material layer 1204 for attenuating emission light rays of emission light 501 radiating vertically downward from a detector surface 208 defining a bottom of nanowell 207D.

Referring to FIG. 20 and FIG. 21, it can be seen that configuring reaction sites provided by nanowells associated to adjacent pixels to have different alternating orientations can increase the spacing distance between reaction sites associated to adjacent pixels. For example, it can be seen that if the reaction sites 206 associated to the pixels at pixel areas B1 and A1 were each spaced apart in a width dimension direction (laterally or side-to-side, i.e. both oriented as shown with respect to pixel area B1), the minimal spacing distance between reaction sites of the pixel area B1 and pixel area A1 would be reduced, perhaps beyond the capability of fabrication, and can increase a crosstalk between a reaction site associated to a certain pixel 201 and neighboring pixel adjacent to the certain pixel 201 not associated to the reaction site.

Figure 22:
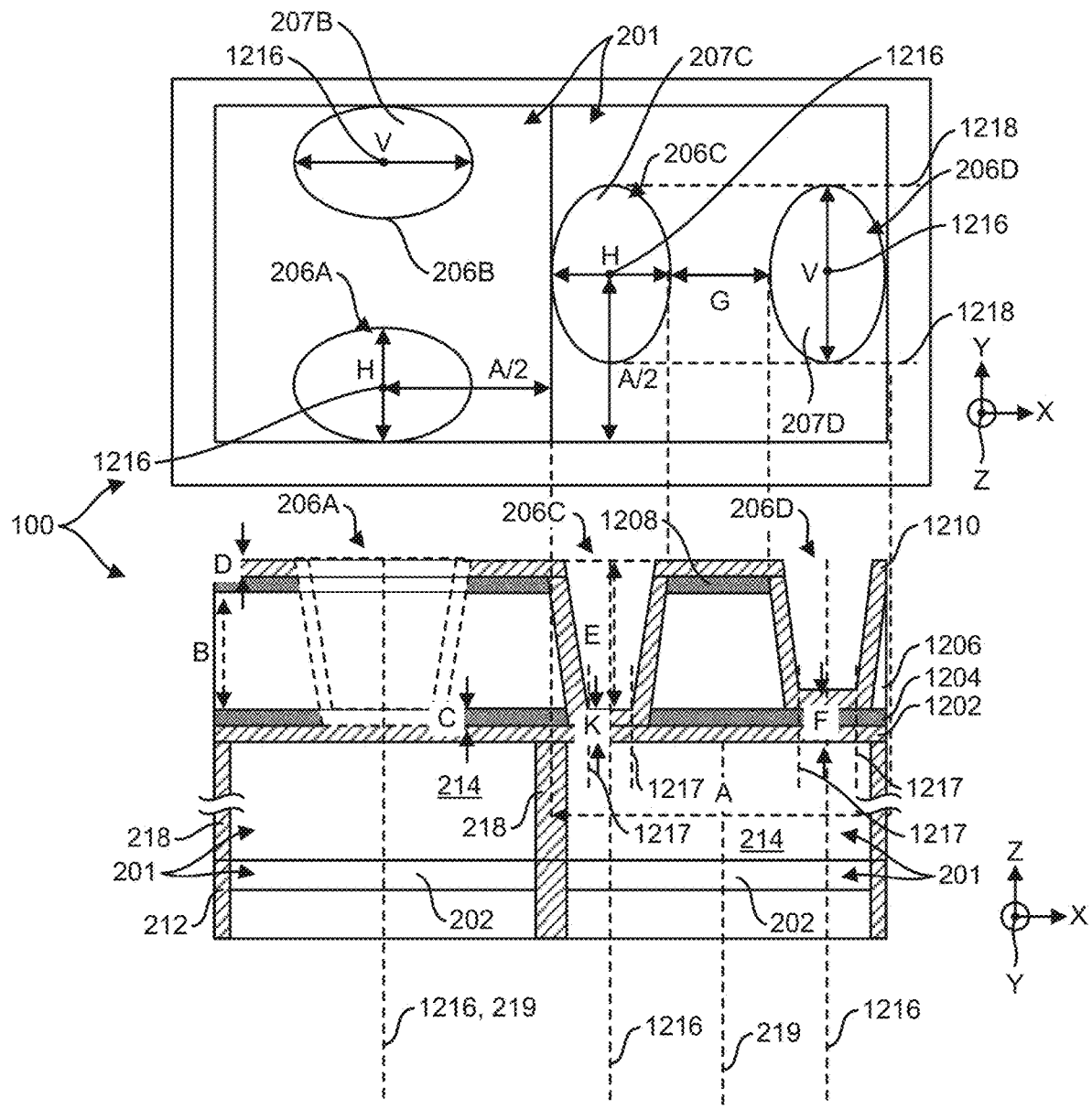
FIGS. 22-25 depict top and cross-section views of a portion of a CMOS sensor according to alternative examples.
Figure 23:
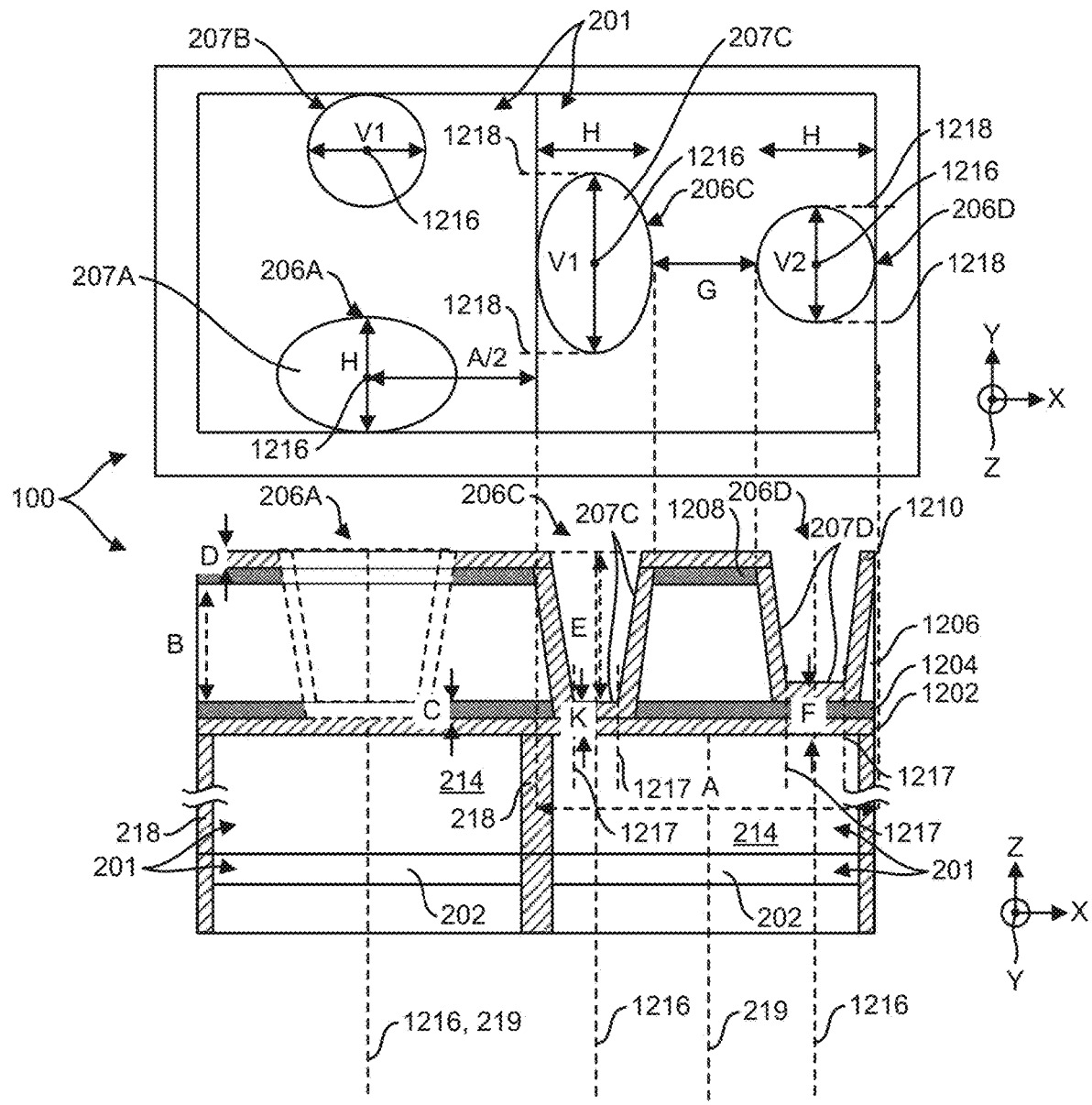
Figure 24:
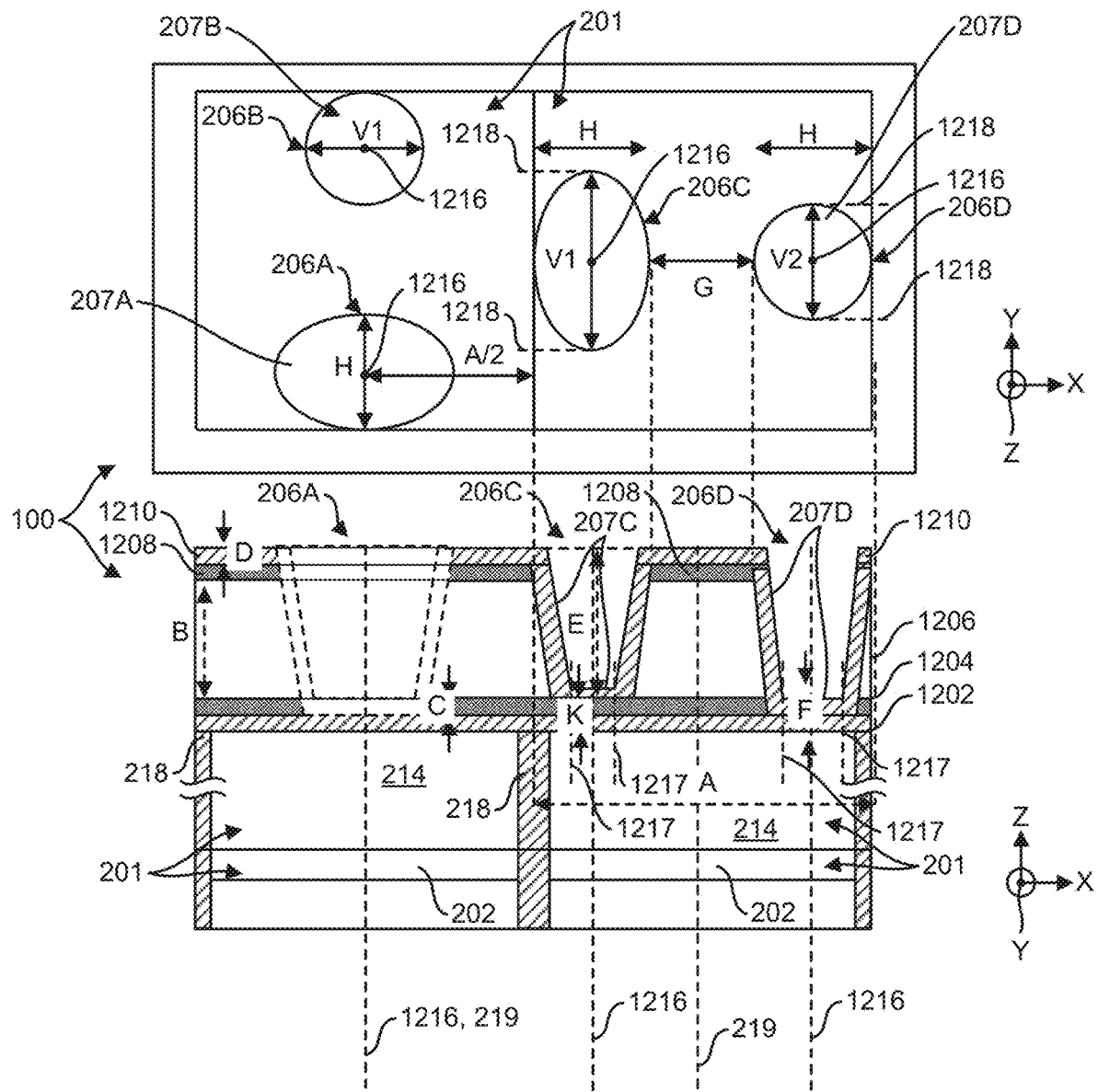

Variations, according to the examples of FIG. 21, are illustrated in FIGS. 22-24. In the example of FIG. 22, the depicted reaction sites provided by nanowells 207A-207D have defined oval shapes from a top view rather than a circle shape from the top view as depicted in FIG. 21. In the example of FIG. 23, the reaction sites 206A-206D provided by nanowells 207A-207D have first and second different shapes and different sizes. Nanowells 207B and 207D are circle shaped from a top view, whereas reaction sites 206A and 206C provided by nanowells 207A and 207C have oval shapes from a top view and are larger in terms of nanowell bottom surface area than are nanowells 207B and 207D.

In the example of FIG. 23, the smaller bottom surface area sized nanowells 207D and 207B have attenuators defined by a section of attenuating material layer 1204 intersecting center axis 1216 of nanowell 207D and nanowell 207B, wherein the associated attenuator associated to nanowell 207D and nanowell 207B are arranged for attenuating emission light rays of emission light 501 radiating vertically downward from a surface defining a bottom of nanowell 207D and nanowell 207B. In the example of FIG. 23, the nanowells 207C and nanowell 207A are absent of attenuators that attenuate emission light rays of emission light 501 radiating vertically downward from the detector surface 208 defining a bottom of respective nanowell 207C and nanowell 207A.

The example of FIG. 24 is similar to the example of FIG. 23, except that in the example of FIG. 24, attenuators defined by attenuating material layer 1204 are associated to the larger nanowells 207C and nanowell 207A but are absent from and not associated to the smaller bottom surface area's nanowells 207D and nanowell 207 B. Examples herein recognize that the presence or absence of an attenuator can have a larger impact on cluster signal on signal strength than nanowell size. In the example of FIG. 24, the presence or absence of an attenuator can be used to provide coarse tuning of cluster signal "on" signal amplitude and nanowell size can be used to provide fine tuning of cluster signal "on" signal amplitude.

Referring to FIG. 24, an area defining nanowell 207C below and aligned to a bottom surface of nanowell 207C can include an attenuator, i.e., the attenuator defined by attenuating material layer 1204, and an area defining nanowell 207D below and aligned to a bottom surface of nanowell 207D, nanowell 207D can be absent of an attenuator as shown in FIG. 24.

The area defining nanowell 207C aligned to and below a bottom surface of nanowell 207C can include an area bounded by vertically extending planes 1217 intersecting a bottom surface of nanowell 207C at the largest width of nanowell 207C in the indicated X axis dimension. The area defining nanowell 207C aligned to and below a bottom surface of nanowell 207C can include an area in a light path between a bottom surface of nanowell 207C and pixel sensor 202 associated to nanowell 207C that is bounded by vertically extending planes 1218 intersecting a bottom corner of nanowell 207C at the points of maximum depth of nanowell 207C in a direction extending parallel to the indicated reference Y axis.

The area defining nanowell 207D below and aligned to a bottom surface of nanowell 207D can include an area in a light path between a bottom surface of nanowell 207D and pixel sensor 202 associated to a nanowell 207D bounded by vertically extending planes 1217 intersecting corners of a bottom surface of nanowell 207D at the largest width of the bottom of nanowell 207D in a direction parallel to the reference X axis and bounded by vertically extending planes 1218 intersecting corners at a bottom surface of nanowell 207D at positions defining the maximum depth of nanowell 207D in a direction extending parallel to the reference Y axis indicated in FIG. 24.

The same relationship is depicted in FIG. 24, wherein an area aligned to and below a bottom surface of a first nanowell in a light path between the bottom surface of the nanowell and its associated pixel sensor 202 includes an attenuator, and an area aligned to and below a bottom surface of a second nanowell in a light path between the second nanowell and the pixel sensor 202 associated to the first nanowell and the second nanowell is absent of an attenuator is shown throughout the views, including with respect to FIG. 6, FIG. 8, FIG. 9, FIG. 10, FIG. 11, FIG. 16, FIG. 18, FIG. 19, FIG. 20, FIG. 21, FIG. 22, FIG. 23, and FIG. 24 (FIGS. 6, 8-11, 16, 18-24).

In the examples of FIGS. 6, 8-11, 16, 18-24, the apparatus can be configured with use of attenuating material so that attenuation of emission light from the first nanowell is increased relative to an attenuation of emission light from the second nanowell. In the example of FIGS. 6, 8-11, 16, 18-24, the apparatus can be configured so that the first nanowell includes an attenuator and the second nanowell is absent of an attenuator. In the examples of FIGS. 6, 8-11, 16, 18-24, the apparatus can be configured so that the first nanowell includes an attenuator for attenuating emission light radiating vertically downward from a bottom surface of the first nanowell and wherein the second nanowell is absent of an attenuator for attenuating emission light radiating vertically downward from a bottom surface of the second nanowell. In the examples of FIGS. 6, 8-11, 16, 18-24, the apparatus can be configured so that the first nanowell includes in an area below a bottom surface of the first nanowell an attenuator, and wherein the second nanowell in an area below a bottom surface of the second nanowell is absent of an attenuator. In the examples of FIGS. 6, 8-11, 16, 18-24, the apparatus can be configured so the first nanowell includes in an area directly below a bottom surface of the first nanowell an attenuator, and wherein the second nanowell in an area directly below a bottom surface is absent of an attenuator. In the examples of FIGS. 6, 8-11, 16, 18-24, the apparatus can be configured so that the first nanowell includes in an area aligned with and below a bottom surface of the first nanowell an attenuator, and wherein the second nanowell is absent of an attenuator in an area aligned with and below a bottom surface of the second nanowell. In one aspect the area aligned with and below a bottom surface of a nanowell can be an area intersected by a vertically extending center axis 1216 of a nanowell. In one aspect, the area aligned with and below a bottom surface of a nanowell can be an area bounded by vertically extending planes 1217 and 1218 as set forth herein.

Figure 25:
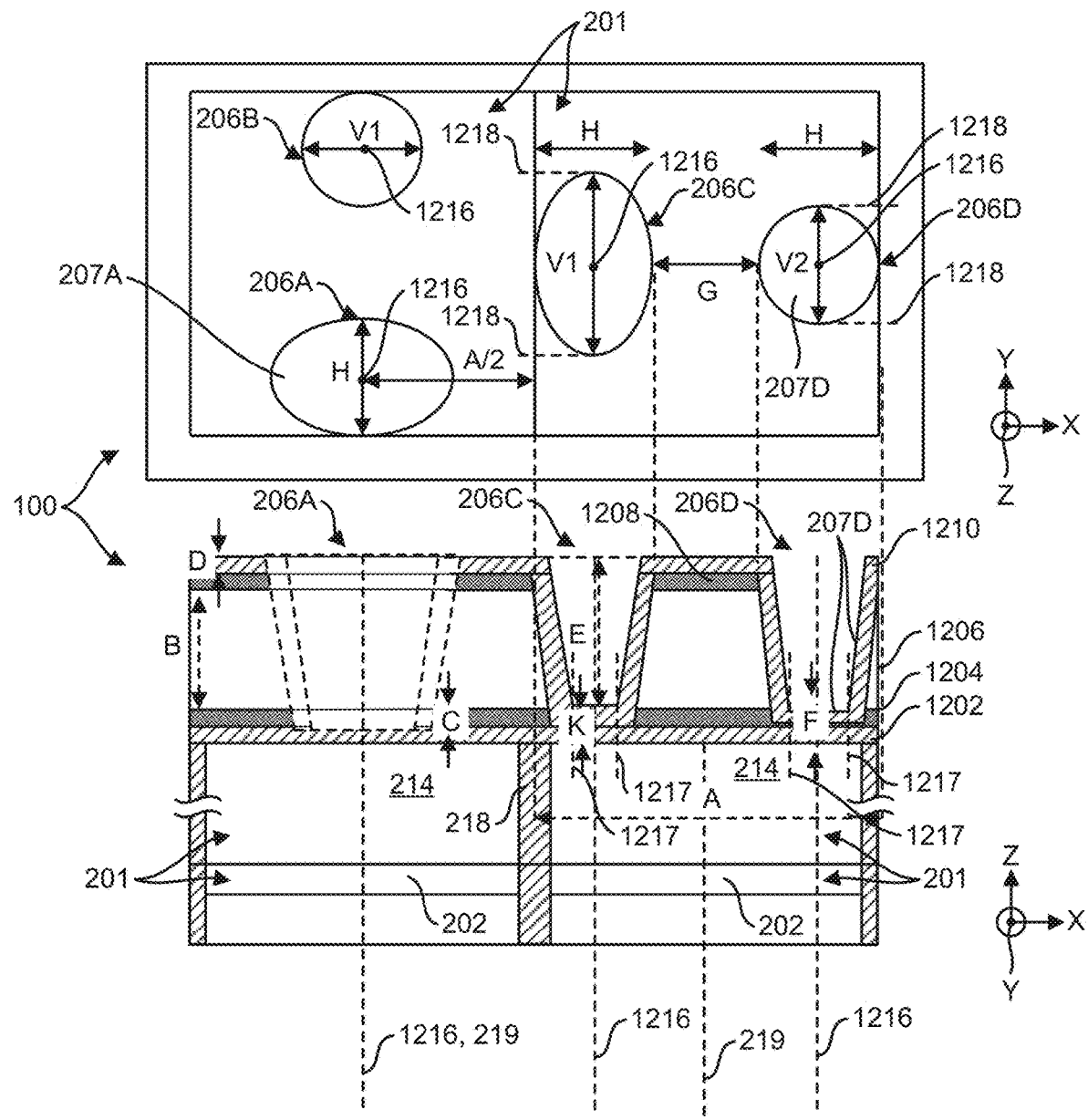

In the example of FIG. 25, each of the smaller sized nanowells 207D and 207B and the larger sized nanowell 207C and nanowell 207A are absent of attenuators for attenuating emission light rays of emission light 501 radiating vertically downward from a detector surface 208 defining a bottom of respective nanowells 207A-207D.

Exemplary dimensions according to examples as set forth in reference to FIGS. 22-25 can be provided as summarized in Table A.

Referring to the views of FIGS. 16-25, reaction structure 260 can be defined by a dielectric stack having a plurality of dielectric layers including dielectric layer 1202, dielectric layer 1206, and dielectric layer 1210, which dielectric layer 1210 can define detector surface 208 as shown in FIG. 13. There can be integrally formed within the dielectric stack defining reaction structure 260 one or more attenuating material layer including attenuating material layer 1204, attenuating material layer 1205, and/or attenuating material layer 1208. Exemplary dimensions for the examples shown in FIGS. 16-25 are set forth in reference to Table B. Materials of the various layers as illustrated on Table B can be the materials summarized in Table A or elsewhere herein.

TABLE B

| Feature | Exemplary Dimensions |
|---|---|
| Nanowell height | 300 nm-400 nm |
| Nanowell width (standard version with all nanowells the same size) | 600 nm diameter |
| Nanowell width (2W width for FIG. 7, and FIG. 17) | ~600 nm |
| Nanowell width (1W width for FIG. 7 and FIG. 17) | ~300 nm |
| Attenuating material layer 1204 | ~15 nm-25 nm |
| Pixel pitch | 1000 nm |
| Pixel width | 1000 nm The pixel pitch is 1000 nm |
| Reaction structure surface 208 to pixel sensor 202 distance | ~3-4 um, |
| Layer 1202 (Lower dielectric thickness) | ~50 nm |
| Layer 1210 (nanowell lining dielectric thickness) | ~50 nm |

In reference again to FIG. 13, apparatus 100 can include processing circuitry 310. Processing circuitry 310 can include, according to one example, one or more processors 3101, memory 3102, and one or more input/output interface 3103. One or more processors 3101, memory 3102 and one or more input/output interface can be connected via system bus 3104. Memory 3102 can include a combination of system memory and storage memory. Memory 3102, according to one example, can store one or more programs for facilitating processes that are set forth herein. One or more processors 3101 can run one or more programs stored in memory 3102 to facilitate processes as is set forth herein. Memory 3102 can define a computer readable medium.

Figure 26:
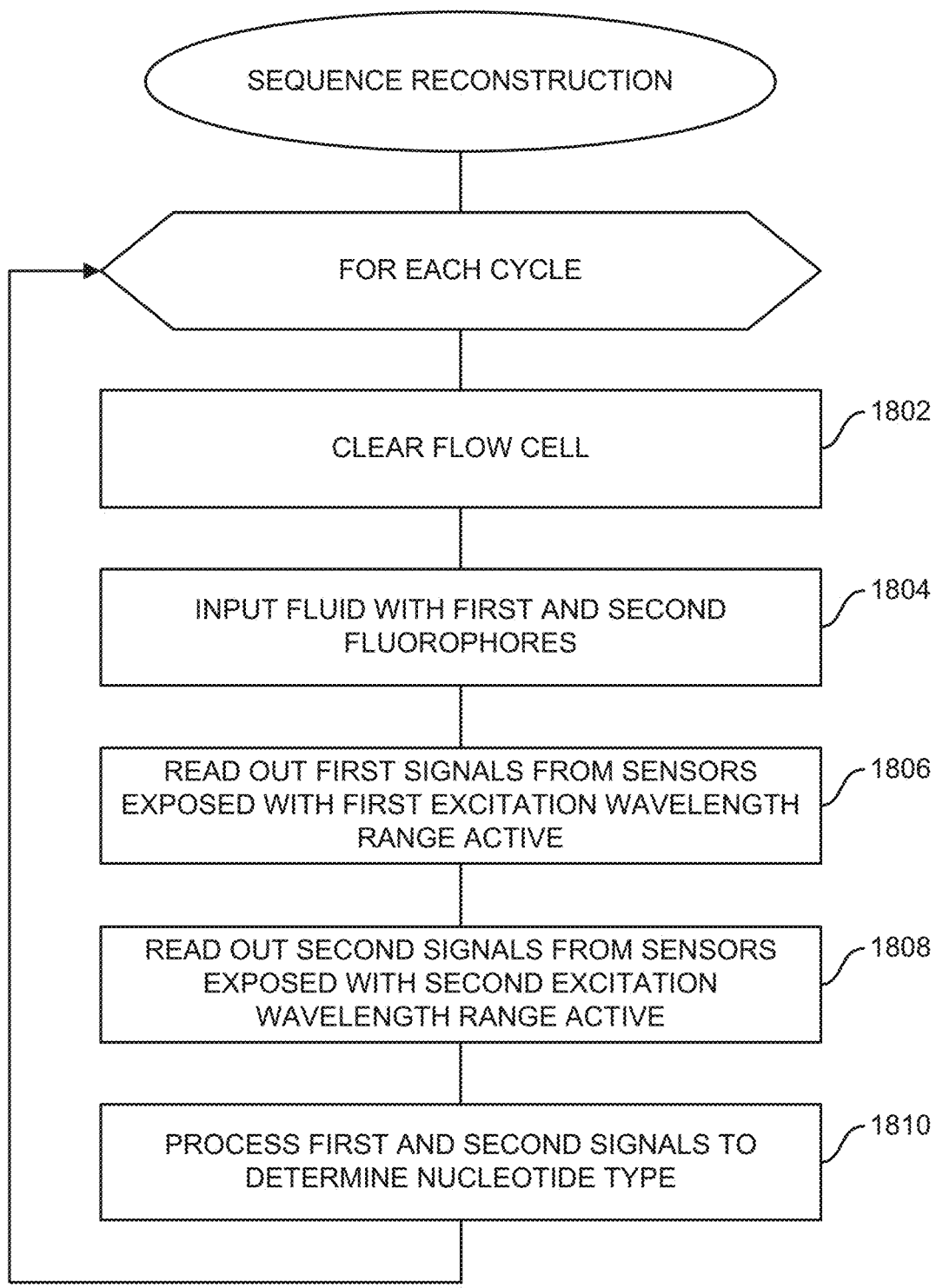
FIG. 26 is a flowchart depicting a method that can be used in support of a DNA sequencing for DNA sequence reconstruction.

A DNA sequencing process facilitated by light energy exciter 10 is described with reference to FIGS. 13, 15, and 26. Referring to FIG. 15, there is shown a spectral profile coordination diagram illustrating aspects of the operation of

TABLE A

| Dimension | Example of FIG. 22 | Example of FIG. 23 | Example of FIG. 24 | Example of FIG. 25 |
|---|---|---|---|---|
| A - Pixel pitch (nm) | 1000 | 1000 | 1000 | 1000 |
| B - Height of SiN-II layer 1206 (nm) | 350 | 350 | 350 | 350 |
| C - Height of Ta/TaO-I layer 1204 (nm) | ~15 nm-25 nm | ~15 nm-25 nm | ~15 nm-25 nm | ~15 nm-25 nm |
| D - Height of TaOx-II layer 1210 (nm) | 75 | 75 | 75 | 75 |
| E - Height of NW (nm) | 525 | 525 | 525 | 525 |
| G - NW spacing | 300 | 300 | 300 | 300 |
| H - NW opening - top CD (nm) | 350 | 350 | 350 | 350 |
| V1 - NW opening - top CD (nm) (V in FIG. 22) | 540 | 540 | 540 | 540 |
| V2 - NW opening - top CD (nm) | — | 360 | 360 | 360 |
| K - Ta/TaO-II layer (nm), combined thickness of layer 1202 and layer 1210 | 125 | 125 | 125 | 125 |
| F - combined thickness of layer 1202, layer 1204, and layer 1206 | 175 | 175 | 175 | — | apparatus 100. According to one example, light energy exciter 10 can be configured to emit light at first and second different wavelengths. As indicated in FIGS. 1-12, providing excitation light at first and second different wavelength ranges facilitates dye chemistry DNA sequence reconstruction processes in which first and second dyes can be disposed in fluid within flow cell 282.

In the spectral profile coordination diagram of FIG. 15, spectral profile 1101 shown as a green light spectral profile is the spectral profile of excitation light 101 as emitted by light energy exciter 10. Spectral profile 1501 is the spectral profile of the emission light 501 caused by the fluorescence of a fluorophore on being excited by excitation light 101. Spectral profile 1220 is the transmission profile (detection band) of pixel sensors 202, according to one example. It will be understood that the spectral profile coordination diagram of FIG. 2 is intended to represent general features common to some examples, but that variations of the indicated spectral profiles are common. In one aspect, excitation light 101 can commonly include, in addition to a green light spectral profile, a blue light spectral profile (not shown) wherein apparatus 100 is switchable between modes in which (a) the green light spectral profile is active with the blue light spectral profile being inactive, and (b) the blue light spectral profile is active with the green light spectral profile being inactive. In other examples, there can be different combinations of excitation light 101 and emission light 501. In one example, the spectral profile 1101 of excitation light 101 can feature a center wavelength in the blue light wavelength range and the spectral profile of emission light 501 can feature a center wavelength in the green wavelength range.

Examples herein recognize in reference to the spectral profile coordination diagram of FIG. 15 that processing circuitry 310 can be configured to (a) determine that the first fluorophore is attached to a respective cluster C1, C2 based on fluorescence being sensed by a pixel sensor 202 under excitation restricted to excitation by one or more green emitting light sources and fluorescence not being sensed by the pixel sensor 202 under excitation restricted to excitation by one or more blue emitting light source; (b) determine that the second fluorophore is attached to a cluster C1, C2 based on fluorescence being sensed by a pixel sensor 202 under excitation restricted to excitation by one or more blue emitting light sources and fluorescence not being sensed by the pixel sensor 202 under excitation restricted to excitation by one or more green emitting light sources; and (c) determine that the third fluorophore is attached to a cluster C1, C2 based on fluorescence being sensed by a pixel sensor 202 under excitation restricted to excitation by one or more green emitting light sources and fluorescence also being sensed by the pixel sensor 202 under excitation restricted to excitation by one or more blue emitting light sources.

Processing circuitry 310 can discriminate which fluorophores have attached to clusters, and can determine nucleotide types, e.g., A, C, T, and G that are present in a fragment of a DNA strand providing a cluster C1, C2, e.g., using a decision logic data structure indicated by the calling chart of FIGS. 4 and 5 expressed in the decision logic table of Table C mapping fluorophore presence to nucleotide type, where discriminated nucleotides Nucleotide-Nucleotide4 are nucleotides of the nucleotide types A, C, T and G (the particular mapping based on the test setup parameters). Examples herein recognize that sensed output signal levels under different bands of narrow band illumination can be mapped to a particular cloud based on closest Euclidian distance.

TABLE C

| Row | Cloud (signal levels under illumination by first and second narrow bands, specified by cloud centroid) | Nucleotide indicated for first cluster C1 supported in first nanowell associated to a certain pixel | Nucleotide indicated for second cluster C2 supported in a second nanowell associated to a certain pixel |
|---|---|---|---|
| 1 | 50, 50 | G | G |
| 2 | 200, 50 | A | G |
| 3 | 400, 50 | G | A |
| 4 | 575, 50 | A | A |
| 5 | 50, 200 | C | G |
| 6 | 200, 200 | T | G |
| 7 | 400, 200 | C | A |
| 8 | 575, 200 | T | A |
| 9 | 50, 400 | G | C |
| 10 | 200, 400 | A | C |
| 11 | 400, 400 | G | T |
| 12 | 575, 400 | A | T |
| 13 | 50, 575 | C | C |
| 14 | 200, 575 | T | C |
| 15 | 400, 575 | C | T |
| 16 | 575, 575 | T | T |

Processing circuitry 310 can run a process in support of DNA sequence reconstruction in a plurality of cycles. In each cycle, a different portion of a DNA fragment can be subject to sequencing processing to determine a nucleotide type, e.g., A, C, T, or G, associated to the fragment, e.g., using a decision data structure such as a decision data structure as set forth in FIGS. 4 and 5 and Table C. Aspects of a process which can be run by processing circuitry 310 for use in performing DNA sequence reconstruction using light energy exciter 10 is described in the flowchart of FIG. 26.

At block 1802, processing circuitry 310 can clear flow cell 282, meaning processing circuitry 310 can remove fluid from flow cell 282 used during a prior cycle. At block 1804, processing circuitry 310 can input into flow cell 282 fluid having multiple fluorophores, e.g., first and second fluorophores, or first, second, and third fluorophores.

At block 1806, processing circuitry 310 can read out signals from pixel sensors 202 exposed with a first wavelength range of excitation light 101 active. At block 1806, processing circuitry 310 can control light energy exciter 10 so that during an exposure period of pixel sensors 202, light energy exciter 10 emits excitation light 101 restricted to excitation by one or more green light sources. At block 1806, processing circuitry 310 can, during an exposure period of pixel sensors 202, energize each one or more green emitting light energy exciter 10. With light energy exciter 10 being controlled as described so that green light sources are on and blue light sources are off during an exposure period of pixel sensors 202, processing circuitry 310 at block 1806 can read out first signals from pixel sensors 202 exposed with excitation restricted to excitation by one or more green light sources as set forth herein, including with reference to the spectral profile coordination diagram of FIG. 15.

At block 1808, processing circuitry 310 can read out signals from pixel sensors 202 exposed with a second wavelength range excitation active. At block 1808, processing circuitry 310 can control light energy exciter 10 so that during an exposure period of pixel sensors 202, light energy exciter 10 emits excitation light restricted to excitation by one or more blue light sources of light energy exciter 10. At block 1808, processing circuitry 310 can, during an exposure period of pixel sensors 202, energize each of one or more blue emitting light sources of light energy exciter 10 while maintaining in a deenergized state each one or more green emitting light sources of light energy exciter 10. With light energy exciter 10 being controlled as described so that blue light sources are on and green light sources are off during an exposure period of pixel sensors 202, processing circuitry 310 at block 1808 can read out second signals from pixel sensors 202 exposed with excitation restricted to excitation by one or more blue light sources of light energy exciter 10 as set forth herein.

At each of block 1806 and block 1808, light energy exciter 10 can be directing excitation light 101 in the referenced narrow band (green light in block 1806 and blue light at block 1808) to all reaction sites 206 of reaction structure 260 simultaneously so that all clusters C1, C2, supported by reaction structure 260, including clusters C1 and C2 disposed in adjacent nanowells 207, 207A-207B, 207C-207D that are commonly associated to a certain one pixel 201, are simultaneously excited with the narrow band excitation light 101 described with reference to block 1806. Accordingly, embodiments herein recognize that apparatus 100 can facilitate sequencing without precision directional control of excitation light. In other examples, excitation can advantageously be performed with use of precision directional control of excitation light 101 so that a first nanowell 207, 207A-207B, 207C-207D associated to a certain pixel of pixel sensors 202 is excited without exciting a second nanowell 207, 207A-207B, 207C-207D associated to the certain pixel of pixel sensors 202.

At block 1810, processing circuitry 310 for the current cycle can process the first signals read out at block 1806 and the second signals read out at block 1808 to determine a nucleotide type of the DNA fragment being subject to testing during the current cycle, e.g., using a decision data structure as set forth in FIGS. 4 and 5 and Table C, according to one example. Processing circuitry 310 can perform the described nucleotide identification process described with reference to the flowchart of FIG. 26 for each cycle of the DNA sequencing process until nucleotide identification is performed for each scheduled cycle.

Figure 27B:
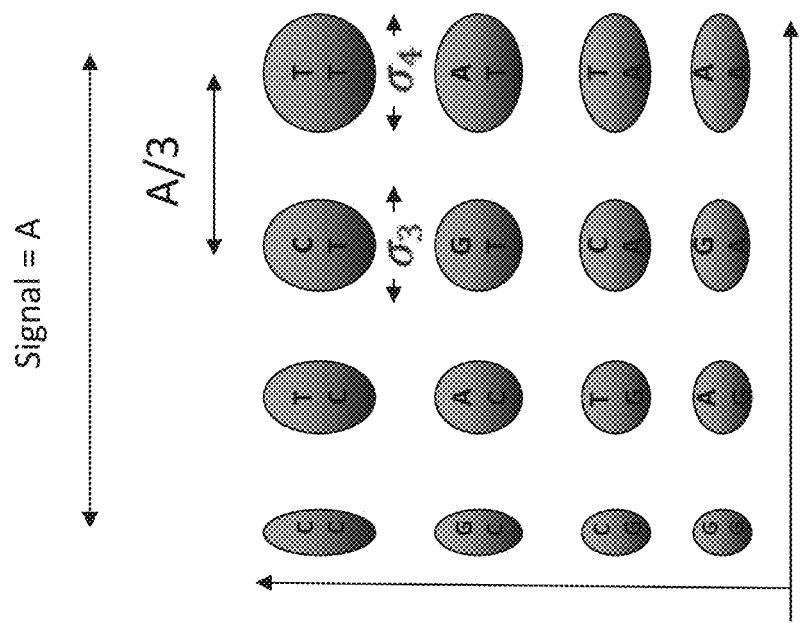
FIG. 27A-27B are charts depicting signal to noise considerations in a multiple reaction site per pixel design.
Figure 27A:
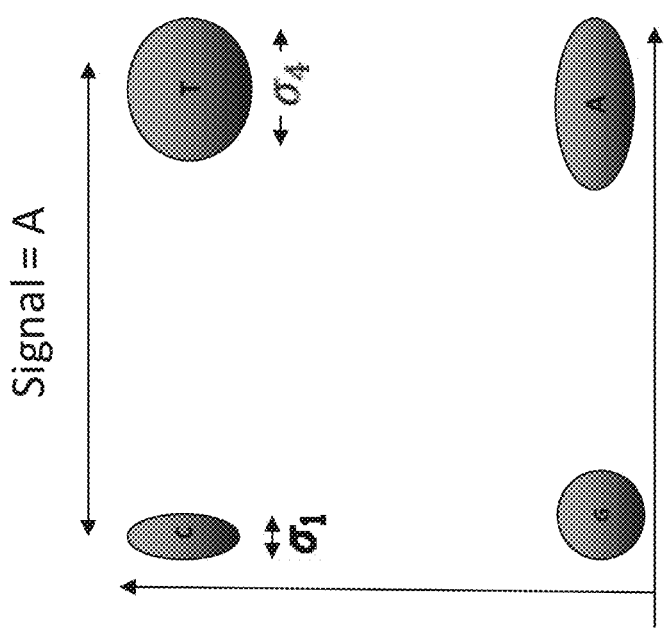

FIGS. 27A and 27B are diagrams illustrating signal to noise design considerations in the production of apparatus herein having multiple reaction sites per pixel. FIG. 27A depicts a calling chart for an apparatus having a single reaction site per pixel wherein there are four possible clouds defined by a first cluster signal under excitation in a first channel in combination with the first cluster signal under excitation by a second channel of excitation light. In the example shown in FIG. 27A, a calling chart can comprise four signal clouds with an apparatus having a signal reaction site per pixel. In an apparatus having a single reaction site per pixel and a 2×2 four-cloud calling chart as represented in FIG. 27A, the signal to noise ratio can be expressed as set forth in Eq. 2.

$$SNR_4 = 20\log\left(\frac{A}{\sqrt{\sigma_1^2 + \sigma_4^2}}\right) \quad \text{(Eq. 2)}$$

Where signal A is the maximum amplitude of received signal light received by a given pixel 202 of the apparatus.

Referring to Eq. 2, it can be seen that the signal to noise ratio of the four-cloud calling chart apparatus can be dependent on the signal amplitude A as well as on the variables $\sigma_1$ and $\sigma_4$ which represent, respectively, signal variance of the top left cloud at cloud position X1Y2 and the signal variance of the top right cloud at cloud position X2Y2. Examples herein recognize that as signal amplitude of a cloud increases, i.e., in the case of the top right cloud at cloud position X2Y2, signal variance can be expected to increase.

FIG. 27B depicts a calling chart in the case of a 16-channel 4×4 calling chart apparatus. The signal to noise ratio in a 16-cloud calling chart apparatus can be expressed as set forth in Eq. 3.

$$SNR_{16} = 20\log\left(\frac{\frac{A}{3}}{\sqrt{\sigma_3^2 + \sigma_4^2}}\right) \quad \text{(Eq. 3)}$$

In an apparatus having first and second reaction sites per pixel and an associated 4×4 16-cloud calling chart as depicted in the calling chart of FIG. 27B, the signal to noise ratio can be expected to decrease based on variables that are depicted in Eq. 3. Initially, since three different signal level amplitudes are detected for, the numerator in Eq. 3 can be expressed as the value A/3, as opposed to the value A as indicated in Eq. 2 corresponding to the signal reaction site per pixel apparatus represented in FIG. 27A. Further, the denominator in Eq. 3 can be a function of the signal variance variable $\sigma_3$ at cloud position X3Y4, rather than the signal variance variable a1 at cloud position X1Y4 (Eq. 2) to further decrease the resulting signal to noise ratio.

Examples herein recognize that signal to noise ratio constraints of a multiple reaction site per pixel apparatus can be managed by appropriate system design, e.g., inclusive of design strategies to promote minimized signal variances for the various clouds and also to increase separation between clouds. Examples herein recognize that higher amplitude clouds, e.g., the cloud at cloud position X4Y4, can have larger variances than relatively smaller signal amplitude clouds. Accordingly, in one aspect, examples herein can include design features to promote increased separation between higher amplitude clouds which can be expected to exhibit more pronounced signal variances, Gn.

Figure 28C:
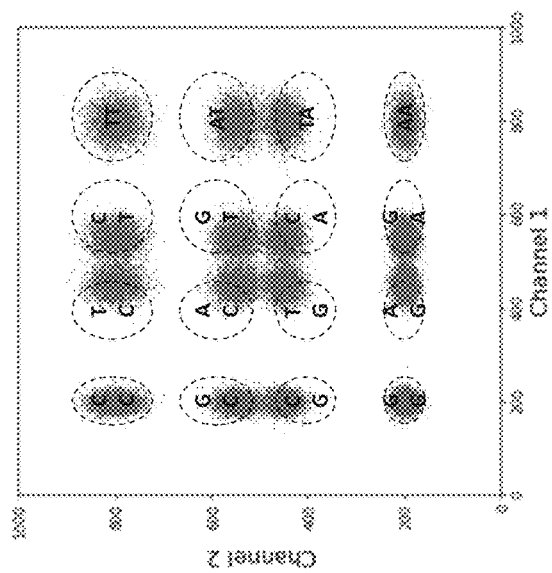
FIG. 28A-28C are charts depicting impact of cluster signal amplitude ratio on cloud spacing.
Figure 28B:
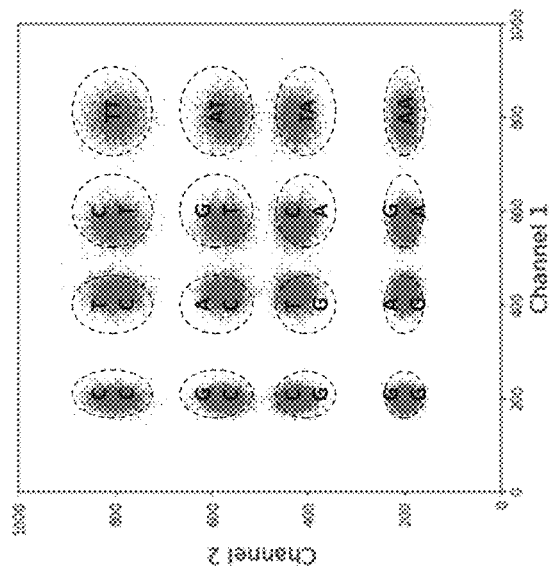
Figure 28A:
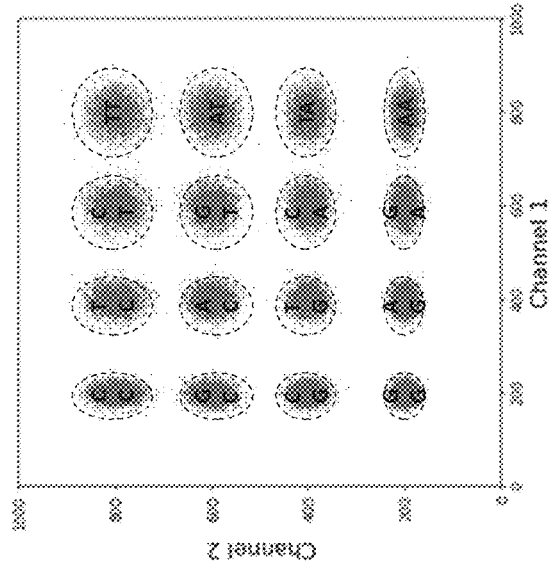

FIGS. 28A-28C depict cloud spacings in a 16-cloud calling chart for different values of R, where R is the ratio between a second cluster emission signal in an "on" state and a first cluster emission signal in an "on" state. Referring to FIGS. 28A-28C, it is seen that by varying the value of R, spacing between different clouds can change. In the case that R=2, i.e., there is 2× cluster signal ratio, the various clouds in the cloud positions X1Y1 to X4Y4, as depicted in FIG. 28A-28C, can have equal centroid to centroid spacings. However, examples herein recognize that with equal centroid spacings, and with larger signal amplitude clouds having larger signal variances $\sigma_n$, the edge to edge spacing between larger amplitude clouds can be smaller than an edge to edge spacing between smaller amplitude clouds. Referring to FIG. 28A, the edge to edge spacing between the cloud at cloud position X4Y4 and the cloud at position X3Y4 can be less than the edge to edge spacing between the clouds at cloud position X2Y4 and X1Y4. In FIGS. 28A-28C, the 4×4 array of clouds can be expressed in terms of their X axis (horizontal) and Y axis (vertical) positions, from X1Y1 to X4Y4. The X axis can represent "on" state emission signal amplitudes under first narrow band excitation light, and the Y axis can represent "on" state emission signal amplitudes under second narrow band excitation light.

To reduce overall cloud spacing between higher amplitude clouds, examples herein recognize with reference to FIGS. 28A-28C, that apparatus 100 can be configured to feature a design to exhibit an "on" state cluster signal emission ratio of between about 1.9 and about 2.0. Referring to FIG. 28B, where R=1.89, the overall cloud spacing between clouds at cloud position X4Y4 and position X3Y4 can be increased relative to the overall cloud space at cloud position X4Y4 and cloud position X3Y4 as depicted in FIG. 28A, R=2×. Further, as shown in FIG. 28C, if the ratio of R is reduced, e.g., to a value of R=1.4, clouds at various cloud positions can overlap even in the case where cloud variances are modest, although it can be seen with sufficiently small signal variances, a design represented by FIG. 28 would produce adequate cloud spacing. Thus, based on the empirical data as shown in FIGS. 28A-28C, the cluster signal "on" state ratio of about R=1.9 promotes edge to edge cloud spacing between high signal amplitude clouds while avoiding substantial risk of cloud overlap as depicted in FIG. 28C. Referring to FIG. 28A a design featuring an "on" state signal ratio of about R=2.0 can also produce a calling chart featuring adequate cloud spacing.

In examples set forth herein, different reaction sites 206, 206A-206D defined on reaction structure 260 can be provided by different nanowells 207, 207A-207D. In other examples, reaction sites 206, 206A-206D can be defined by alternative features which can be defined by reaction structure 260. The alternative features can comprise, e.g., structural feature variations and/or variations in chemical composition. Structural features defining structural feature variations can form an array in or on reaction structure 260. Exemplary structural features can include, but are not limited to nanowells as set forth herein, posts, ridges, channels, and/or layers of a multilayer material. A feature can have characteristics such as size (e.g., volume, diameter, and depth), shape (e.g., round, elliptical, triangular, square, polygonal, star shaped (having any suitable number of vertices), irregular, or having concentric features separated by a dielectric material), and distribution (e.g., spatial locations of the features within the dielectric material, e.g., regularly spaced or periodic locations, or irregularly spaced or aperiodic locations). The cross section of a feature can be, but need not necessarily be, uniform along the length of the feature.

The flowchart and block diagrams in the figures illustrate the architecture, functionality, and operation of possible implementations of systems, methods, and computer program products according to various examples of the present implementation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, processes, operations, elements, and/or components, but do not preclude the presence or addition of one or more other features, integers, steps, processes, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more examples has been presented for purposes of illustration and description, but is not intended to be exhaustive or limited to in the form disclosed. Many modifications and variations will be apparent to those of ordinary skill in the art. Any example was chosen and described in order to best explain various aspects and the practical application, and to enable others of ordinary skill in the art to understand various examples with various modifications as are suited to the particular use contemplated.

It should be appreciated that all combinations of the foregoing concepts and additional concepts discussed in greater detail below (provided such concepts are not mutually inconsistent) are contemplated as being part of the subject matter disclosed herein at least to achieve the benefits as described herein. In particular, all combinations of claims subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

This written description uses examples to disclose the subject matter, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, they are by no means limiting and are merely provided by way of example. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Forms of term "based on"

herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph (35 U.S.C. § 112(f)), unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure may include only some of the described examples. Also, while some examples are described as having a certain number of elements it will be understood that the subject matter can be practiced with less than or greater than the certain number of elements. Accordingly, the subject matter is not to be seen as limited by the foregoing description, but is only limited by the scope of the appended claims.

What is claimed is:

1. An apparatus comprising:
    a plurality of pixels;
    a first reaction site associated to a pixel of the plurality of pixels;
    a second reaction site associated to the pixel, wherein the first reaction site is defined by a first nanowell, and wherein the second reaction site is defined by a second nanowell;
    wherein the pixel includes a pixel sensor that detects a read signal, the read signal being dependent on a first cluster signal emitted from the first site and on a second cluster signal emitted from the second site; and
    wherein the first site and the second site are configured so that the second cluster signal in an "on" state has a greater amplitude than the first cluster signal in an "on" state.

2. The apparatus of claim 1, wherein the apparatus includes processing circuitry configured to determine identities of respective analytes in the first reaction site and the second reaction site using a sixteen (16) cloud calling chart that maps signal amplitudes of the read signal under different illumination conditions to identities of respective analytes in the first reaction site and the second reaction site.

3. The apparatus of claim 1, wherein a ratio of the second cluster signal in an "on" state to the first cluster signal in an "on" state is between about 1.9 to about 2.0.

4. The apparatus of claim 1, wherein the second reaction site has a larger size than the first reaction site so that the second cluster signal in the "on" state has a greater amplitude than the first cluster signal in the "on" state.

5. The apparatus of claim 1, wherein the second reaction site is absent an attenuator, and wherein the first reaction site includes an attenuator so that the second cluster signal in the "on" state has a greater amplitude than the first cluster signal in the "on" state.

6. The apparatus of claim 1, wherein, by an arrangement of attenuating material, attenuation of emission light rays radiating from the first reaction site is greater than attenuation of emission light rays radiating from the second reaction site so that the second cluster signal in the "on" state has a greater amplitude than the first cluster signal in the "on" state.

7. The apparatus of claim 4, wherein, by an arrangement of attenuating material, attenuation of emission light rays radiating from the first reaction site is greater than attenuation of emission light rays radiating from the second reaction site so that the second cluster signal in the "on" state has a greater amplitude than the first cluster signal in the "on" state.

8. The apparatus of claim 1, wherein the second reaction site is absent an attenuator aligned with and below a bottom surface of the second reaction site, and wherein the first reaction site includes an attenuator aligned with and below a bottom surface of the first reaction site so that the second cluster signal in the "on" state has a greater amplitude than the first cluster signal in the "on" state.

9. The apparatus of claim 1, wherein the apparatus includes an attenuating material layer that extends through an area aligned with and below a bottom surface of the first reaction site to define an attenuator of the first reaction site, the attenuating material layer being absent of a section that extends through an area aligned with and below the second reaction site.

10. The apparatus of claim 1, wherein second to Nth pixels of the plurality of pixels have associated first and second reaction sites that are respectively configured according to the first reaction site and the second reaction site associated to the pixel, wherein the first and second reaction sites associated to adjacent pixels of the plurality of pixels have first and second different respective orientations relative to their respective pixels, the first and second different respective orientations increasing a spacing distance between reaction sites from adjacent pixel locations relative to a spacing distance between reaction sites from adjacent pixel locations in the absence of the different respective orientations.

11. The apparatus of claim 1, wherein the second nanowell is absent an attenuator aligned with and below a bottom surface of the second nanowell, and the first nanowell includes an attenuator aligned with and below a bottom surface of the first nanowell so that the second cluster signal in the "on" state has a greater amplitude than the first cluster signal in the "on" state.

12. The apparatus of claim 1, wherein the second nanowell is absent an attenuator intersected by a vertically extending center axis of the second nanowell, and the first nanowell includes an attenuator intersected by a vertically extending center axis of the first nanowell so that the second cluster signal in the "on" state has a greater amplitude than the first cluster signal in the "on" state.

13. The apparatus of claim 1, wherein the apparatus includes processing circuitry configured to determine identities of respective analytes in the first reaction site and the second reaction site using a calling chart that maps signal amplitudes of the read signal under different illumination conditions to identities of respective analytes in the first reaction site and the second reaction site.

14. The apparatus of claim 1, wherein a ratio of the second cluster signal in an "on" state to the first cluster signal in an "on" state is at least about 1.4.

15. The apparatus of claim 1, wherein the second reaction site has a larger width than the first reaction site so that the second cluster signal in the "on" state has a greater amplitude than the first cluster signal in the "on" state.

16. An apparatus comprising:
a plurality of pixels;
a first reaction site associated to a pixel of the plurality of pixels;
a second reaction site associated to the pixel;
wherein the pixel includes a pixel sensor that detects a read signal, the read signal being dependent on a first cluster signal emitted from the first site and on a second cluster signal emitted from the second site; and
wherein the first site and the second site are configured so that the second cluster signal in an "on" state has a greater amplitude than the first cluster signal in an "on" state, wherein the second reaction site is absent an attenuator aligned with and below a bottom surface of the second reaction site, and wherein the first reaction site includes an attenuator aligned with and below a bottom surface of the first reaction site so that the second cluster signal in the "on" state has a greater amplitude than the first cluster signal in the "on" state.

17. The apparatus of claim 16, wherein the apparatus includes processing circuitry configured to determine identities of respective analytes in the first reaction site and the second reaction site using a calling chart that maps signal amplitudes of the read signal under different illumination conditions to identities of respective analytes in the first reaction site and the second reaction site.

18. The apparatus of claim 16, wherein a ratio of the second cluster signal in an "on" state to the first cluster signal in an "on" state is at least about 1.4.

19. An apparatus comprising:
a plurality of pixels;
a first reaction site associated to a pixel of the plurality of pixels;
a second reaction site associated to the pixel;
wherein the pixel includes a pixel sensor that detects a read signal, the read signal being dependent on a first cluster signal emitted from the first site and on a second cluster signal emitted from the second site; and
wherein the first site and the second site are configured so that the second cluster signal in an "on" state has a greater amplitude than the first cluster signal in an "on" state, and wherein, by an arrangement of attenuating material, attenuation of emission light rays radiating from the first reaction site is greater than attenuation of emission light rays radiating from the second reaction site so that the second cluster signal in the "on" state has a greater amplitude than the first cluster signal in the "on" state.

20. The apparatus of claim 19, wherein the second reaction site is absent an attenuator aligned with and below a bottom surface of the second reaction site, and wherein the first reaction site includes an attenuator aligned with and below a bottom surface of the first reaction site so that the second cluster signal in the "on" state has a greater amplitude than the first cluster signal in the "on" state.

* * * * *